US011207685B2

(12) United States Patent
Cauley, III et al.

(10) Patent No.: US 11,207,685 B2
(45) Date of Patent: Dec. 28, 2021

(54) SYSTEM, METHOD, AND DEVICE FOR FORMING AN ARRAY OF EMULSIONS

(71) Applicant: Bio-Rad Laboratories, Inc., Hercules, CA (US)

(72) Inventors: Thomas Henry Cauley, III, Redwood City, CA (US); John Dzenitis, Danville, CA (US); Steve Hobbs, Pleasanton, CA (US); Stefano Schiaffino, Pleasanton, CA (US)

(73) Assignee: Bio-Rad Laboratories, Inc., Hercules, CA (US)

(*) Notice: Subject to any disclaimer, the term of this patent is extended or adjusted under 35 U.S.C. 154(b) by 42 days.

(21) Appl. No.: 15/894,836

(22) Filed: Feb. 12, 2018

(65) Prior Publication Data

US 2018/0229239 A1 Aug. 16, 2018

Related U.S. Application Data

(60) Provisional application No. 62/458,429, filed on Feb. 13, 2017.

(51) Int. Cl.
| | |
|---|---|
| B01L 3/00 | (2006.01) |
| G01N 1/38 | (2006.01) |
| B01F 3/08 | (2006.01) |
| B01F 13/10 | (2006.01) |
| B01L 9/00 | (2006.01) |

(52) U.S. Cl.
CPC ....... B01L 3/502784 (2013.01); B01F 3/0811 (2013.01); B01F 13/1072 (2013.01); B01L 3/502715 (2013.01); G01N 1/38 (2013.01); B01F 2215/0037 (2013.01); B01L 9/527 (2013.01); B01L 2200/028 (2013.01); B01L 2200/0673 (2013.01); B01L 2200/0684 (2013.01); B01L 2200/0689 (2013.01); B01L 2200/12 (2013.01); B01L 2400/049 (2013.01)

(58) Field of Classification Search
CPC ............... B01L 9/527; B01L 3/502784; B01L 2200/0689; B01L 2200/028; B01L 2200/027
See application file for complete search history.

(56) References Cited

U.S. PATENT DOCUMENTS

| | | | |
|---|---|---|---|
| 6,046,056 | A | 4/2000 | Parce et al. |
| 8,394,324 | B2 | 3/2013 | Bousse et al. |
| 9,687,848 | B2 | 6/2017 | Makarewicz, Jr. et al. |
| 10,682,647 | B2 | 6/2020 | Makarewicz, Jr. et al. |
| 2001/0048899 | A1 | 12/2001 | Marouiss et al. |
| 2002/0187557 | A1 | 12/2002 | Hobbs et al. |
| 2003/0215957 | A1 | 11/2003 | Lemmo et al. |
| 2005/0112036 | A1 | 5/2005 | Funazaki et al. |
| 2005/0130318 | A1 | 6/2005 | Vann et al. |
| 2007/0104866 | A1 | 5/2007 | McClements et al. |
| 2010/0224255 | A1 | 9/2010 | Mathies et al. |
| 2010/0234674 | A1 | 9/2010 | Wheeler et al. |
| 2011/0092376 | A1* | 4/2011 | Colston, Jr. ........... B01F 3/0807 506/7 |
| 2012/0152369 | A1 | 6/2012 | Hiddessen et al. |
| 2012/0180884 | A1 | 7/2012 | Brunello et al. |
| 2012/0190032 | A1 | 7/2012 | Ness et al. |
| 2012/0241015 | A1 | 9/2012 | Hansen et al. |
| 2012/0260996 | A1 | 10/2012 | Rapp et al. |
| 2012/0261013 | A1 | 10/2012 | Gilbert et al. |
| 2013/0090268 | A1 | 4/2013 | Hung et al. |
| 2013/0105319 | A1 | 5/2013 | Bhattacharya et al. |
| 2013/0210127 | A1* | 8/2013 | Williams ................ B01L 7/52 435/287.2 |
| 2014/0080226 | A1* | 3/2014 | Cauley, III ........ B01L 3/502784 436/180 |
| 2014/0378348 | A1 | 12/2014 | Makarewicz, Jr. et al. |
| 2015/0017648 | A1 | 1/2015 | Hiddessen et al. |
| 2016/0339436 | A1 | 11/2016 | Makarewicz, Jr. et al. |

FOREIGN PATENT DOCUMENTS

| | | |
|---|---|---|
| CA | 2816712 A1 | 5/2012 |
| CN | 105452839 A | 3/2016 |
| EP | 2436445 A2 | 4/2012 |

(Continued)

OTHER PUBLICATIONS

Thomas, Shane, Authorized Officer, International Searching Authority / US, "International Search Report" in connection with related PCT Patent Application No. PCT/US2018/017883, dated Jun. 8, 2018, 4 pgs.

Thomas, Shane, Authorized Officer, International Searching Authority / US, "Written Opinion of the International Searching Authority" in connection with related PCT Patent Application No. PCT/US2018/017883, dated Jun. 8, 2018, 10 pgs.

European Patent Office, "Partial Supplementary European Search Report" in connection with related European Patent App. No. 18751862.6, dated Nov. 17, 2020, 13 pgs.

(Continued)

*Primary Examiner* — Sahana S Kaup
(74) *Attorney, Agent, or Firm* — Kolisch Hartwell, P.C.

(57) ABSTRACT

Systems, methods, and devices for forming an array of emulsions. An exemplary device comprises a frame and at least one or a plurality of separate microfluidic modules mounted to the frame and each configured to form an array of emulsions. In some embodiments, each module may be mounted by snap-fit attachment. The device also may include the same sealing member bonded to a top side of each module and hermetically sealing each of the modules. Another exemplary microfluidic device for forming an array of emulsions comprises a stack of layers bonded together. The stack may comprise a port layer forming a plurality of ports. Each port may have a top rim formed by a protrusion that encircles the central axis of the port. The rims may be coplanar with one another to facilitate bonding of a sealing member to each rim.

17 Claims, 25 Drawing Sheets

(56) References Cited

FOREIGN PATENT DOCUMENTS

| | | |
|---|---|---|
| JP | 2003507737 A | 2/2003 |
| JP | 2013524171 A | 6/2013 |
| JP | 2014502209 A | 1/2014 |
| WO | 0114865 A1 | 3/2001 |
| WO | 02072423 A1 | 9/2002 |
| WO | 2011002957 A2 | 1/2011 |
| WO | 2011120024 A1 | 9/2011 |
| WO | 2012061444 A2 | 5/2012 |
| WO | WO-2014205447 A2 * 12/2014 ........ B01L 3/502784 |

OTHER PUBLICATIONS

China Intellectual Property Administration, Office Action in Chinese Patent Application No. 201880024886.X, dated Mar. 30, 2021, 41 pages.

* cited by examiner

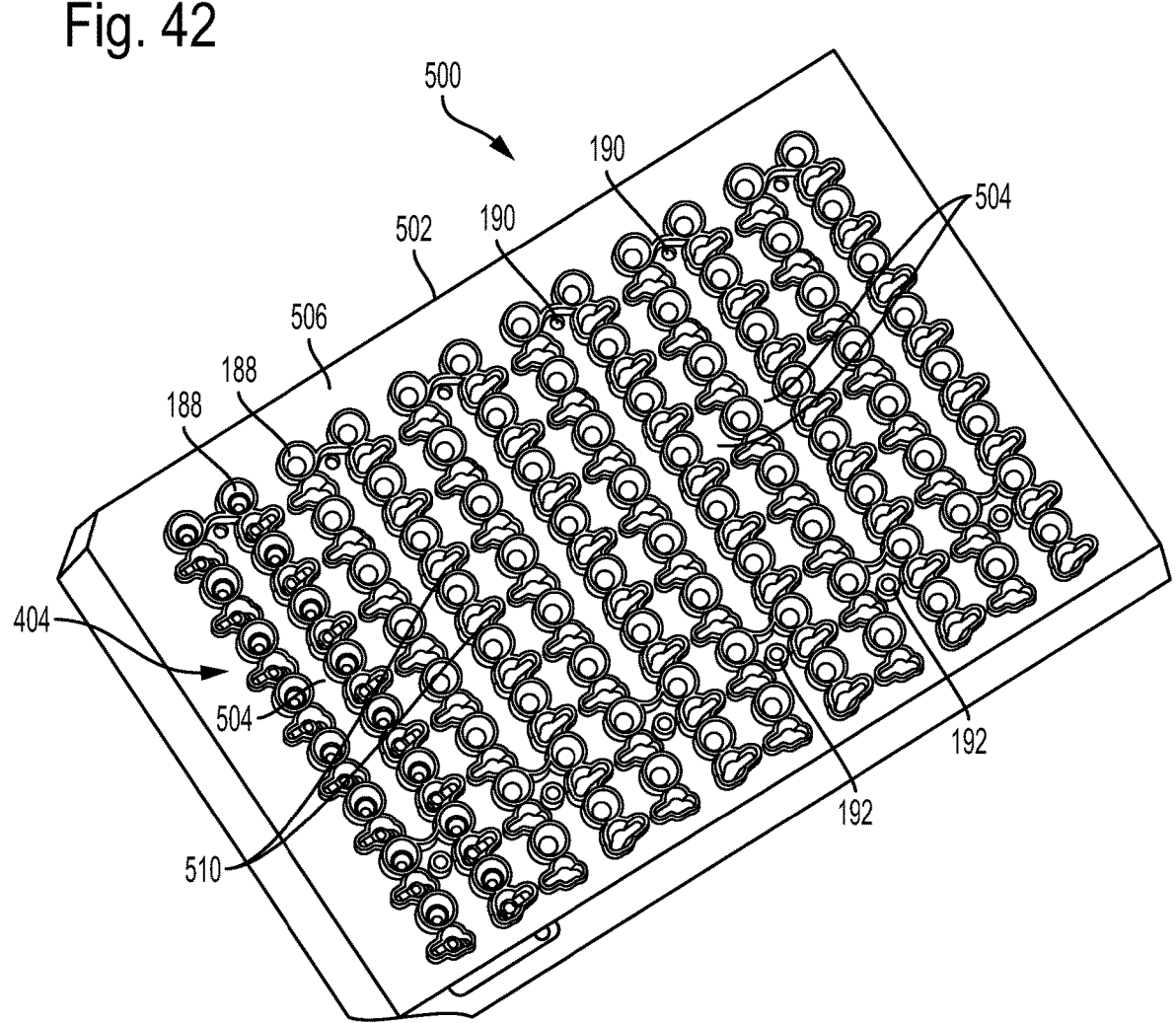

SYSTEM, METHOD, AND DEVICE FOR FORMING AN ARRAY OF EMULSIONS

CROSS-REFERENCE TO PRIORITY APPLICATION

This application is based upon and claims the benefit under 35 U.S.C. § 119(e) of U.S. Provisional Patent Application Ser. No. 62/458,429, filed Feb. 13, 2017, which is incorporated herein by reference in its entirety for all purposes.

CROSS-REFERENCES TO OTHER MATERIALS

This application incorporates herein by reference in their entirety for all purposes the following: U.S. Patent Application Publication No. 2010/0173394 A1, published Jul. 8, 2010; and U.S. Patent Application Publication No. 2014/0378348 A1, published Dec. 25, 2014.

INTRODUCTION

Various powerful approaches for analyzing a fluid sample begin by forming an emulsion with the sample. In the emulsion, the sample is a dispersed phase of droplets each encapsulated by an immiscible continuous phase. With a biological sample, the droplets are typically aqueous droplets surrounded by an immiscible carrier liquid comprising oil.

A biological sample can be analyzed for the level of a nucleic acid target using an emulsion-based strategy. Before the sample is divided into droplets, it is combined with reagents to support amplification of the target, such as by the polymerase chain reaction (PCR). An emulsion including sample droplets is then formed, with the target present in only a subset of the droplets. The emulsion then is heated or thermally cycled to encourage amplification of the target in each droplet containing at least one copy of the target. A signal is detected from the droplets to determine which droplets contain amplified target, allowing the level of the target to be calculated from the fraction of the droplets that are positive (or that are negative) for the target, in what is described as a digital assay.

Microfluidic devices have been developed to form and collect an array of emulsions in parallel for digital assays. However, increasing the number of emulsions in the array, to meet the demand for higher sample throughput, presents numerous engineering challenges. For example, increasing the size of the array without changing its density can make the device bulky and costly to manufacture. On the other hand, designing a device that forms a higher density array of emulsions under the control of an instrument generally reduces the size of the device's user and instrument interfaces, which can make the device less user-friendly (such as more difficult to load with sample), and the instrument more expensive and less reliable.

SUMMARY

The present disclosure provides systems, methods, and devices for forming an array of emulsions. An exemplary device comprises a frame and at least one or a plurality of separate microfluidic modules mounted to the frame and each configured to form an array of emulsions. In some embodiments, each module may be mounted by snap-fit attachment. The device also may include the same sealing member bonded to a top side of each module and hermetically sealing each of the modules. Another exemplary microfluidic device for forming an array of emulsions comprises a stack of layers bonded together. The stack may comprise a port layer forming a plurality of ports. Each port may have a top rim formed by a protrusion that encircles the central axis of the port. The rims may be coplanar with one another to facilitate bonding of a sealing member to each rim.

BRIEF DESCRIPTION OF THE DRAWINGS

FIG. 42 is a top view of the device of FIG. 40.

DETAILED DESCRIPTION

Figure 1:
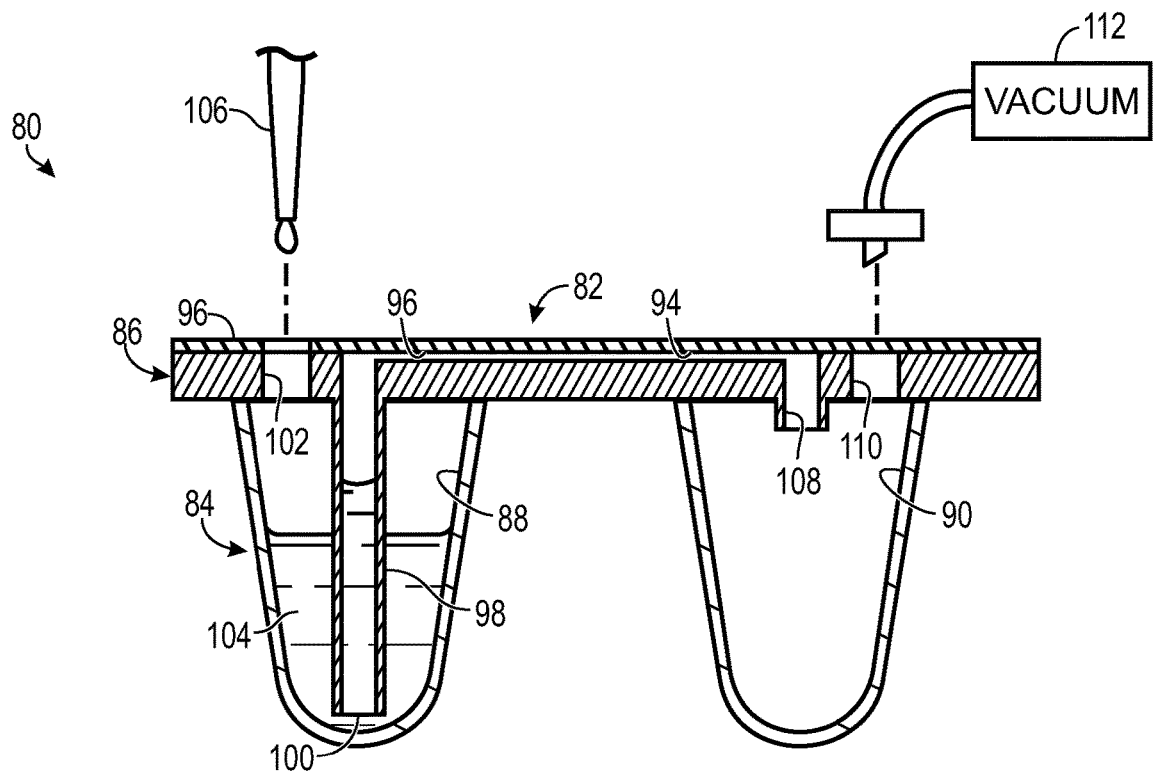
FIG. 1 is a schematic sectional view of an exemplary emulsion-forming assembly of the prior art, taken before emulsion formation and after sample fluid for a prospective emulsion has been loaded into an input well of the device.

The present disclosure provides systems, methods, and devices for forming an array of emulsions. An exemplary device comprises a frame and at least one or a plurality of separate microfluidic modules mounted to the frame and each configured to form an array of emulsions. In some embodiments, each module may be mounted by snap-fit attachment. The device also may include the same sealing member bonded to a top side of each module and hermetically sealing each of the modules. Another exemplary microfluidic device for forming an array of emulsions comprises a stack of layers bonded together. The stack may comprise a port layer forming a plurality of ports and providing any combination of an array of tapered sample loading ports to guide the inlet/outlet end of a pipette to a respective sample reservoir under each loading port, an array of sample vent ports, a carrier-fluid inlet port, a carrier-fluid vent port, and/or a vacuum/pressure port. Each port may have a top rim formed by a protrusion that encircles the central axis of the port. The rims may be coplanar with one another to facilitate bonding of a sealing member to each rim.

An exemplary cartridge is provided. The cartridge may comprise a frame and a plurality of separate modules mounted to the frame, optionally by snap-fit attachment. Each module may have an array of sample reservoirs that are loadable through overlying sample ports from above the module, a corresponding array of emulsion reservoirs, a carrier port, a vacuum/pressure port, and a channel network in fluid communication with each of the sample and emulsion reservoirs and with the carrier port. The channel network may be configured to form droplets of sample fluid received from each sample reservoir and to direct the droplets to a corresponding emulsion reservoir when vacuum/pressure is applied to the vacuum/pressure port and carrier fluid is supplied to the carrier port, optionally under pressure. In some embodiments, the modules may be substantially identical to one another, and/or each module may have a two-dimensional array of sample reservoirs and corresponding emulsion reservoirs. In some embodiments, the emulsion reservoirs and/or the sample ports within a single module, or of two or more of the modules collectively, may be arranged according to an ANSI-SLAS microplate standard, such as spaced from one another by about 4.5 mm or 9 mm. In some embodiments, the vacuum/pressure port may be a single vacuum port, and the module may include a vacuum manifold providing fluid communication between the vacuum port and each of the emulsion reservoirs of the module. The channel network may lie in a first plane, and the vacuum manifold may lie in a second plane that is spaced from the first plane. In some embodiments, the cartridge further may include a sealing member, such as a polymer-coated, metal foil, that is attached to a top side of each of the modules and hermetically seals the carrier port, the vacuum/pressure port, each sample port, each sample reservoir, and/or each emulsion reservoir, to prevent fluid communication between each sample reservoir and the ambient atmosphere outside the modules.

An exemplary microfluidic device is provided. The device may comprise an assembly of layers bonded to one another, such as face-to-face. The device may have an array of sample reservoirs that are loadable through overlying sample ports from above the device, a corresponding array of emulsion reservoirs, a carrier port, a vacuum port, a vacuum manifold providing fluid communication between the vacuum port and each of the emulsion reservoirs, and a channel network in fluid communication with each of the sample and emulsion reservoirs and with the carrier port. The channel network may be configured to form droplets of sample fluid received from each sample reservoir and to direct the droplets to a corresponding emulsion reservoir when carrier fluid is supplied to the carrier port and vacuum is applied to the vacuum port.

Another exemplary microfluidic device is provided. The device may comprise an assembly of layers bonded to one another, such as face-to-face. The device may have an array of sample reservoirs that are loadable through overlying sample ports from above the device, a corresponding array of emulsion reservoirs, a carrier port, at least one vacuum/pressure port, and a channel network in fluid communication with each of the sample and emulsion reservoirs and with the carrier port. Each sample port may include a loading guide configured as tapered opening to guide the inlet/outlet end of a pipette tip to an underlying sample reservoir. The channel network may be configured to form droplets of sample fluid received from each sample reservoir and to direct the droplets to a corresponding emulsion reservoir when carrier fluid is supplied to the carrier port, optionally under pressure, and vacuum/pressure is applied to the at least one vacuum/pressure port. In some embodiments, the opening of the loading may decrease an area of the sample port, measured parallel to a plane defined by the device, by at least 50%, 75%, 80% or 90%, among others, and/or may decrease a width of the port by at least 50% or 70%, among others. In some embodiments, the channel network is located under a tapered region of the sample port and/or is defined by a different layer(s) of the assembly than the opening of the loading guide. In some embodiments, the channel network has a ceiling formed by a capping layer of the assembly, and wherein the tapered region is defined by a guide/port layer that overlies the capping layer. In some embodiments, the guide/port layer forms the carrier port and the at least one vacuum/pressure port. In some embodiments, the guide/port layer defines openings forming access regions that extend from a top side to a bottom side of the guide/port layer and overlapping the emulsion reservoirs, to facilitate access thereto through other layers of the assembly. Each of the openings may be defined by a lateral indentation of the guide/port layer or may be bounded circumferentially in a plane parallel to the layers.

Still another exemplary microfluidic device is provided. The device may comprise an assembly of layers bonded to one another, such as face-to-face. The device may have an array of sample reservoirs that are loadable through overlying sample ports from above the device, a corresponding array of emulsion reservoirs, a carrier port, at least one vacuum/pressure port, and a channel network in fluid communication with each of the sample and emulsion reservoirs and with the carrier port. The channel network may be configured to form droplets of sample fluid received from each sample reservoir and to direct the droplets to a corresponding emulsion reservoir when carrier fluid is supplied to the carrier port, optionally under pressure, and vacuum/pressure is applied to the at least one vacuum/pressure port. An upper layer of the assembly may form at least a top portion of the carrier port, the at least one vacuum/pressure port, and each sample port. The upper layer may include a body and one or more protrusions projecting from the body. The one or more protrusions may encircle and form a top rim of the carrier port, the at least one vacuum/pressure port, and/or each sample port. In some embodiments, the body may have an upper surface substantially parallel to a plane defined by the assembly. In some embodiments, a sealing member may be bonded to a top of the one or more protrusions, to hermetically seal each of the ports. In some embodiments, the one or more protrusions may encircle and form a top rim of a sample vent port for each sample reservoir.

An exemplary method of forming an array of emulsions is provided. The method may be performed with a microfluidic device and/or an instrument of the present disclosure. In the method, sample fluid may be loaded into each sample reservoir of the device through a respective, overlying sample port. For example, the sample fluid may be loaded with a pipette, which may be operated manually be a user. A tip of the pipette may be guided into a sample reservoir by a tapered opening formed by a guide/port layer of the device. Some or all of the ports of the device then may be hermetically sealed with a sealing member. In some embodiments, the ports that are sealed with the sealing member may include any combination of a carrier port, a vacuum/pressure port, a plurality of sample loading ports, and a plurality of sample vent ports. The step of sealing prevents fluid communication between each sample reservoir and the ambient environment outside the device. The layer may be pierced at the carrier port, the vacuum/pressure port, and each sample vent port. A source of carrier fluid may be connected to the carrier port, and a vacuum/pressure source may be connected to the vacuum/pressure port. Emulsions may be formed and collected in emulsion reservoirs. Each emulsion reservoir containing a collected emulsion may be hermetically sealed, in isolation from each of the other emulsion reservoirs, by deforming at least one layer of the device, to block fluid flow through one or more channels of the channel network. The device may be thermally cycled. Droplets of each emulsion may be removed from the corresponding emulsion well and a signal detected from the droplets.

The present disclosure provides a disposable cartridge formed by assembling up to six microfluidic modules into a frame. Any suitable aspects of the cartridge may be compliant with microplate standards (such as ANSI-S LAS standards).

In order to integrate functionality that conforms to existing microplate standards, a very high level of design optimization and miniaturization must be achieved. As a result, the interfaces (e.g., ports) for the user and instrument become small. These interfaces can therefore induce difficulties in user handling. For example, sample fluid is hard to load through tiny sample ports, and the sample ports are challenging to seal after loading. Also, the small interfaces can cause errors during instrument operation, such as failure to apply vacuum or supply oil.

The present disclosure simplifies and improves the interfaces of the prior art, such as those described in U.S. Patent Application Publication No. 2014/0378348 A1, published Dec. 25, 2014. A new layer, which may be referred to as a Bonded Loading Guide (BLG), may be added to each microfluidic module during manufacture. The BLG may include funnel-like ports that provide a large target at the top for receiving the tip of a pipette, and which taper downward to smaller holes that communicate with the underlying sample reservoirs. This design facilitates pipetting sample fluid into sample reservoirs of the module because the tapered surface of each port acts as a ramp than can guide downward travel of the pipette tip to the narrow opening at the bottom of the port. The BLG also may provide a vacuum/pressure port for applying vacuum/pressure and a carrier port for supplying carrier fluid. Either of these ports may flare upward to provide a larger and more reliable interface at which the instrument can connect a vacuum/pressure source and a carrier source. The BLG further may form a channel portion of a manifold that allows a single vacuum/pressure port to communicate with a plurality of emulsion reservoirs or sample reservoirs of the module. Each port defined by the BLG may have a top rim formed by a protrusion, which may be a ridge. The protrusion may enable more efficient bonding of a sealing member over each port, optionally by collapsing and melting slightly when the sealing member is bonded with application of heat and pressure. The BLG also may be designed with appropriate openings to retain access to (1) microfluidic channels that may be blocked by deformation (e.g., heat staked) to seal each emulsion reservoir after drop generation and before PCR, and (2) each emulsion reservoir after PCR to enable aspiration of droplets for detection.

Further aspects of the present disclosure are described in the following sections: (I) system overview, (II) methods of forming and processing emulsions, and (III) examples.

I. SYSTEM OVERVIEW

This section provides a short discussion of an emulsion-forming assembly of the prior art, followed by an overview of an exemplary system comprising a microfluidic device and an instrument to drive and control emulsion formation within the device; see FIGS. 1-6.

Figure 2:
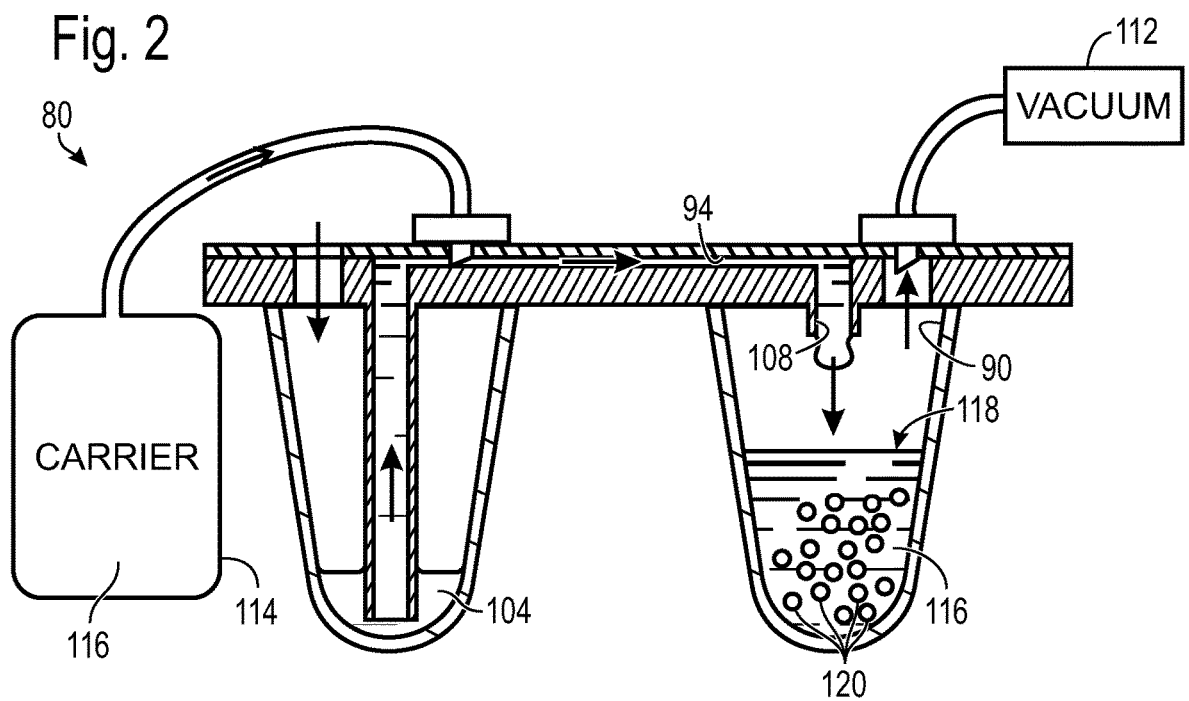
FIG. 2 is another schematic sectional view of the emulsion-forming assembly of FIG. 1, taken as FIG. 1 except near the end of emulsion formation, with the resulting emulsion being collected in an output well of the device.

FIGS. 1 and 2 schematically depict selected features of an emulsion-forming assembly 80 described in U.S. Patent Application Publication No. 2014/0378348 A1, which is incorporated herein by reference. Assembly 80 can be designed to form an array of emulsions, but only a single emulsion formation unit 82 is shown to simplify the illustration. The assembly has a well component 84 underlying and sealed to a channel component 86. The well component provides a sample well 88 and an emulsion well 90 for each emulsion formation unit 82.

The channel component defines microfluidic channels, such as a sample channel 92, a carrier channel (not visible in this view), and a droplet channel 94 in a top surface thereof. The channels meet one another at a channel junction (not visible in this view) that creates a site of droplet generation. A capping layer 96 of the assembly is sealed to the top surface of channel component 86 to close the channels by forming a ceiling of each channel.

Channel component 86 alone or with capping layer 96 defines various other structures. For example, the channel component also defines an intake tube 98 that projects downward into sample well 88, to an inlet 100 formed at the bottom end of the intake tube (and at a position near the bottom of the sample well). Tube 98 is in fluid communication with sample channel 92. A sample port 102 (interchangeably termed a sample-loading port) is defined by channel component 86 and capping layer 96 directly over sample well 88, to permit sample fluid 104 to be loaded into the sample well 88 with a fluid-transfer device, such as a pipette 106. The sample port may be sized to permit the bottom inlet/outlet end (i.e., a tip) of pipette 106 to pass through the sample port. A separate vent port may be formed by the channel component for access through the capping layer, or the sample port may function as a vent during emulsion formation. The channel component also may form a carrier port (not visible here) through which carrier fluid for each emulsion is supplied to each carrier channel. The channel component further defines a vertical outflow passage 108 that provides fluid communication between a droplet channel 94 and emulsion well 90. A vacuum port 110 also is formed by channel component 86 and provides fluid communication between a vacuum source 112 and emulsion well 90 after capping layer 96 is pierced, to permit application of vacuum to the emulsion well.

FIG. 1 shows sample well 88 loaded with sample fluid 104 before emulsion formation. Assembly 80 is not yet connected to vacuum source 112 or a carrier source 114 (see FIG. 2) that supplies carrier fluid 116.

FIG. 2 shows assembly 80 near the end of formation of an emulsion 118. The emulsion includes droplets 120 of sample fluid 104 encapsulated by carrier fluid 116. The droplets are formed at the channel junction by segmenting a stream of the sample fluid, travel along droplet channel 94, and enter emulsion well 90 via outflow passage 108.

U.S. Patent Application Publication No. 2014/0378348 A1 also discloses more detailed, refined embodiments of an assembly for forming an array of emulsions. However, the assembly may have various disadvantages that need to be addressed. For example, when attempting to arrange the droplet generators to fit in a particular footprint and/or with a particular spacing (such as a microplate spacing of 9 mm or 4.5 mm), the sample ports can become quite small and difficult to load manually, and may not be reliably sealable. Also, the assembly may be awkward to handle and may not offer any flexibility in the number of emulsion formation units provided to a user. Furthermore, the ports for vacuum and carrier fluid may not offer a reliable, leak-proof connection, and vent ports and sample ports may not be sufficiently separated from one another, thereby increasing the chance of cross-contamination.

Figure 3:
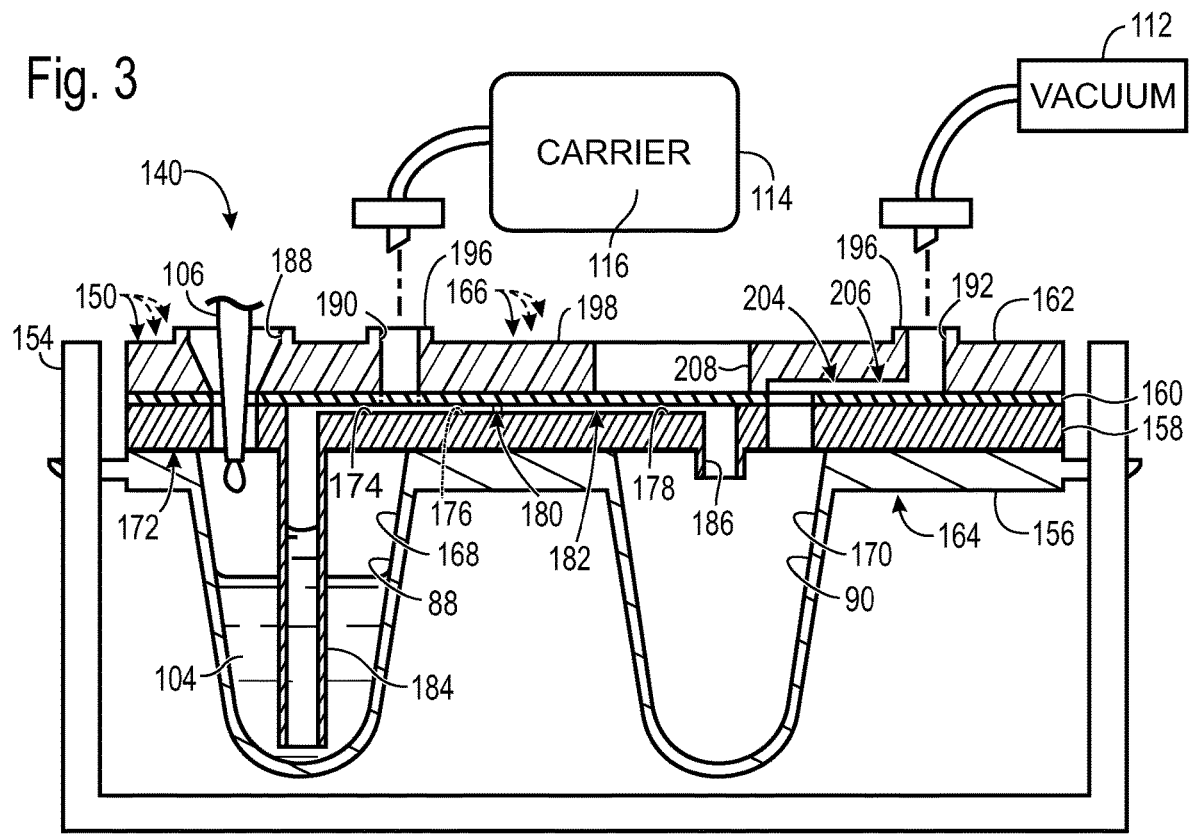
FIG. 3 is a schematic sectional view of an exemplary emulsion-forming module of the present disclosure mounted to a frame and constructed to form an array of emulsions in response to vacuum applied downstream of each site of droplet generation, and taken before emulsion formation and after sample fluid of a prospective emulsion has been loaded into a sample reservoir of the module, in accordance with aspects of the present disclosure.

FIG. 3 shows a schematic, simplified sectional view of an exemplary microfluidic device 140 that makes various improvements to the microfluidic assemblies disclosed in U.S. Patent Application Publication No. 2014/0378348 A1, in order to address some or all of the various drawbacks listed above. Device 140, which may be described as a cartridge, includes at least one microfluidic module 150 mounted to and supported by a frame 154. As described further below, frame 154 may be structured to receive and hold two or more copies of module 150 that are substantially identical to one another.

Module 150 corresponds to assembly 80 of FIGS. 1 and 2 and may have any suitable combination of the elements and features described for assembly 80. For example, module 150 is configured to form and collect an array of emulsions, optionally in parallel. The module may include and/or be substantially formed by a stack of layers that are bonded together, such as face-to-face. Bonding may be achieved by any suitable process, such as a pressure-sensitive adhesive film, solvent bonding, a liquid adhesive, ultraviolet radiation, or a combination thereof, among others. Each layer may be monolithic or formed of two or more layers that are bonded to each other. The layers may be horizontal when the module is being loaded and/or forming emulsions.

The layers of module 150 may include any combination of a well layer 156, a channel layer 158, a capping layer 160, and a guide/port layer 162. The well layer alone or in combination with one or more other layers may form a well component 164 of the module that provides a separate sample well 88 and a separate emulsion well 90 for each emulsion formation unit 166. Each sample well may form at least a lower portion of a sample reservoir 168, and each emulsion well may form at least a lower portion of an emulsion reservoir 170. At least a portion of the top wall of each of the reservoirs may be formed by channel layer 158.

The channel layer alone or in combination with one or more other layers may form a channel component 172 of module 150. Channels, such as a sample channel 174, at least one carrier channel 176, and a droplet channel 178 may be formed in a top surface of channel component 172, and may be covered and sealed on top by capping layer 160, which may form a ceiling of each channel. Channels 174, 176, 178 may meet one another at a channel junction 180 to create a site of droplet generation. A separate channel junction 180 and thus site of droplet generation may be formed for each sample reservoir and corresponding emulsion reservoir. More generally, module 150 may define a channel network 182 that is in fluid communication with each sample reservoir 168 and each emulsion reservoir 170 and that includes each of the sites of droplet generation formed by the channel network. Channel network 182 may lie substantially in a horizontal plane and communicates with an intake tube 184 and an emulsion inlet 186 of each emulsion formation unit 166, as described above with respect to assembly 80.

Guide/port layer 162, which interchangeably may be described as a guide layer or a port layer, offers an improved interface with the user and/or with an instrument that receives microfluidic device 140. Layer 162 may be monolithic or formed by two or more layers bonded together. Layer 162 may form a separate, dedicated sample loading port 188 (interchangeably called a sample port) for each sample reservoir, at least one shared carrier inlet port 190 (interchangeably called a carrier port or carrier fluid port) to supply carrier fluid, such as oil, to some or all of emulsion formation units 166/channel junctions 180 of the module, and/or at least one vacuum/pressure port 192. The vacuum/pressure port may be shared among some or all of the emulsion formation units 166/channel junctions 180 of the module, and may be downstream, as shown here, or upstream thereof (see below). If downstream, the vacuum/pressure port may be a vacuum port via which a negative pressure (vacuum) is applied to each emulsion reservoir of the module. If upstream, the vacuum/pressure port may be a pressure port via which positive (pneumatic) pressure is applied to each sample reservoir of the module. Layer 162 also may form a separate, dedicated sample vent port 194 (interchangeably called a vent port) (see FIG. 4) for each sample reservoir. Any of these ports may be described as exterior or external ports of the device.

At least one protrusion, such as protrusions 196 (interchangeably termed ridges or raised walls), may form a rim of each port (or only a subset of the ports) and may encircle a central axis of the port. The tops of the protrusions may be coplanar with one another.

Each protrusion may protrude from and may be elevated with respect to a body 198 of guide/port layer 162, and optionally from a substantially planar top surface thereof. Port protrusions 196 allow each port to be sealed more robustly, as described further below. Body 198 may form a lower section of each port, and the at least one protrusion may form an upper section of the port. Body 198 may be thicker than protrusions 196, such as at least about 2, 3, 4, or 5 times thicker, when measured orthogonal to a plane defined by the port layer.

Figure 4:
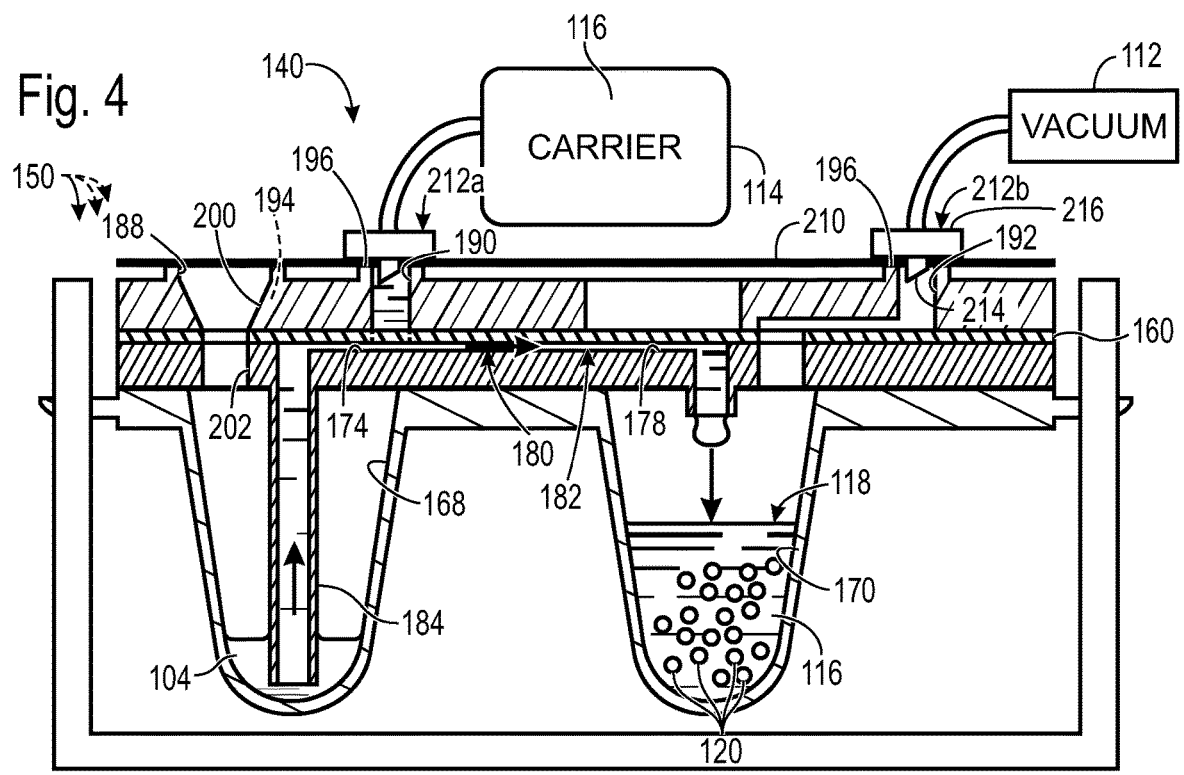
FIG. 4 is another schematic sectional view of the emulsion-forming module of FIG. 3, taken as in FIG. 3 except near the end of emulsion formation, with the resulting emulsion being collected in an emulsion reservoir of the module, in accordance with aspects of the present disclosure.

Each sample port 188 may include a tapered region 200 that guides the tip of pipette 106 into sample reservoir 168 (see FIGS. 3 and 4). The tapered region may be formed by guide layer 162 and may taper toward a neck region 202 of minimum diameter between the tapered region and sample reservoir 168. The area of the sample port at its top may be at least 2, 3, 4, 5, 7, 10, or 15 times the area at neck region 202, to give the user a much larger target area for the tip of the pipette, which minimizes the chance that the tip will miss the sample port and contaminate another exposed surface of the module. The slope of the tapered region acts as a ramp that guides the pipette tip to the neck region.

Guide/port layer 162 also may form at least an upper portion of a manifold 204 (see FIG. 3). The manifold allows a single vacuum/pressure port 192 to communicate with each emulsion reservoir (or sample reservoir) of the module, such that vacuum (or positive pneumatic pressure) can be applied in parallel to all of the emulsion reservoirs (or sample reservoirs) of the module via a single port. This configuration reduces the likelihood that vacuum or pressure will be applied unequally to different emulsion formation units 166 due to leakage at one or more vacuum/pressure ports that are dedicated to individual units 166. In some embodiments, a monolithic guide/port layer 162 defines a channel structure 206 of manifold 204 that is closed by an underlying layer, such as capping layer 160, which forms a floor of the channel structure. Channel structure 206 may lie in a plane that is above and parallel to microfluidic channel network 182, which forms droplets.

Guide/port layer 162 further may define a respective opening 208 (interchangeably called an access region) over each emulsion reservoir 170. The opening may extend completely through the layer, from a top side to a bottom side thereof, to form a window that is circumferentially bounded in a horizontal plane, or to form a notch at a lateral periphery of layer 162. In any event, the presence of opening 208 may cause an area of capping layer 160 to be uncovered and exposed. The exposed area may overlap one or more channels of channel network 182 that communicate with the emulsion reservoir, allowing each these channels to be blocked by local deformation of the capping layer and/or channel layer after an emulsion has been collected in the emulsion reservoir. Blocking the channels may fluidically isolate the emulsion reservoir from the rest of the channel network and from other reservoirs of the module, allowing the emulsion reservoir to be heated, such as thermally cycled, to promote nucleic acid amplification in droplets of the emulsion contained therein, without excessive fluid loss through evaporation. The exposed area also may overlie an emulsion outlet port (also called an emulsion outlet) defined by channel layer 158. For example, the outlet port may be the same as emulsion inlet 186, or may be laterally offset from the emulsion inlet, and may be in communication with emulsion reservoir 170 separately from the emulsion inlet 186 (see below). The emulsion may be aspirated from the emulsion reservoir via the emulsion outlet after collection of the emulsion and optional heating. Droplets of the aspirated emulsion may be directed through a detection module that detects a signal from the droplets.

FIG. 4 shows a configuration of device 140 during emulsion formation and collection. After sample fluid 104 has been loaded into each emulsion reservoir 170 of the module, a sealing member 210 (interchangeably called a sealing layer, such as a sealing film) may be placed onto module 150 such that the sealing member 210 covers the top of any suitable combination or all of the ports. For example, sealing member 210 may cover each sample loading port 188, each sample vent port 194, carrier port 190, and/or vacuum/pressure port 192 (also see FIG. 3). Sealing member 210 may be attached to guide/port layer 162 at the top of each protrusion 196. The sealing member may be bonded to protrusions 196 by application of heat and/or pressure. The sealing process may slightly melt sealing member 210 and/or each protrusion 196 at the interface between sealing member 210 and the protrusion, to hermetically seal module(s) 150 at each covered port encircled by a protrusion 196. In some embodiments, the same sealing member 210 may cover and seal ports of two or more modules 150 of device 140, as described further below. Sealing member 210 may include polymer and/or metal. For example, the layer may be a heat sealable foil having a metal layer bonded to a polymer layer, with the polymer layer in contact with guide/port layer 162. A sealing foil and corresponding sealing instrument are commercially available, such as from Bio-Rad Laboratories, Inc. The use of a foil may be preferred in some cases, because the foil can tear when pierced, thereby producing a larger opening for fluid flow, and transfers less material to instruments that interact with the foil (keeping the instruments cleaner). However, an exclusively polymer sealing film may be suitable in some cases. Bonding sealing member 210 to module(s) 150 may prevent any fluid communication between the ambient atmosphere outside the device and each sample reservoir 168, each emulsion reservoir 170, channel network 182, and/or channel structure 206 of each module. Accordingly, sample fluid 104 may be stored in device 140 after the sealing member has been applied, and before emulsion formation, for any suitable amount of time, such as overnight at room temperature or with refrigeration. The ability to safely store the sealed device before emulsion formation may be particularly advantageous when an instrument is processing other devices 140 and thus is not currently available to drive emulsion formation and subsequent processing of the emulsions.

Emulsion formation may be performed inside module 150 after an opening has been created through sealing member 210 at carrier port 190, vacuum/pressure port 192, and each vent port 194; vacuum source 112 has been fluidically connected to vacuum/pressure port 192; and carrier source 114 has been fluidically connected to carrier port 190 (see FIG. 4). Each source may be connected via a coupling member 212a or 212b including a piercing member 214 associated with a gasket 216. The piercing member creates the opening and the gasket creates a fluid-tight seal between the source and the port. In other embodiments, piercing member 214 may not be associated with gasket 216. In other embodiments, an opening may be created through a guide/port layer, instead of sealing member 210, to open a carrier port and/or a vacuum/pressure port (see Example 2). In any event, vacuum source 112 applies vacuum to the vacuum/pressure port, which causes sample fluid 104 to be aspirated into channel network 182 from each sample reservoir 168 via intake tube 184. The aspirated sample fluid is driven along sample channel 174 as a sample stream to channel junction 180, at which the sample stream is segmented into spatially isolated fluid volumes (droplets 120) encapsulated by carrier fluid 116. The vacuum applied at vacuum/pressure port 192 also may drive flow of carrier fluid 116 to the channel junction, and/or a carrier pump located upstream of the channel junction may drive flow of carrier fluid into and/or within module 150. Droplets 120 and carrier fluid 116 then travel through droplet channel 178 to the corresponding emulsion reservoir 170 at which an emulsion 118 including the droplets surrounded by carrier fluid is collected. Each emulsion then may be thermally cycled in situ after the containing emulsion reservoir has been hermetically sealed, as described above and below. At least a portion of the emulsion then may be aspirated from the emulsion reservoir through an opening created over the outlet for the emulsion reservoir, such as an opening created through capping layer 160 and sealing member 210 by piercing the capping layer and the film with the end of a tube, which is operatively connected to a pump.

Figure 5:
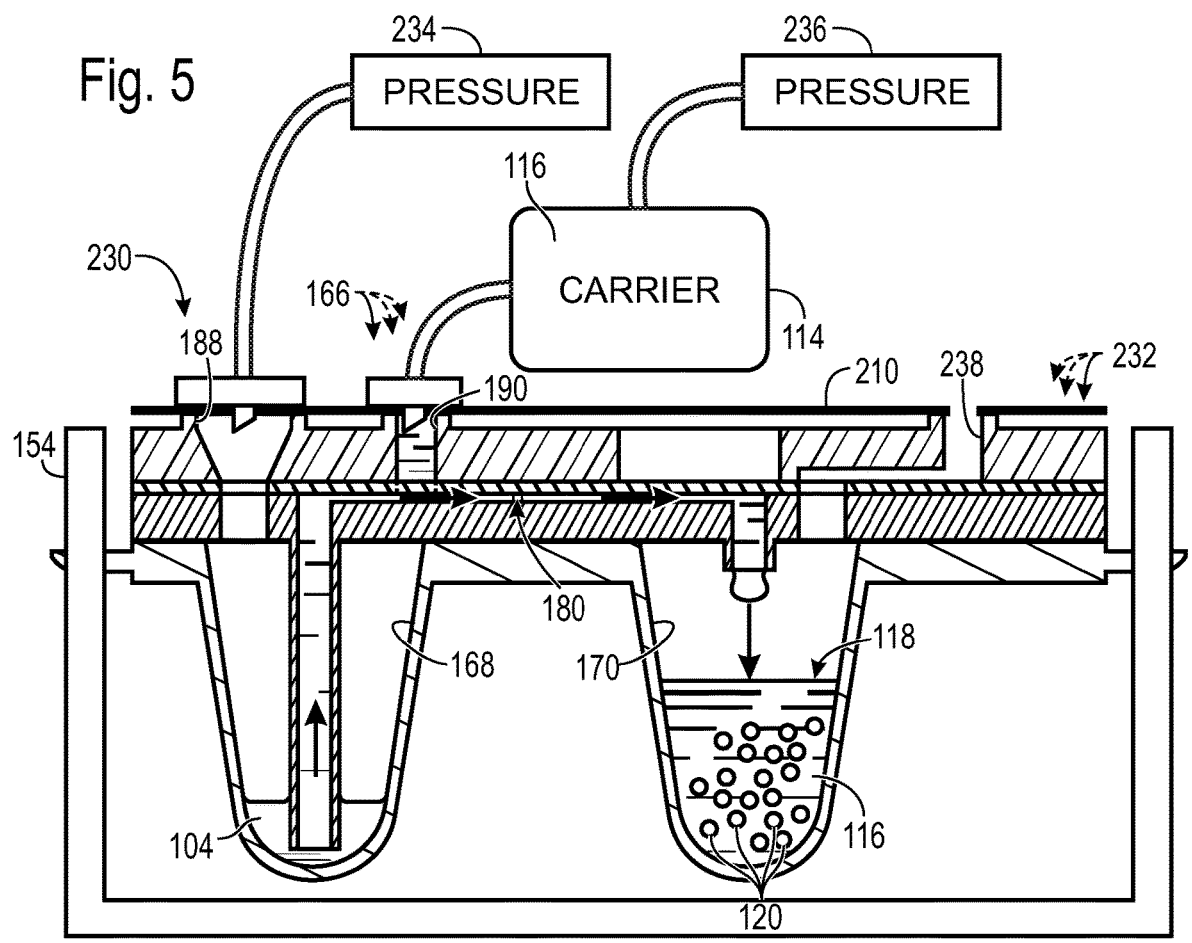
FIG. 5 is a schematic sectional view of another exemplary emulsion-forming module of the present disclosure mounted to a frame and taken near the end of emulsion formation, with the module constructed to form an array of emulsions in response to pressure applied to sample fluid and carrier fluid upstream of the sites of droplet generation, in accordance with aspects of the present disclosure.

FIG. 5 shows a schematic representation of another exemplary emulsion-forming device 230 including one or more microfluidic modules 232 mounted to frame 154. Each module 232 is constructed to form an array of emulsions 118 (only one is visible here) with a corresponding array of emulsion formation units 166 (only one is visible here). The emulsions are formed in response to positive pressure applied to each sample reservoir 168 and to carrier fluid 116 upstream of each channel junction 180 at which droplets are generated. A sample pressure source 234, which may include a pump, applies pressure to each sample reservoir 168 (only one is visible here), either at each sample port 188 (which thus also may be called a pressure port) or at a separate pressure port. In some embodiments, a single pressure port of module 232 (or device 230) may be connected to each sample reservoir 168 via a manifold, similar to that described above for module 150. A carrier pressure source 236, which may include a pump, applies pressure to carrier fluid 116, for example, upstream, at, or downstream of carrier source 114. After sample fluid 104 has been loaded into sample reservoir 168, module 232 may be sealed with sealing member 210 as described above for module 150. A vent port 238 downstream of each emulsion reservoir 170 may be opened by piercing sealing member 210. Each emulsion reservoir may have a dedicated vent port, or a single vent port may serve a plurality of emulsion reservoirs via a manifold, which may be located above (or below) the microfluidic network for forming droplets.

An emulsion formation unit may include any suitable fluidic structures. The unit may have a sample reservoir to receive and hold sample fluid (e.g., a sample fluid that is at least predominantly liquid). The unit also may have a channel junction downstream of the sample reservoir. At the channel junction, sample fluid (such as a stream of the sample fluid) may be divided to form a plurality of fluid volumes (i.e., droplets) that are isolated from one another by carrier fluid (e.g., a carrier fluid that is at least predominantly liquid and immiscible with the sample fluid). The unit further may include an emulsion reservoir downstream of the channel junction and configured to receive and collect an emulsion having the sample fluid as a dispersed phase (droplets) and the carrier fluid as a continuous phase. The unit also may include a plurality of channels that meet one another at the channel junction. A sample channel of the channels may be located downstream of the sample reservoir and may be configured to receive the sample fluid from the sample reservoir and to direct the sample fluid to the channel junction. At least one carrier channel of the channels may be located downstream of a source of carrier fluid and/or a carrier port and may be configured to direct the carrier fluid to the channel junction. A droplet channel of the channels may be upstream of the emulsion reservoir and downstream of the sample channel and carrier channel(s), and may be configured to direct the fluid volumes and carrier fluid away from the channel junction and toward the emulsion reservoir.

Figure 6:
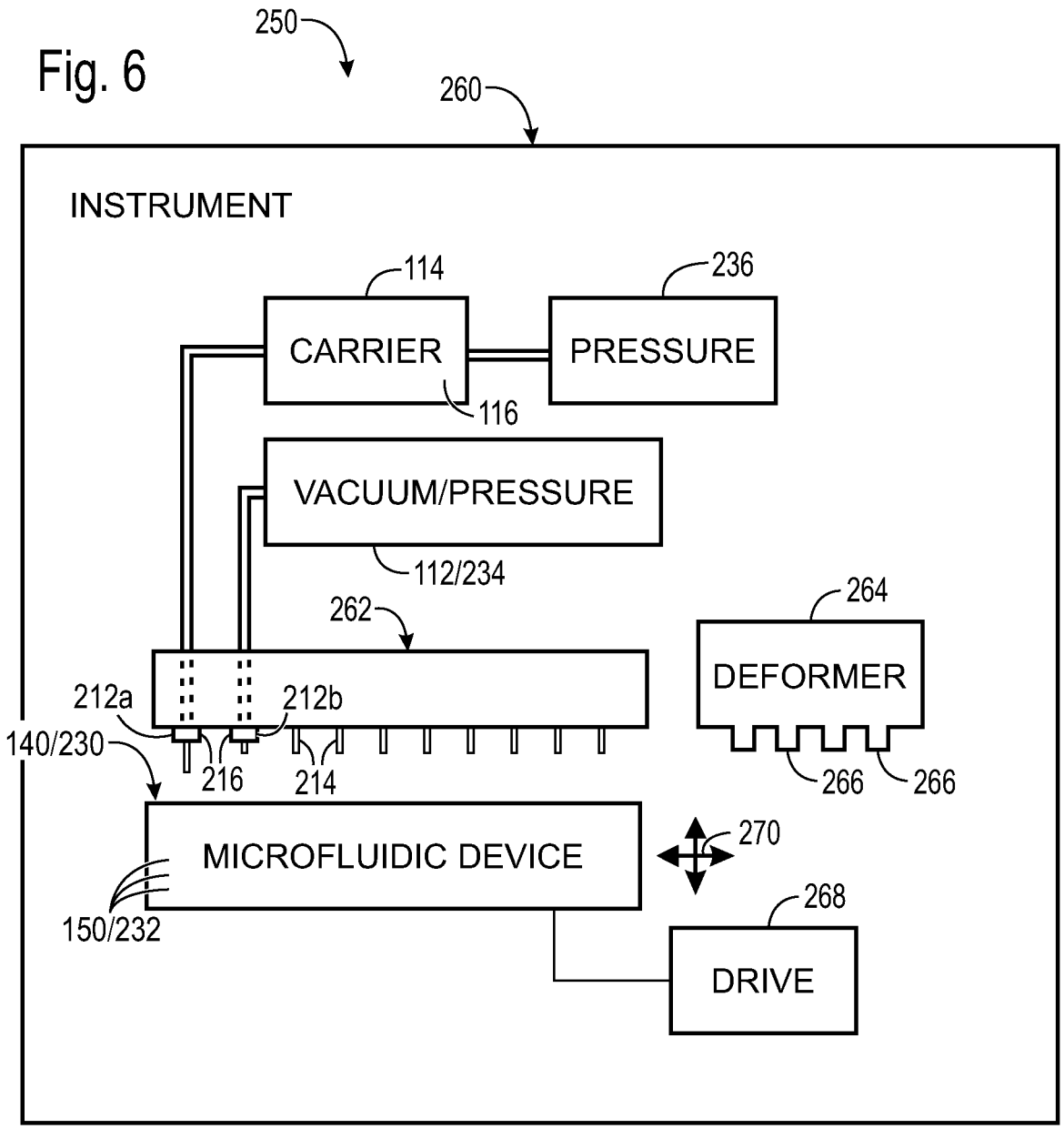
FIG. 6 is a schematic view of an exemplary system for forming an array of emulsions and including an instrument and a microfluidic device, with the instrument being configured to supply carrier fluid to the device and to drive and control emulsion formation inside the device, in accordance with aspects of the present disclosure.

FIG. 6 shows a schematic representation of an exemplary system 250 for forming an array of emulsions. The system includes microfluidic device 140 (see FIGS. 3 and 4) or microfluidic device 230 (see FIG. 5)), and an instrument 260 configured to receive and hold the device, and to drive and control emulsion formation by the device. Instrument 260 may have at least one head, such as heads 262, 264, for interfacing with the device fluidically, and/or modifying the device structurally.

Fluidics head 262 may include at least one carrier coupling member 212a and at least one vacuum/pressure coupling member 212b. Carrier coupling member 212a may be connected to carrier source 114, and vacuum/pressure coupling member 212b may be connected to vacuum source 112 or sample pressure source 234. Coupling members 212a, 212b may be configured to create fluidic connections to at least one carrier port and at least one vacuum/pressure port, respectively, of at least one module 150 or 232 of device 140 or 230. In some embodiments, coupling members 212a, 212b may be used to make successive fluidic connections to each module 150 or 232 of device 140 or 230. In some embodiments, a plurality of coupling members 212a and 212b may be used in parallel with one or two or more modules 150 or 232.

Fluidics head 262 also may have a plurality of piercing members 214 to open ports of module(s) 150 or 232 by piercing one or more layers of device 140 or 230. For example, each piercing member 214 may form an opening in sealing member 210, capping layer 160, guide/port layer 162, or a combination thereof, among others (also see FIGS. 3 and 4). Two of the piercing members may be arranged coaxially with gaskets 216 of coupling members 212a, 212b, as described above and below in Example 1. The piercing members may be different lengths, based on the layers to be pierced. For example, the piercing member of coupling member 212a may be longer than the piercing member of coupling member 212b, because coupling element 212a may pierce sealing member 210 and capping layer 160, while coupling member 212b may pierce only sealing member 210. Other piercing members 214 may pierce sample vent ports 194 and a carrier vent port (described further in Example 1). For example, the fluidics head may have a separate piercing member for each vent port of module 150 or 232. In some embodiments, the piercing members for the vent ports may be carried by a different head of instrument 260 than coupling members 212a, 212b.

A deformer head 264 may seal each emulsion reservoir after emulsion formation. The deformer head may have heated protrusions 266 to deform, by heat and pressure, one or more channels connected to each emulsion reservoir, to block fluid flow through each of the channels to/from the emulsion reservoir. The deformer head may be configured to seal all of the emulsion reservoirs of module 150 or 232 in parallel or in two or more subsets serially. In some embodiments, fluidics head 262 may carry protrusions 266, which may be heated and pressed tightly against the module after emulsion formation.

Instrument 260 also may include a drive mechanism 268 to propel movement of heads 262, 264 and device 140 or 230 relative to one another. The drive mechanism may produce movement of device 140 or 230, while heads 262, 264 remain stationary, or vice versa, among others. Relative movement may be in three dimensions, indicated at 270.

Carrier pressure source 236 may be configured to apply positive pressure sufficient to drive carrier fluid into device 140 or 230. The level and/or duration of the positive pressure may be different for device 140 versus 230. For device 140, carrier pressure source 236 may apply positive pressure sufficient to drive carrier fluid to each site of droplet generation. Application of the positive pressure then may be stopped before application of vacuum with vacuum source 112, because the vacuum source can pull additional carrier fluid into the device on its own. In contrast, for device 230, positive pressure may be applied by carrier pressure source 236 before application of positive pressure with sample pressure source 234, and then application of positive pressure by source 236 may continue while sample pressure source 234 is applying positive pneumatic pressure to each sample reservoir, to continue to drive carrier fluid into the device.

Further exemplary aspects of microfluidic device 140 are described elsewhere herein, such as in Section III. Microfluidic devices and/or modules of the present disclosure may have any suitable combination of features disclosed in U.S. Patent Application Publication No. 2014/0378348 A1, published Dec. 25, 2014, which is incorporated herein by reference.

II. METHODS OF FORMING AND PROCESSING EMULSIONS

This section describes exemplary methods of forming and processing emulsions. The method steps presented in this section may be performed in any suitable order and combination, using any of the systems, instruments, devices/cartridges, and/or modules of the present disclosure.

Sample fluid may be loaded into a plurality of sample reservoirs of a microfluidic cartridge/device by a user or robotically. Sample fluid, as used herein, may be any sample-containing fluid, such as an aqueous fluid. The sample fluid also may contain any suitable reagents, including a label to facilitate detecting an analyte in individual droplets of the sample fluid. A different sample fluid may be loaded into each sample reservoir.

The sample may be loaded with a pipette, optionally manually. An inlet/outlet end of the pipette may be placed into each sample reservoir before sample fluid is dispensed. The inlet/outlet end may be provided by a removable/disposable tip of the pipette, and a different tip may be used for each sample reservoir. The inlet/out end of the pipette may be guided into the sample reservoir with a loading guide formed by a layer of the microfluidic device.

A sealing member may be attached to the top side of the microfluidic cartridge/device by the user or robotically. Attachment may be performed by application of heat and/or pressure to the sealing member after the sealing member has been placed on the top side, such that the sealing member covers a plurality of ports of the cartridge/device. The sealing member may become bonded to a respective top rim of each port of the plurality of ports and may seal each port to prevent fluid ingress/egress at the port.

The device/cartridge may be operatively positioned in an instrument, which may perform the following steps automatically.

The sealing member may be pierced at a plurality of ports, to form an opening at each of the ports. Each opening may be at a carrier inlet port, a carrier vent port, a vacuum/pressure port, or a sample vent port.

Carrier fluid may be introduced into a carrier fluid manifold of the cartridge/device (or module thereof) via a carrier inlet port. The carrier fluid may be driven into the device by application of pressure to the carrier fluid upstream of the carrier inlet port. The carrier fluid may fill a main carrier line and carrier channels that branch from the main carrier line. The carrier fluid may reach each channel junction of a channel network of the device (or module thereof).

Vacuum or positive pneumatic pressure may be applied to a vacuum/pressure port of the cartridge/device (or module thereof). In some embodiments, the vacuum or pressure may be applied to a single vacuum/pressure port in fluid communication with each of the emulsion formation units of the cartridge/device (or module thereof). If positive pneumatic pressure is applied, pressure also may be applied to the carrier fluid upstream of the carrier inlet port, to continue to actively drive carrier fluid to each channel junction during emulsion formation. Emulsions may be formed and collected in parallel in an array of emulsion reservoirs. Each emulsion reservoir may be sealed and thermally cycled.

III. EXAMPLES

The following examples describe further aspects and embodiments of systems, methods, and devices for forming an array of emulsions. These examples are intended for illustration only and should not limit or define the entire scope of the present disclosure.

Example 1

Cartridge with Frame and Microfluidic Modules

This section describes further exemplary aspects of microfluidic device 140 of Section I, as embodied by a microfluidic cartridge 300 (interchangeably called a microfluidic device) having a non-fluidic frame that holds microfluidic modules 150; see FIGS. 7-32. Selected structures and features of cartridge 300 that correspond to those described above for microfluidic device 140 have been assigned the same reference numbers as in device 140.

FIGS. 7-10 show various views of cartridge 300 without (FIGS. 7, 8, and 10) and with (FIG. 9) a sealing member 210 that may hermetically seal the cartridge. The cartridge includes a frame 154 and a plurality of microfluidic modules 150 mounted to the frame. The modules may be substantially identical to one another, and may be mounted to the frame by the manufacturer or the user. Once mounted, the modules may or may not be configured to be removable by the user. The modules may be placed into the frame from above (i.e., the frame may be top-loading). Alternatively, or in addition, the modules may be loaded into the frame from the bottom (see Examples 2 and 3) or a side of the frame, among others. Each module and the frame may have complementary mating features that mate to produce attachment, such as by a snap-fit, and/or may be attached by bonding, among others. The mating features may include a plurality of deformable tabs 302 received in corresponding openings, such as slots 304. Each tab 302 independently may be provided by module 150 or frame 154. In the depicted embodiment, each module 150 includes tabs 302 protruding from the body of the module at opposite ends thereof, and more particularly, two tabs 302 at one end and one tab 302 at the other end for placement into the corresponding number of slots 304 of frame 154, to discourage incorrect mating with the module reversed (i.e., turned 180 degrees) (see FIGS. 13-16).

Figure 7:
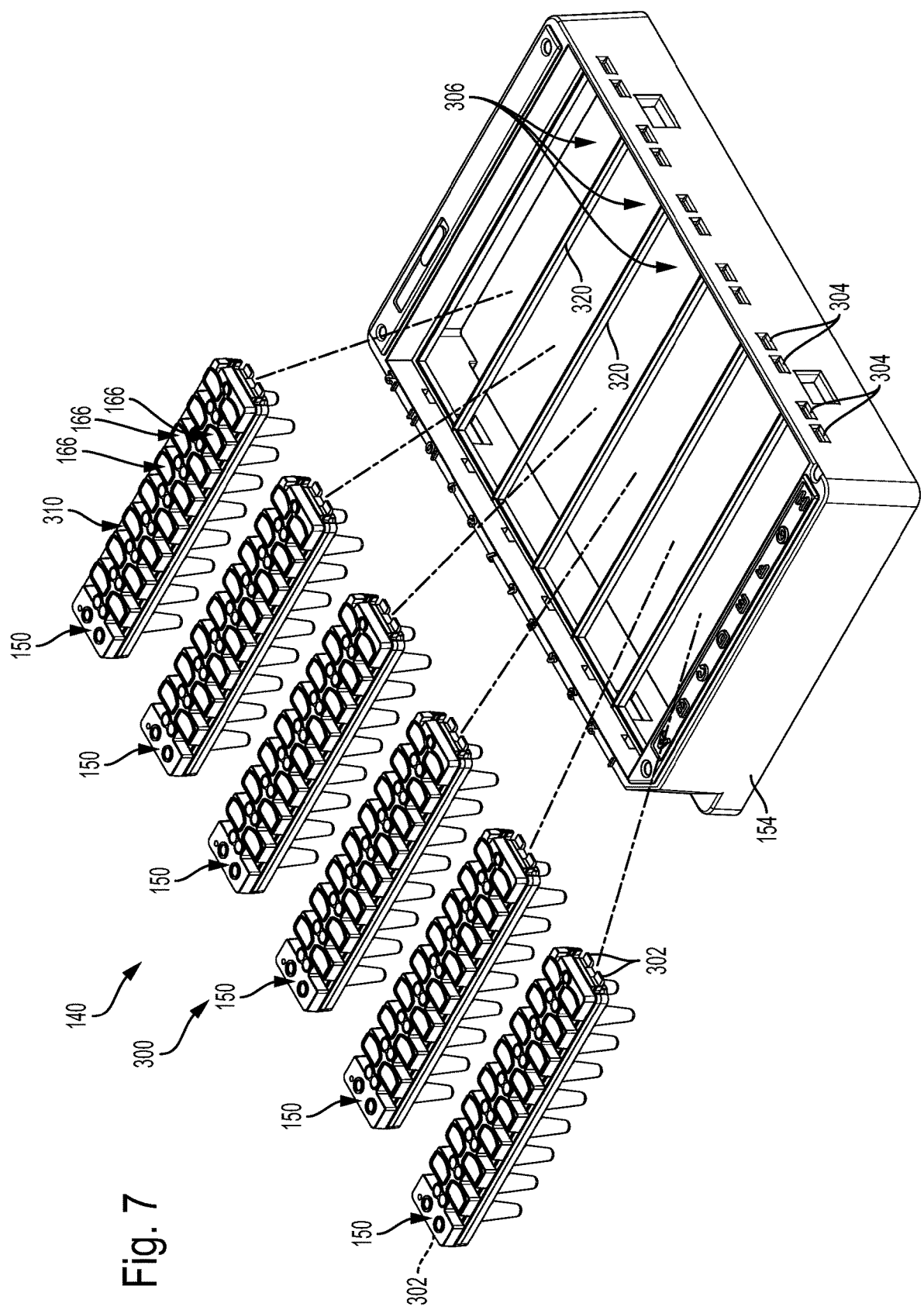
FIG. 7 is an exploded view of an exemplary microfluidic cartridge including a frame and six separate microfluidic modules mounted to the frame by snap-fit attachment, in accordance with aspects of the present disclosure.
Figure 8:
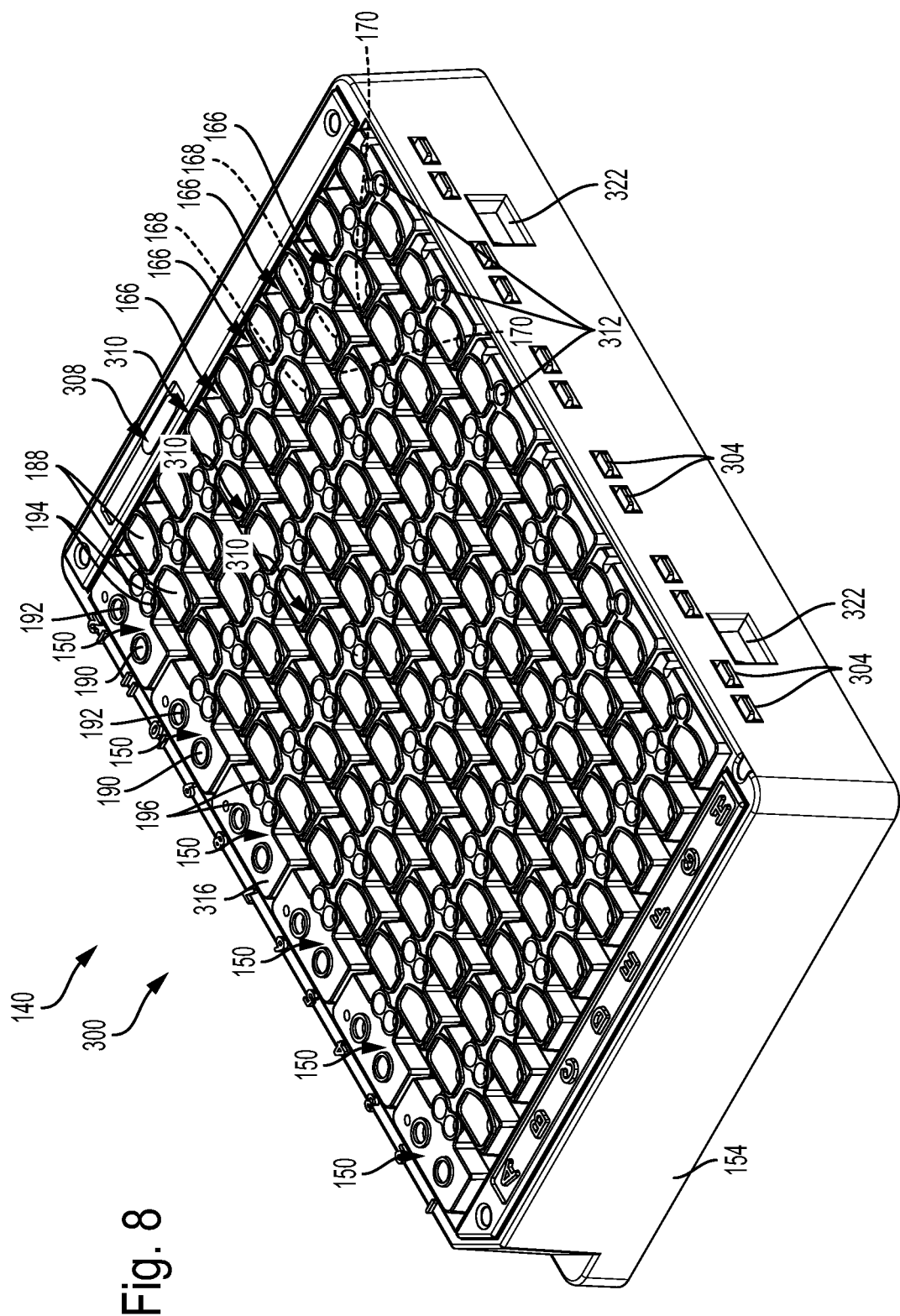
FIG. 8 is an assembled view of the microfluidic cartridge of FIG. 7 with each of the six separate microfluidic modules mounted to the frame.
Figure 10:
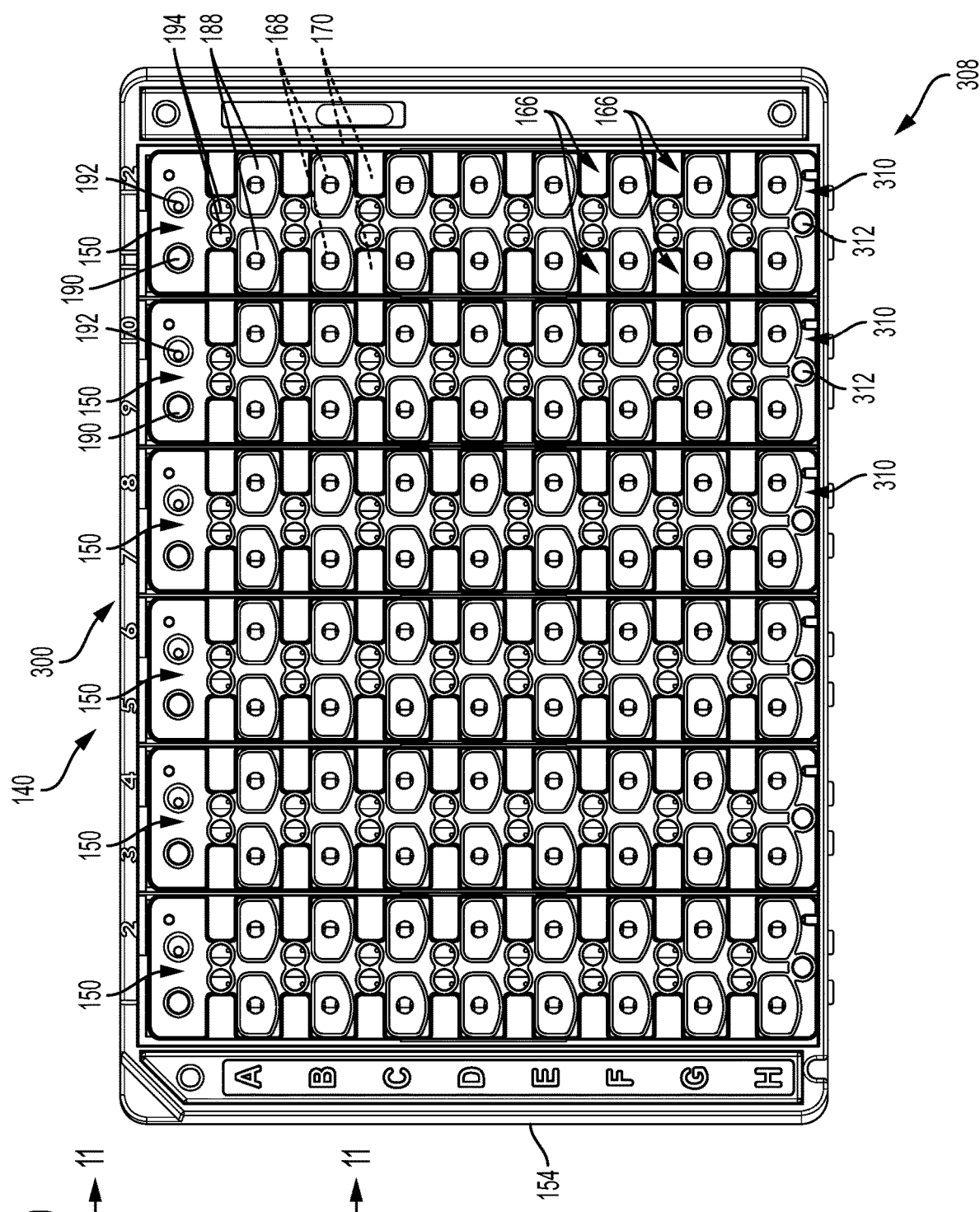
FIG. 10 is a plan view of the cartridge of FIG. 8.

Any suitable number of modules 150 may be mounted to frame 154 (see FIGS. 7, 8, and 10). For example, the frame of cartridge 300 forms six receiving sites 306 to hold up to six modules 150 (see FIG. 7), but may be used with only a subset of these sites filled. The modules may create a larger 2D (D=dimensional) array 308 of emulsion formation units 166 from a collection of smaller 1D or 2D arrays 310 of units 166 formed by the modules individually (see FIGS. 8 and 10). The positions of the emulsion formation units in an array may be defined by the locations of respective sample loading ports thereof. More particularly, each sample loading port may define a loading axis along while a pipette tip can be advanced through the port into an underlying sample reservoir.

Each array may be a rectangular array having rows and columns arranged orthogonally to one another. The rows may be uniformly spaced and/or the columns may be uniformly spaced. In some embodiments, the rows and columns may have the same spacing as one another.

Front-to-back rows of array 308 may be identified with numbers (1-12) on frame 154, and left-to-right rows of array 308 with letters (A-H), or vice versa (see FIGS. 8 and 10). In some embodiments, each module 150 may have at least one or at least two rows of exactly eight units 166 (see FIG. 7). In some embodiments, cartridge 300 may include or exactly provide an 8-by-2, 8-by-4, 8-by-6, 8-by-8, 8-by-10, or 8-by-12 array of units 166, each capable of forming a separate emulsion from a different sample fluid. Array 308 and/or array 310 and/or structures therein (e.g., sample reservoirs 168 and/or emulsion reservoirs 170 (see FIGS. 8 and 10)) may be arranged according to a microplate standard (e.g., American National Standards Institute (ANSI)—Society for Laboratory Automation and Screening (SLAS)). For example, emulsion formation units 166, sample reservoirs 168, and/or emulsion reservoirs 170 may have a substantially uniform, center-to-center spacing of within 10% or 5% of 4.5 mm, 9 mm, or 18 mm, among others, within each row of an individual module 150, between rows of the module, or between rows of different modules. A standard spacing of reservoirs facilitates transfer of fluid into and out of the reservoirs with standardized equipment, such as multi-channel pipettors for use with microplates.

FIGS. 8 and 10 show the exterior ports of cartridge 300, all of which may be accessible from the top side of the cartridge. These ports may include, for each module 150, an array of sample loading ports 188 (one sample port per emulsion formation unit 166) and a corresponding array of sample vent ports 194 (a dedicated sample vent port associated with each sample loading port 188 and sample reservoir 168). The module also may provide at least one carrier inlet port 190 at which carrier fluid enters the module, and at least one corresponding carrier vent port 312 at which air can escape when being forced out by carrier fluid entering the module via carrier inlet port 190. At least one vacuum/pressure port 192 also may be formed by the module. Negative pressure in the form of vacuum (i.e., negative gas pressure) may be applied at the vacuum/pressure port. Accordingly, this port will be called a vacuum port 192 for the remainder of this example.

Carrier inlet port 190, carrier vent port 312, and vacuum port 192 may have any suitable relative positions. For example, carrier inlet port 190 and carrier vent port 312 may be located near opposite ends of each module 150. Also, carrier inlet port 190 and vacuum port 192 may be located near the same end of the module or near opposite ends relative to one another.

Cartridge 300 may have a single carrier inlet port 190, a single carrier vent port 312, and/or a single vacuum port 192 for each module 150. If the cartridge contains two or more modules 150, each of these different types of port may be arranged in a respective row, which may be parallel to a lateral top edge of the frame. For example, in the depicted embodiment, carrier inlet ports 190 and vacuum ports 192 are arranged along one edge portion of the top side of the cartridge, and carrier vent ports 312 along the opposite edge portion of the top side.

Figure 11:
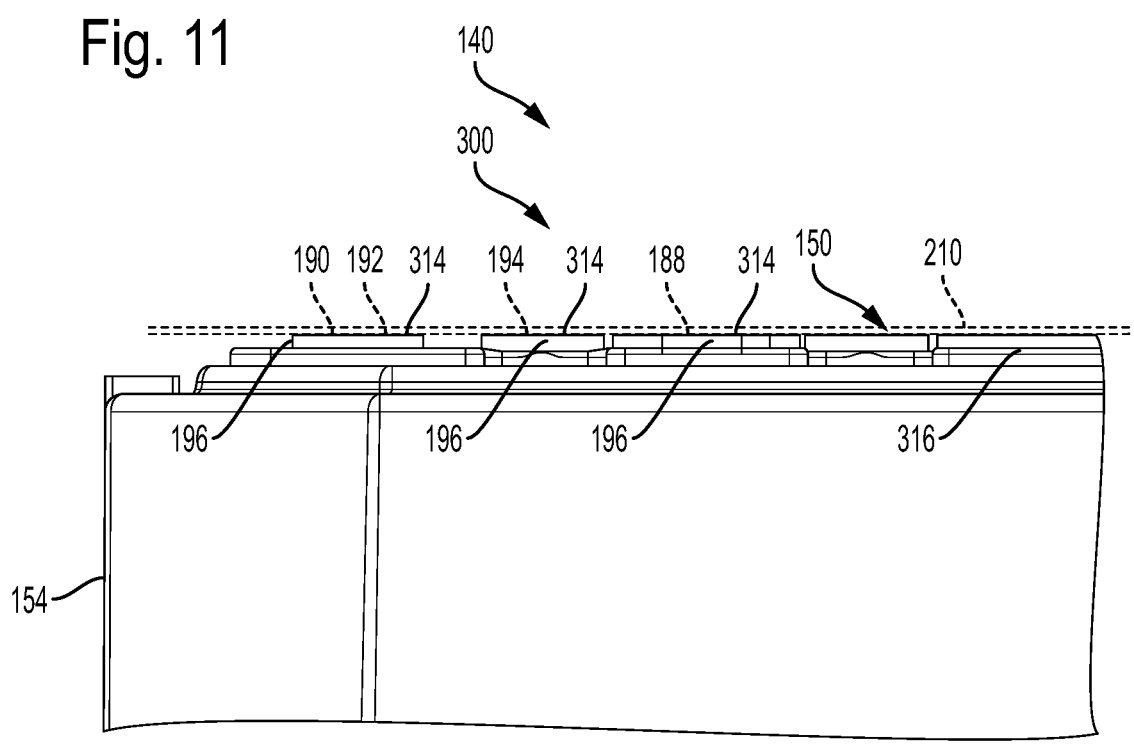
FIG. 11 is a fragmentary elevation view of the cartridge of 10, taken generally along line 11-11 of FIG. 10

The various ports of the cartridge, such as carrier inlet ports 190, vacuum ports 192, sample vent ports 194, sample ports 188, and carrier vent ports 312, may have respective top rims 314 that are coplanar with one another (see FIG. 11). Each port may have a rim 314 formed by a protrusion 196, such as a ridge, which may extend continuously around the port in a horizontal plane to encircle the opening and central axis of the port. One or more of the protrusions may encircle only a single port, and/or the same protrusion may encircle two or more of the ports (see below).

Figure 9:
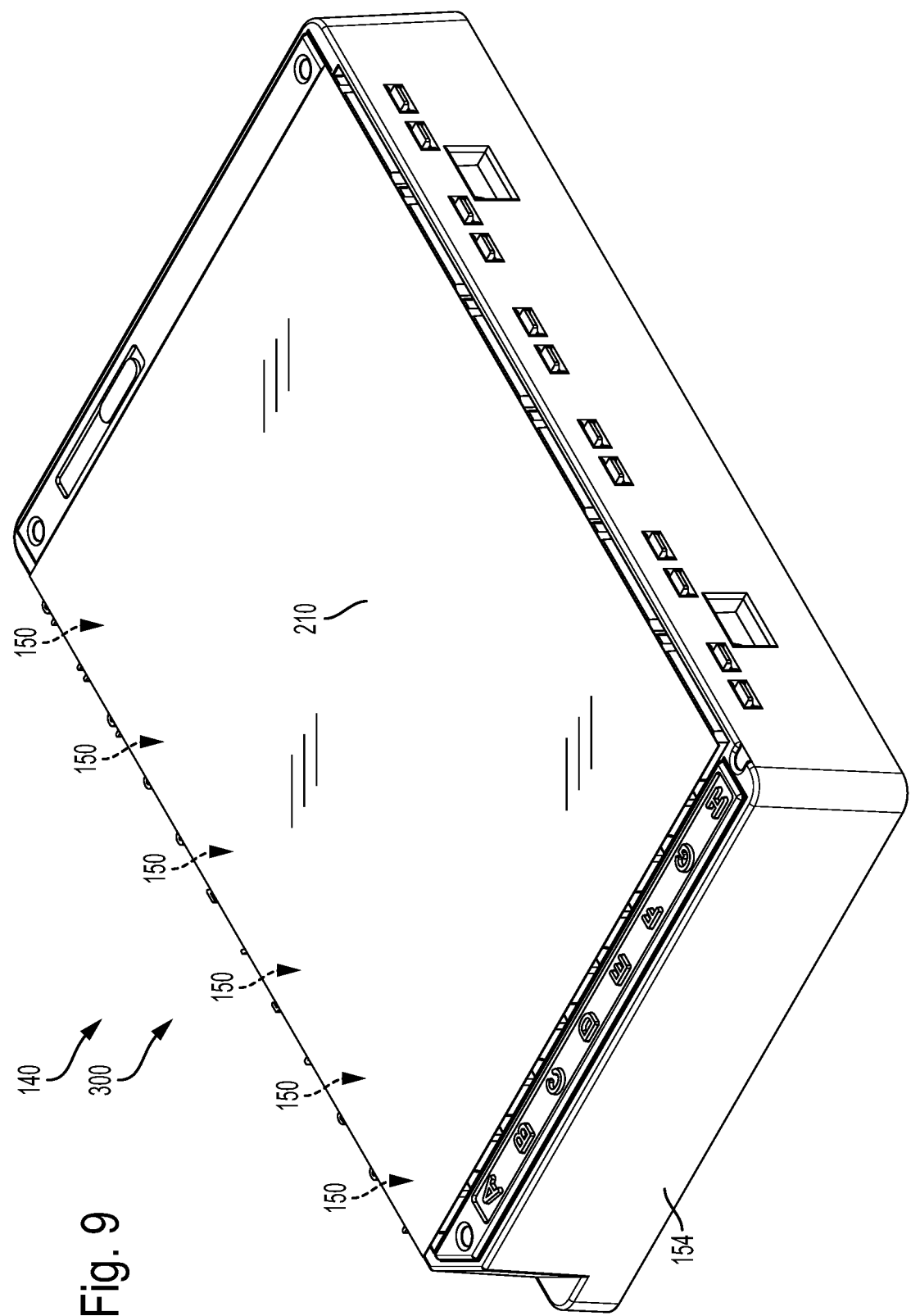
FIG. 9 is a view of the cartridge of FIG. 8, taken as in FIG. 8 after attachment of a sealing member to a top side of each of the microfluidic modules, to cover and seal every port, in accordance with aspects of the present disclosure.

FIG. 9 shows all of the ports of cartridge 300 covered and sealed by the same sealing member 210. The sealing member may be bonded to each protrusion 196 (see FIGS. 8 and 11) by application of heat and/or pressure to create a circumferential, hermetic seal at each port. Rims 314, protrusions 196, and/or the top of a module body 316 from which the protrusions project, may be located at a higher elevation than the top of frame 154, so that the frame does not interfere with application of sealing member 210 (see FIG. 11). The seal may be breached by the action of piercing members, as described in Section I, to open ports in preparation for emulsion formation, to block channels by deformation, and/or to remove fluid from each emulsion reservoir, among others. In some embodiments, sealing member 210 may cover and seal only a subset of the ports of a cartridge (e.g., see Examples 2 and 3).

Figure 12:
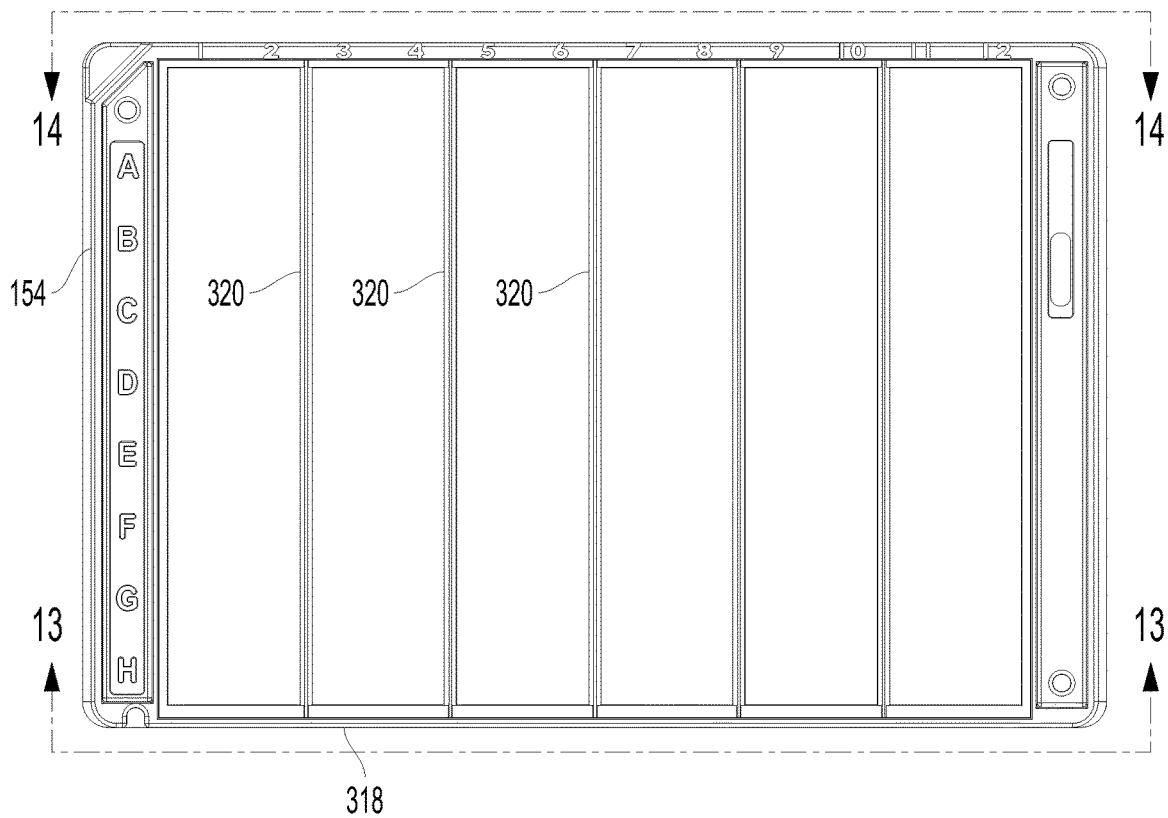
FIG. 12 is a plan view of the frame of the cartridge of FIG. 7, taken in isolation from the six microfluidic modules.
Figure 13:
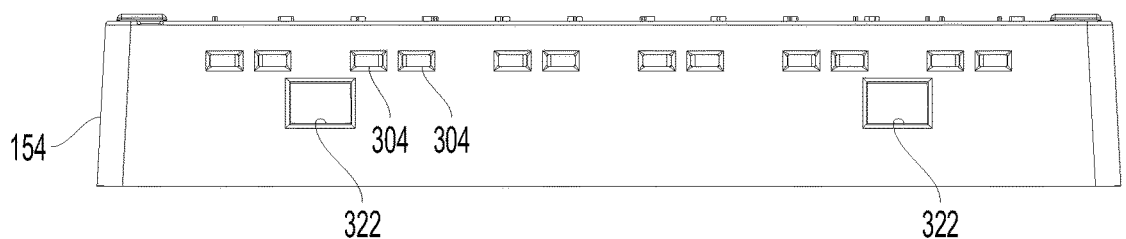
FIG. 13 is an elevation view of the frame of FIG. 12, taken generally along line 13-13 of FIG. 12.
Figure 14:
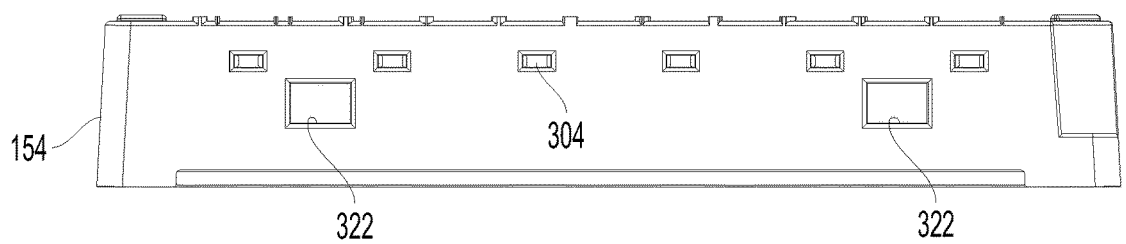
FIG. 14 is another elevation view of the frame of FIG. 12, taken generally along line 14-14 of FIG. 12.
Figure 15:
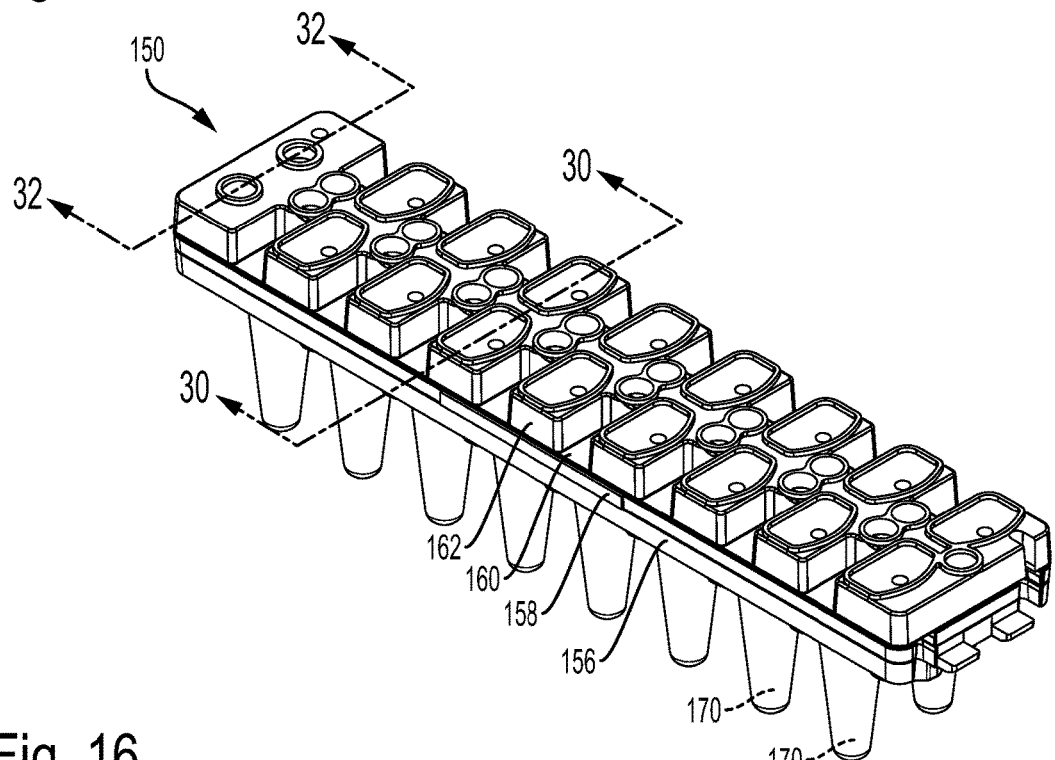
FIG. 15 is an isometric view of one of the six microfluidic modules of the cartridge of FIG. 7 taken in isolation.
Figure 16:
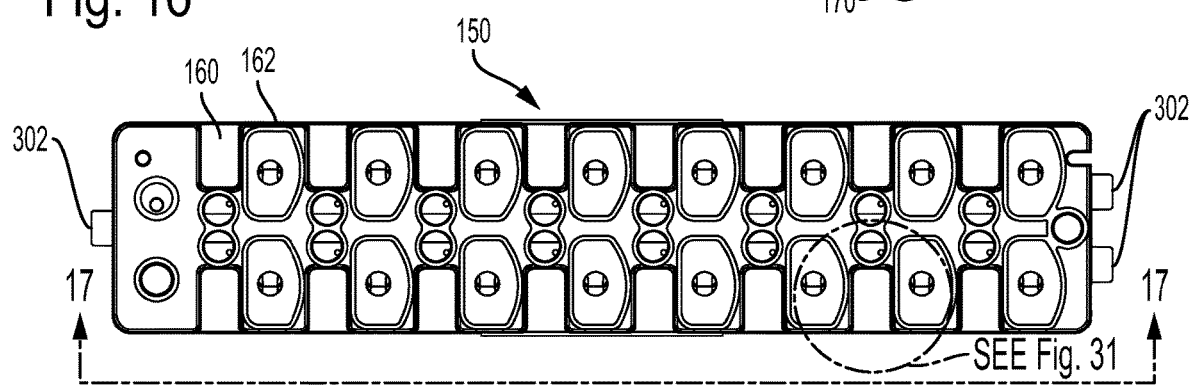
FIG. 16 is a plan view of the microfluidic module of FIG. 15.
Figure 17:
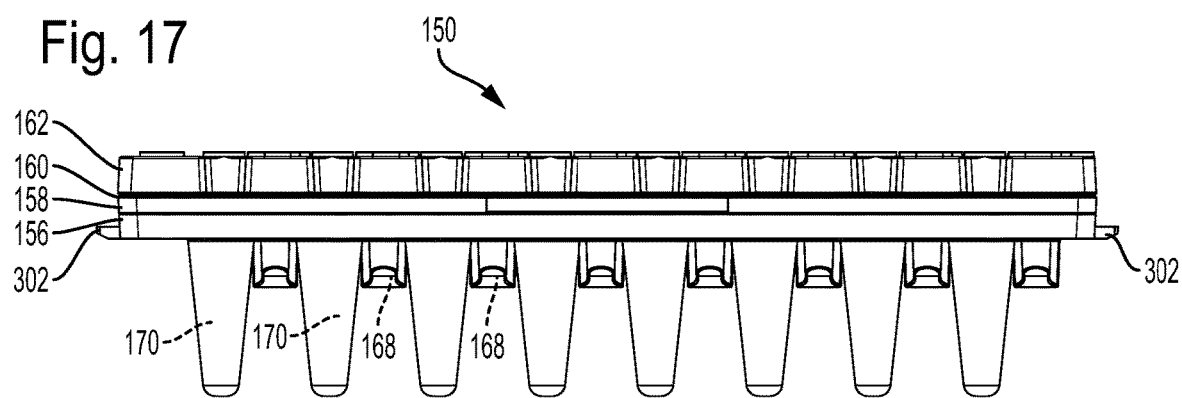
FIG. 17 is an elevation view of the microfluidic module of FIG. 15, taken generally along line 17-17 of FIG. 16.
Figure 18:
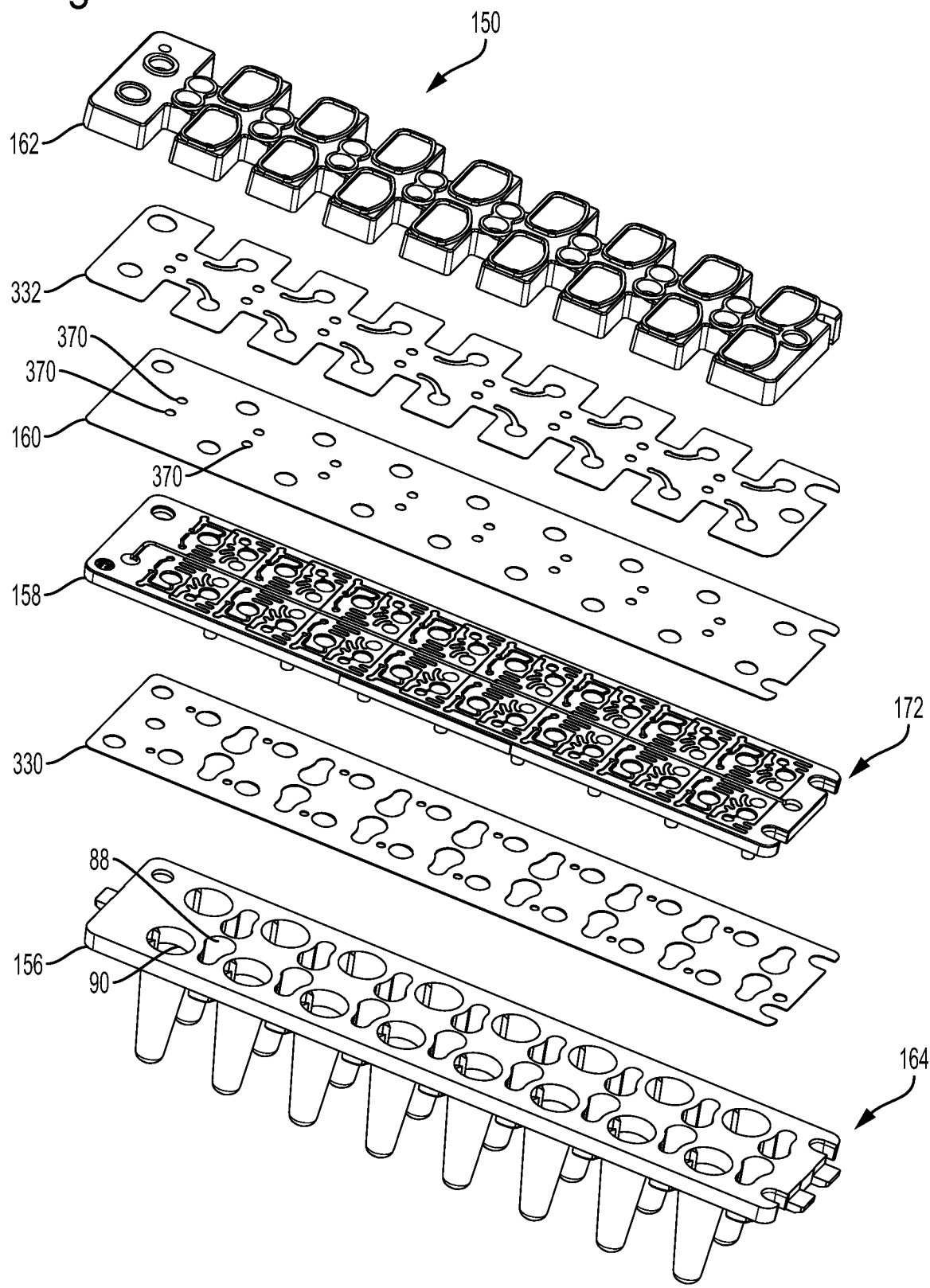
FIG. 18 is an exploded view of the microfluidic module of FIG. 15 illustrating each of the monolithic layers of the module.
Figure 19:
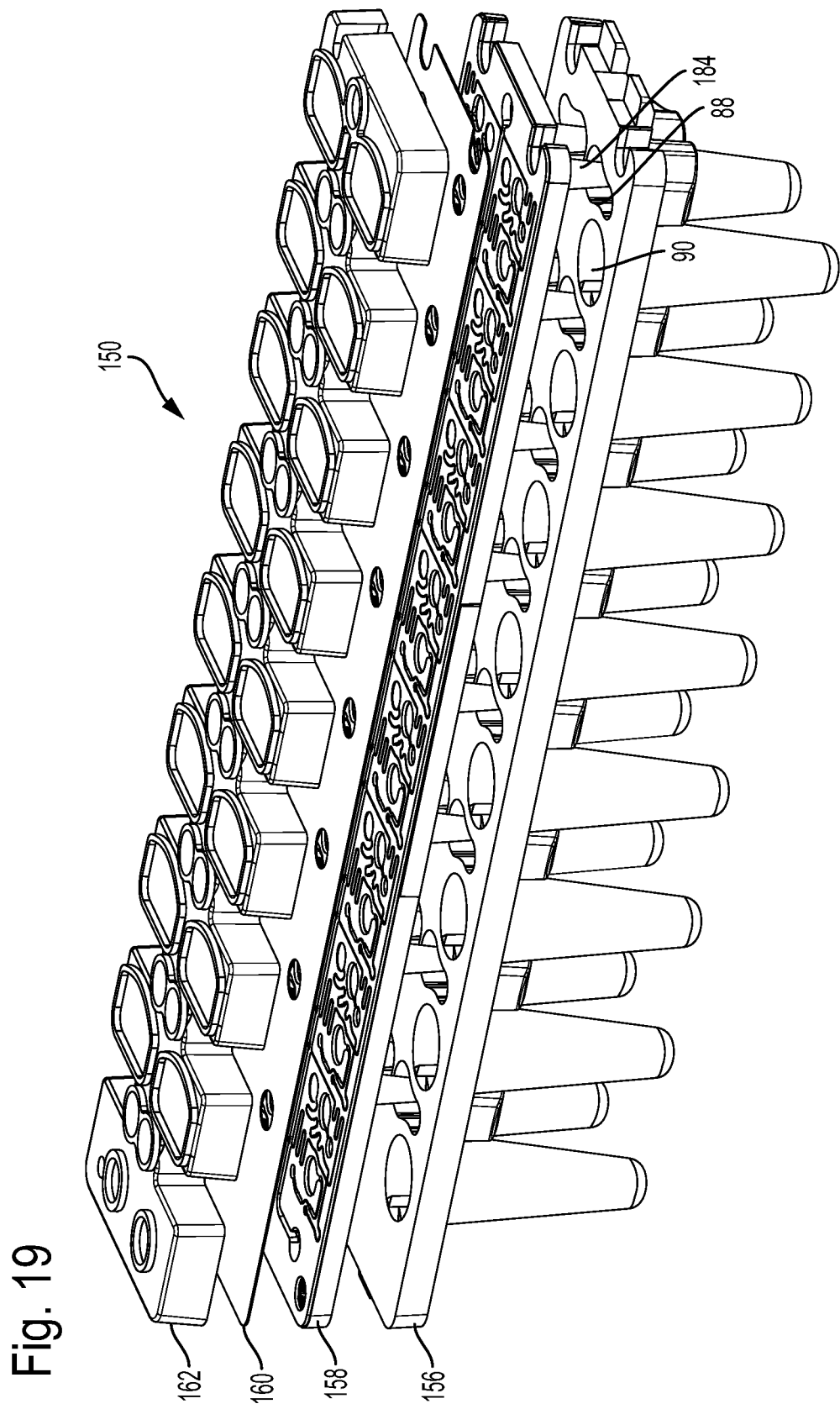
FIG. 19 is another exploded view of the microfluidic module of FIG. 15, with two adhesive bonding layers removed and with the remaining layers closer together than in FIG. 18 to illustrate how sample wells formed by a well layer receive intake tubes of an overlying channel layer.

FIGS. 12-14 show additional features of frame 154, which may be formed at least predominantly of polymer or metal. The frame may be rectangular, with an outer frame portion 318 forming four lateral sides, and a plurality of spanning members 320 each attached to opposite lateral sides of the frame portion. Spanning members 320 may help to rigidify the frame. Frame 154 may define various apertures, including lateral slots 304 for attachment of modules 150, as described above, and receivers 322 to facilitate manipulation by a robotic cartridge handler.

FIGS. 15-19 show assembled and exploded views of a single module 150 in isolation. The module may include a vertical stack of layers bonded together. The layers, from bottom to top, may include a well layer 156, a channel layer 158, a capping layer 160, and a guide/port layer 162. Any of these layers may include or be bonded to one another with an intermediate bonding layer, which may be very thin relative to some or all of the other layers. For example, well and channel layers 156, 158 may be bonded to one another using a lower bonding layer 330, and capping layer 160 may be bonded to guide/port layer 162 with an upper bonding layer 332 (see FIG. 18). Well layer 156 alone or in combination with lower bonding layer 330 may be described as a well layer or well component 164. Channel layer 158 alone or in combination with lower bonding layer 330 and/or capping layer 160 may be described as a channel layer or channel component 172. Openings extending through the layers, from a top side to a bottom side thereof, determine how the various layers may fluidically interface with one another, as described in more detail below, and partially in U.S. Patent Application Publication No. 2014/0378348 A1, published Dec. 25, 2014, which is incorporated herein by reference.

Figure 20:
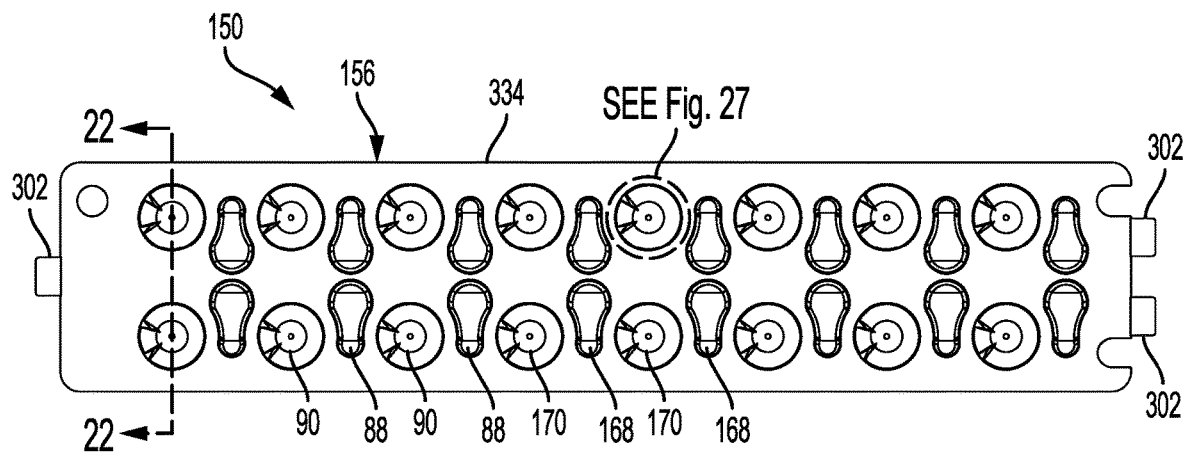
FIG. 20 is a plan view of the well layer of FIGS. 18 and 19.
Figure 21:
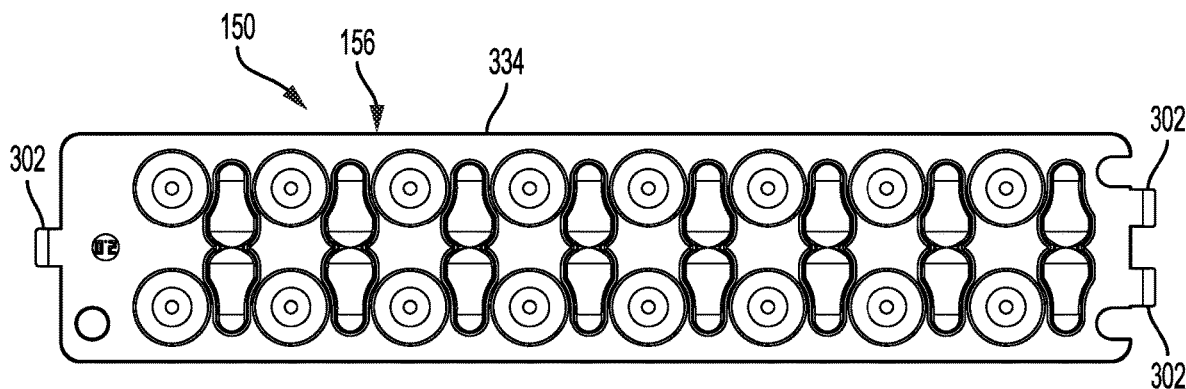
FIG. 21 is a bottom view of the well layer of FIG. 20.

FIGS. 20 and 21 show top and bottom views of well layer 156. The well layer may be formed of polymer, such as by injection molding, and defines an array of sample wells 88 and a corresponding array of emulsion wells 90. As described in Section I, each sample well 88 forms at least a lower portion of a sample reservoir 168, and each emulsion well 90 forms at least a lower portion of an emulsion reservoir 170. A planar body 334 formed integrally with the wells provides a top bonding surface. The planar body may have any suitable thickness, such as about 1-5 mm, among others. Tabs 302 may project from opposite ends of body 334 (or from a different layer of the module, such as channel layer 158 or guide/port layer 162, among others), and may be formed integrally with the body.

Figure 22:
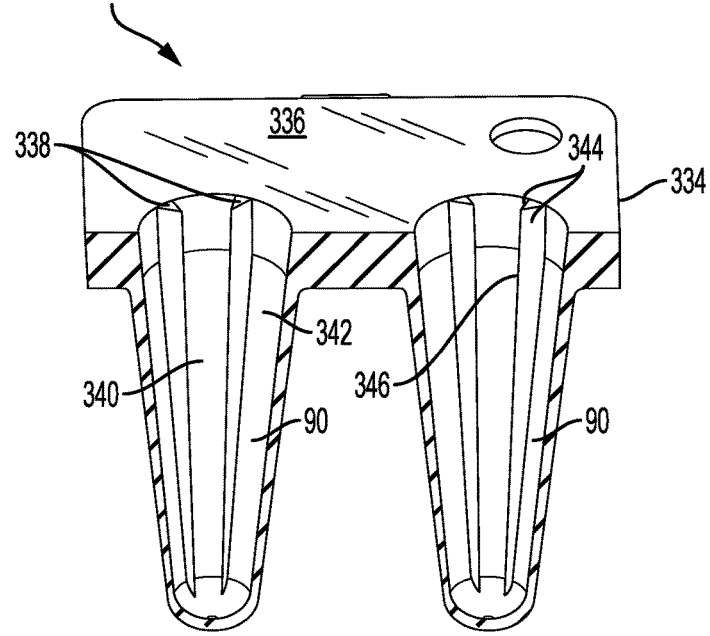
FIG. 22 is a sectional view of the well layer of FIG. 20, taken generally along line 22-22 with the section plane not exactly vertical.
Figure 23:
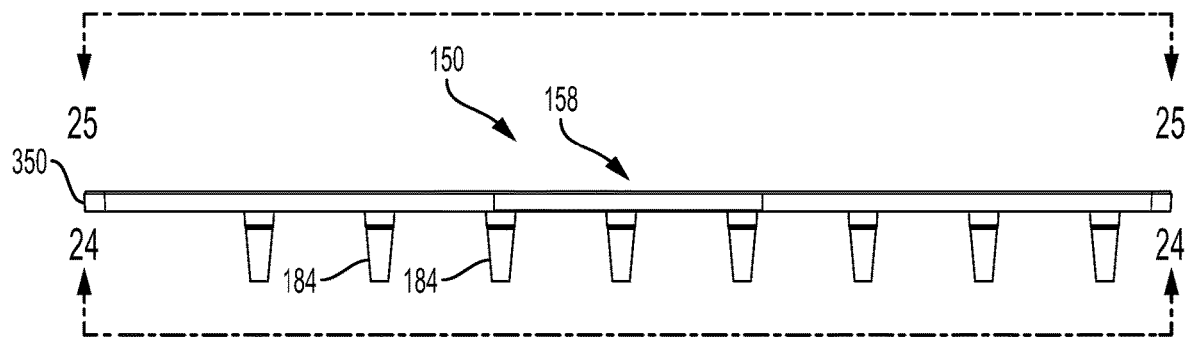
FIG. 23 is an elevation view of the channel layer of FIGS. 18 and 19.
Figure 24:
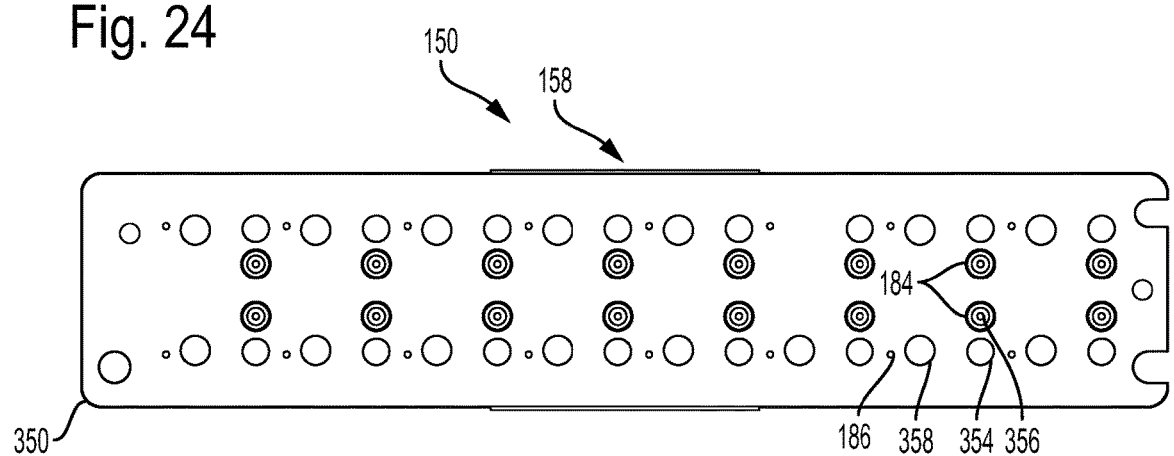
FIG. 24 a bottom view of the channel layer of FIG. 23, taken generally along line 24-24 of FIG. 23.
Figure 25:
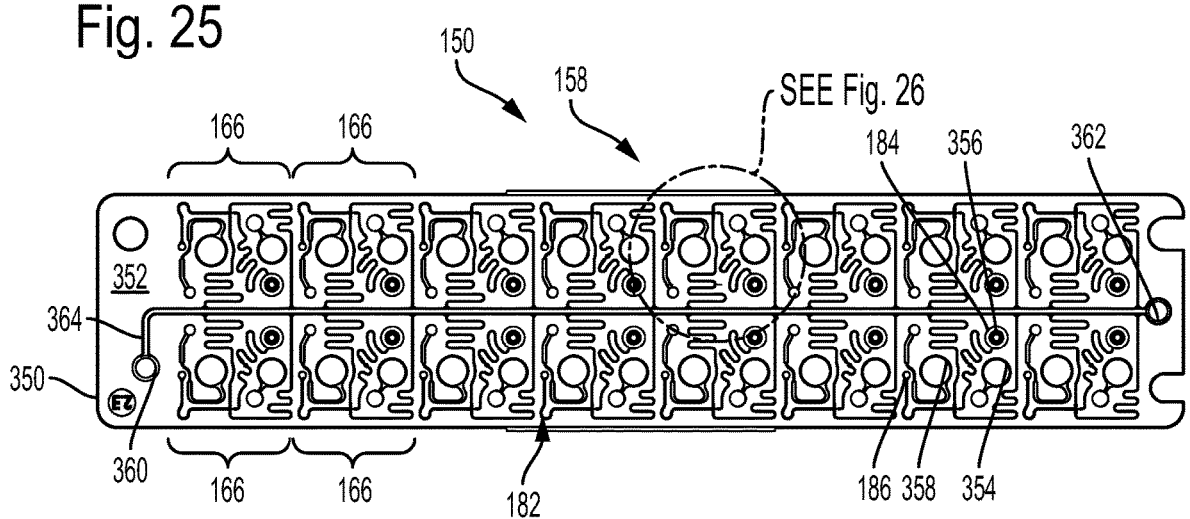
FIG. 25 a top view of the channel layer of FIG. 23, taken generally along line 25-25 of FIG. 23.

FIG. 22 shows a sectional view of well layer 156 taken through a pair of emulsion wells 90. The plane of the section is only approximately vertical, such that a top surface 336 of the well layer is visible. Each emulsion well 90 may have a pair of baffles 338 extending from an upper portion to a lower portion of the well. Baffles 338 may be spaced horizontally from one another, at least in an upper portion of well 90, to form a chute 340. The chute guides the incoming emulsion downward in the well, while restricting lateral migration of the emulsion in a circumferential direction around the inside of the well. Without baffles 338, a larger proportion of the emulsion wets the upper surface region of the well and fails to flow downward to join the collected bulk volume of the emulsion. As a result, the collected bulk volume is smaller, and droplets that are separate from the bulk volume when thermal cycling is initiated can introduce error into assay results. For example, these droplets may not be thermally cycled properly or may be more susceptible to damage (e.g., fusion with one another, shrinkage, fragmentation, etc.).

Each baffle 338 may have any suitable structure. The baffle may be a ridge that protrudes inward, such as radially inward, from a body surface 342 of the well. The ridge may be elongated, and may extend along any suitable portion, such as majority or all, of the height of the well. The ridge may have a pair of elongated walls 344 that meet one another to create an edge 346, which may be relatively sharp. For example, the angle between the walls of each baffle may be less than 90 degrees, such as less than 80, 70, 60, 50, or 45 degrees, among others. The presence a sufficiently sharp edge restricts the ability of the emulsion to leave the chute in a circumferential direction by wetting past the sharp edge to outer wall 344 that is outside chute 340.

FIGS. 23-26 show various views of channel layer 158. The channel layer may include a planar body 350 and a plurality of intake tubes 184 (also called sippers or straws)

projecting from the bottom surface of body 350 (and into respective sample reservoirs of well layer 156 (also see FIG. 19)). The channel layer may be formed of polymer, such as by injection molding. Body 350 may have any suitable thickness, such as 1-5 mm, among others. A microfluidic channel network 182 may be formed by open channels (as grooves) in a top surface 352 of body 350. The channels are capped by capping layer 160 (see FIGS. 18 and 19), such that each channel is bounded circumferentially (see FIG. 25). In other words, channel layer 158 may form the floor and at least a portion of the lateral side walls of each channel of network 182, and capping layer 160 may form at least the ceiling of each channel. (The capping layer may have substantially featureless top and bottom surfaces.)

Apertures or passages extending through channel layer 158, between top and bottom sides thereof, provide fluid communication between channel network 182 and reservoirs 168, 170 (also see FIG. 20). A respective sample aperture 354 and a respective passage 356 are vertically aligned with each sample reservoir 168. The sample aperture is also aligned with, and/or optionally considered a lower part of, a sample port 188 for the sample reservoir (e.g., see FIG. 8 and below). Passage 356 is arranged laterally to sample aperture 354 and forms an inlet of tube 184 near the bottom of the sample reservoir (see FIG. 3 and below). A respective emulsion inlet 186 and a respective emulsion outlet 358 are vertically aligned with, disposed over, and adjoin each emulsion reservoir 170.

Carrier apertures 360, 362 extending through body 350 of channel layer 158 may be vertically aligned with, and, optionally, considered a lower part of, carrier inlet port 190 and carrier vent port 312, respectively (see FIG. 25) (also see FIGS. 8 and 10). Apertures 360, 362 may be located at opposite ends of a main carrier line 364 of channel network 182 that feeds oil to each emulsion formation unit 166 of the module (see FIGS. 25 and 26).

Figure 26:
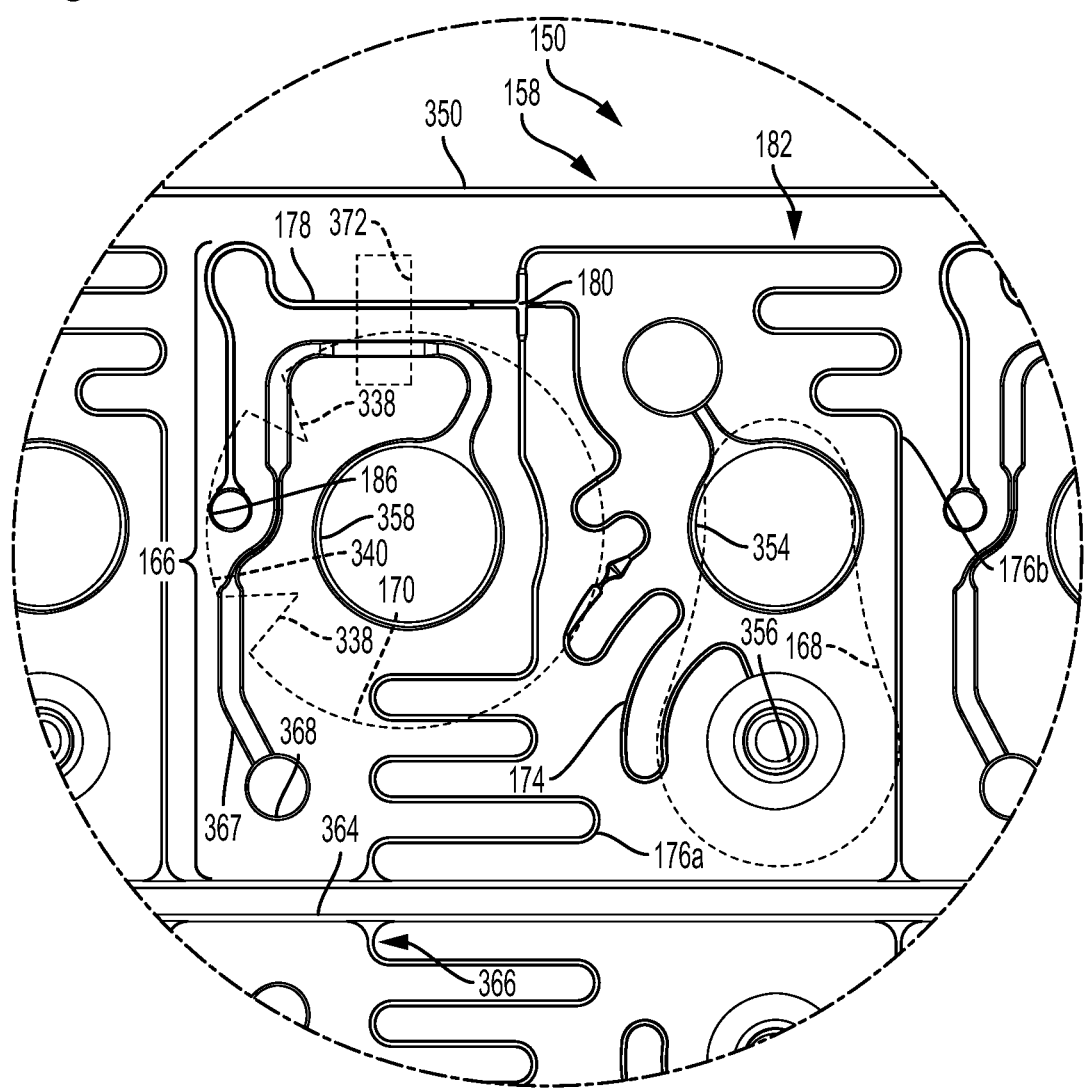
FIG. 26 is a fragmentary view of the channel layer of FIG. 25, taken generally around the region indicated in FIG. 25 and showing channels and apertures of the module that are dedicated to a single emulsion formation unit.
Figure 27:
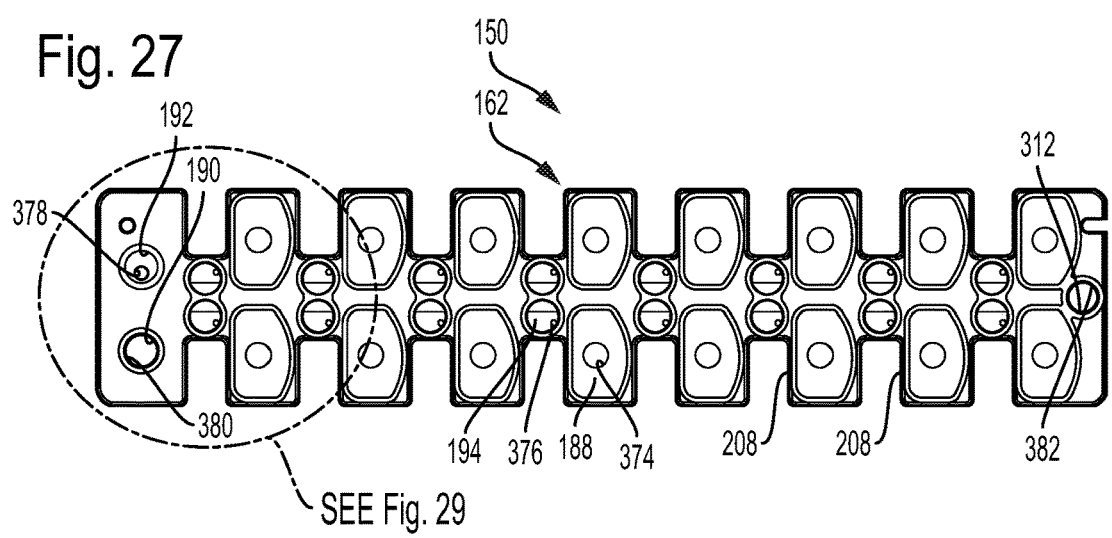
FIG. 27 is a plan view of a guide/port layer of the microfluidic module of FIG. 15.

FIG. 26 shows a portion of channel network 182 for a single emulsion formation unit 166. The sample reservoir 168 and emulsion reservoir 170 of unit 166 under the channel network are shown in dashed outline, which represents the top inside perimeter of each reservoir. A sample channel 174, at least one carrier channel (two carrier channels 176a, 176b are shown here), and a droplet channel 178 meet one another at a channel junction 180. The channel junction functions as a site of droplet generation at which a stream of sample fluid is segmented by carrier fluid, such as by shearing or flow focusing, to form droplets. Sample fluid is received from a sample reservoir 168 under unit 166 via passage 356, which is defined in part by tube 184. Carrier fluid is received in carrier channels 176a, 176b from at least one main carrier line 364. The carrier channels of each unit 166 branch from the main carrier line to create, with the main carrier line, a carrier manifold 366 serving each emulsion formation unit 166 of the module. Droplets formed at channel junction 180 travel in droplet channel 178 to emulsion inlet 186, which communicates with, and optionally adjoins, an emulsion reservoir 170 under the unit 166. The emulsion collected in emulsion reservoir 170 may be removed later through emulsion outlet 358, after capping layer 160 over the outlet has been breached.

Additional features of channel network 182 are also shown here. A vacuum channel 367 provides fluid communication between and is fluidically intermediate an overlying vacuum manifold 204 (see below) and underlying emulsion reservoir 170. More specifically, an enlarged end region 368 of vacuum channel 367 is vertically aligned with and adjoins an aperture 370 defined by capping layer 160 (several apertures 370 are labeled in FIG. 18). Each aperture 370 communicates with the overlying vacuum manifold as described below. Vacuum from a vacuum source can be applied to each emulsion reservoir via the vacuum manifold, each aperture 370, and each vacuum channel 367. A deformation region 372 of the channel network that can be deformed to seal emulsion reservoir 170 in preparation for thermal cycling is marked in dashed outline. The deformation blocks fluid flow (and evaporation) from emulsion inlet 186 via droplet channel 178 and from emulsion outlet 358 via vacuum channel 367.

An exemplary positional relationship between emulsion inlet 186, emulsion outlet 358, and baffles 338 is shown here (also see FIG. 22). Emulsion inlet 186 is vertically aligned with chute 340 created by the baffles and may be close to the top inside perimeter of emulsion reservoir 170. The baffles may be spaced from one another by a fraction of the circumference of the emulsion reservoir, such by less than one-half or one-third of the circumference. Emulsion outlet 358 may be coaxial with emulsion reservoir 170, to facilitate reaching the bottom of the reservoir with the inlet end of a pipette when emulsion is being removed, such as for travel through a detection module.

FIGS. 27-32 show exemplary aspects of guide/port layer 162 and its relationship to underlying layers of module 150 and to instrument 260 (also see FIG. 6).

Layer 162 may be formed of polymer, such as by injection molding. The layer may define at least an upper or outer portion of each sample loading port 188 and each sample vent port 194 and may define a corresponding through-hole 374 or 376 that extends through the layer between top and bottom sides thereof. Each through-hole 374 may overlap (and, optionally, be arranged coaxially with) a corresponding sample aperture 354 of channel layer 158 (also see FIGS. 24-26). Through-hole 376 may not communicate with channel network 182 of the module except via sample reservoir 168. More particularly, a bottom side of guide/port layer 162 may define a vent channel 377 of each unit 166 that provides fluid communication between the sample loading port and sample vent port (see FIG. 28). After each sample loading port 188 and each sample vent port 194 is sealed at the top with sealing member 210 (also see FIGS. 9 and 11), piercing the sealing member at each vent port acts to vent each of the sample reservoirs for emulsion formation, with reduced chance of instrument contamination and/or cross contamination of sample fluid among units 166 and/or among modules. More particularly, sample loading port surfaces that may have been contacted with sample fluid remain covered with an intact (not breached) region of the sealing member, while the sample vent port that is opened by piercing the sealing member is generally never contacted with sample fluid during loading.

The minimum diameter of each through-hole 374 or 376 may be substantially smaller than its maximum diameter or width. For example, the minimum diameter of through-hole 374 may be less than one-half of one-third the maximum diameter of the through-hole due to a taper. This taper guides a pipette tip into the underlying sample reservoir as described above in Section I. Also, or alternatively, the minimum diameter of through-hole 376 may be less than 50%, 33%, 25%, or 20% of the maximum diameter of the through-hole, due to a stepwise decrease (as shown here) and/or a taper. This difference reduces the chance that any contaminant will enter the sample reservoir via the sample vent port and that any sample fluid will escape via the sample vent port.

Layer 162 also may define at least an upper portion of carrier inlet port 190, vacuum port 192, and carrier vent port 312. Accordingly, the layer may define a respective through-hole 378, 380, 382 for each of these ports. The minimum diameter of each through-hole 378, 380, 382 may or may not be substantially smaller than its maximum diameter, such as less than two-thirds, one-half, or one-third the maximum diameter.

Figure 28:
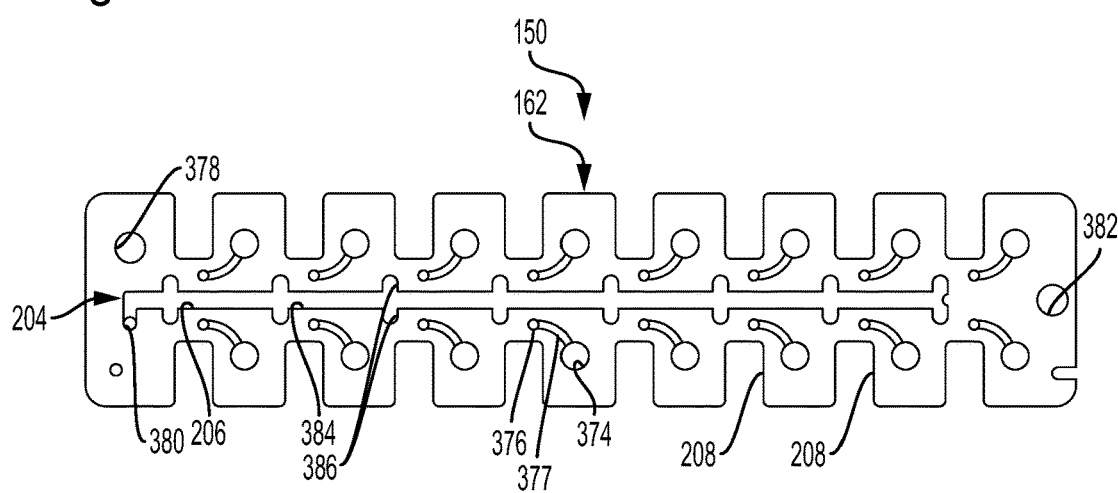
FIG. 28 is a bottom view of the guide/port layer of FIG. 27.

Through-hole 378 may communicate with a vacuum manifold 204 of the module 150 (see FIG. 28). The vacuum manifold may be formed at least in part by a channel structure 206 defined by the bottom side of layer 162, which is covered and sealed from below with an underlying layer, such as upper bonding layer 332 and/or capping layer 160 (also see FIG. 18). Channel structure 206 may have a main vacuum line 384 extending from through-hole 380 and a plurality of side branches 386, namely, one for each unit 166. Each side branch 386 may overlap and communicate with an aperture 370 defined by capping layer 160 (also see FIG. 18) and end region 368 of one of vacuum channels 367 (also see FIG. 26). Accordingly, application of vacuum to a single vacuum port 192 of module 150 results in vacuum being applied to each of the emulsion reservoirs in parallel via vacuum manifold 204 of the module.

Each of through-holes 378, 380, 382 (and thus ports 190, 192, and 312) may or may not communicate with channel network 182 before any of the layers of module 150 are pierced. In the depicted embodiment, each of through-holes 378, 382 is separated from corresponding carrier apertures 360, 362 of channel layer 158 by capping layer 160. The capping layer thus may need to be pierced via carrier inlet port 190 and carrier vent port 312, as described further below, in order to supply carrier fluid to the carrier manifold of the module. This arrangement minimizes the chance of contamination inside the module.

Figure 29:
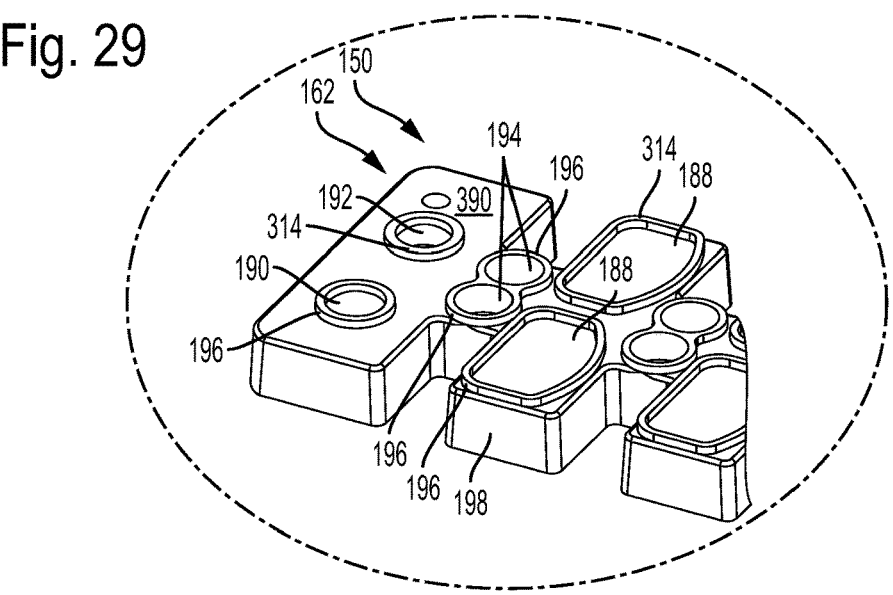
FIG. 29 is an isometric, fragmentary view of the guide/port layer of FIG. 27, taken generally around the region indicated in FIG. 27 and showing a carrier inlet port, a vacuum port, two pairs of sample vent ports, and a pair of sample loading ports, with each of the various ports having a rim formed by a ridge at a top end thereof.

FIG. 29 shows port protrusions 196 formed by layer 162. Each of protrusions 196 may encircle a central axis of a port (and/or a corresponding through-hole defined by layer 162 as described above). The protrusion may protrude from a body 198 of layer 162 to form a top rim 314 at a border of at least one port. The top rim may, for example, be planar, or may be rounded in cross section, among others. Body 198 may have a top surface 390 that is substantially planar and arranged horizontally. At least a subset of the protrusions may encircle only one port. For example, in the depicted embodiments, protrusions 196 at sample loading ports 188, carrier inlet port 190, vacuum port 192, and carrier vent port 312 are all separate from one another and sample vent ports 194. Also, or alternatively, at least a subset of the protrusions may encircle at least two ports. For example, a single protrusion 196 encircles each of a pair of adjacent sample vent ports 194. Protrusions 196 that are dedicated to single ports reduce the risk of cross contamination and/or leakage between ports.

Figure 30:
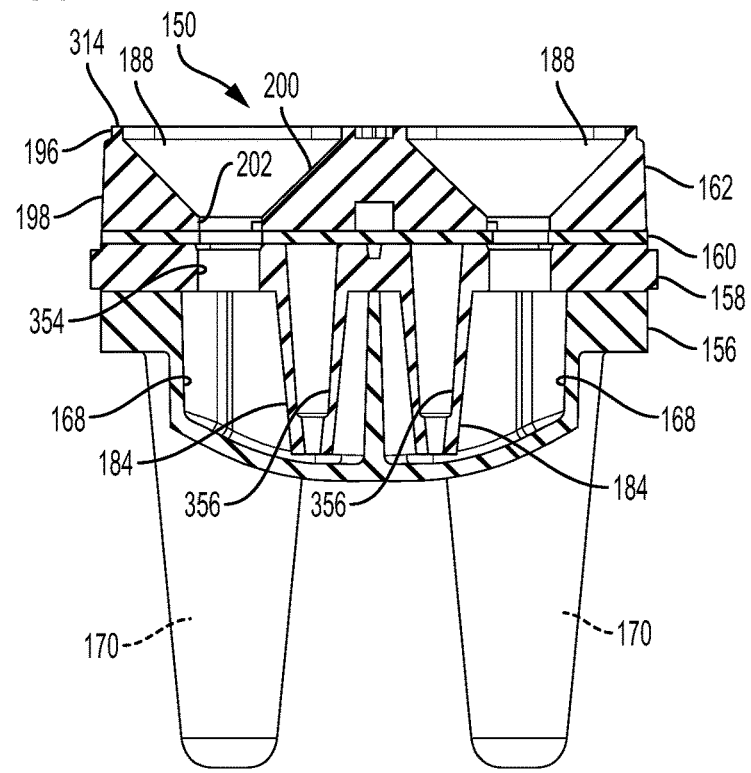
FIG. 30 is a sectional view of the microfluidic module of FIG. 15, taken generally along line 30-30 of FIG. 15.

FIG. 30 shows a sectional view of module 150 taken through a pair of sample loading ports 188. Layer 162 forms a tapered region 200 that guides the end of a pipette into corresponding sample reservoir 168. Tapered region 200 may have any suitable taper, forming an angle of less than 70, 60, or 50 degrees with a plane of the module or guide/port layer. A neck region 202 where sample loading port 188 has a minimum diameter is located under the tapered region and may be defined by guide/port layer 162, capping layer 160, and/or channel layer 158. The relative positions of tubes 184 and passages 356 are also shown. Channels of channel network 182 formed by the top side of channel layer 158 are too small to be visible in this view.

Figure 31:
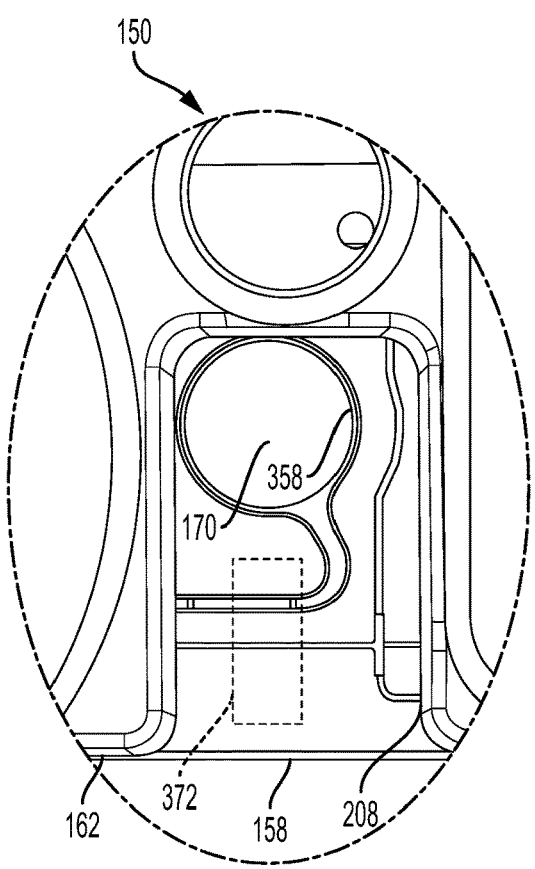
FIG. 31 is a fragmentary plan view of the microfluidic module of FIG. 16, taken generally around the region indicated in FIG. 16, with a capping layer of the module invisible, and with the view showing an access region structured as a lateral notch defined by the guide/port layer over an emulsion reservoir, to avoid obstructing access to the capping layer over the reservoir and associated channels.

Port/guide layer 162 also may define a plurality of openings 208 that overlap each of units 166, and particularly at least a portion of each emulsion outlet 358 (see FIGS. 27-29 and 31). The openings may be notches defined by the lateral periphery of layer 162, as shown in the depicted embodiment, or may be windows that are bordered by layer 162 on all lateral sides of each window (see Examples 2 and 3). FIG. 31 shows a portion of module 150 without capping layer 160. Emulsion outlet 358 and deformation region 372 are not covered or obstructed by layer 162 due to the presence of opening 208 (also see FIG. 26).

Figure 32:
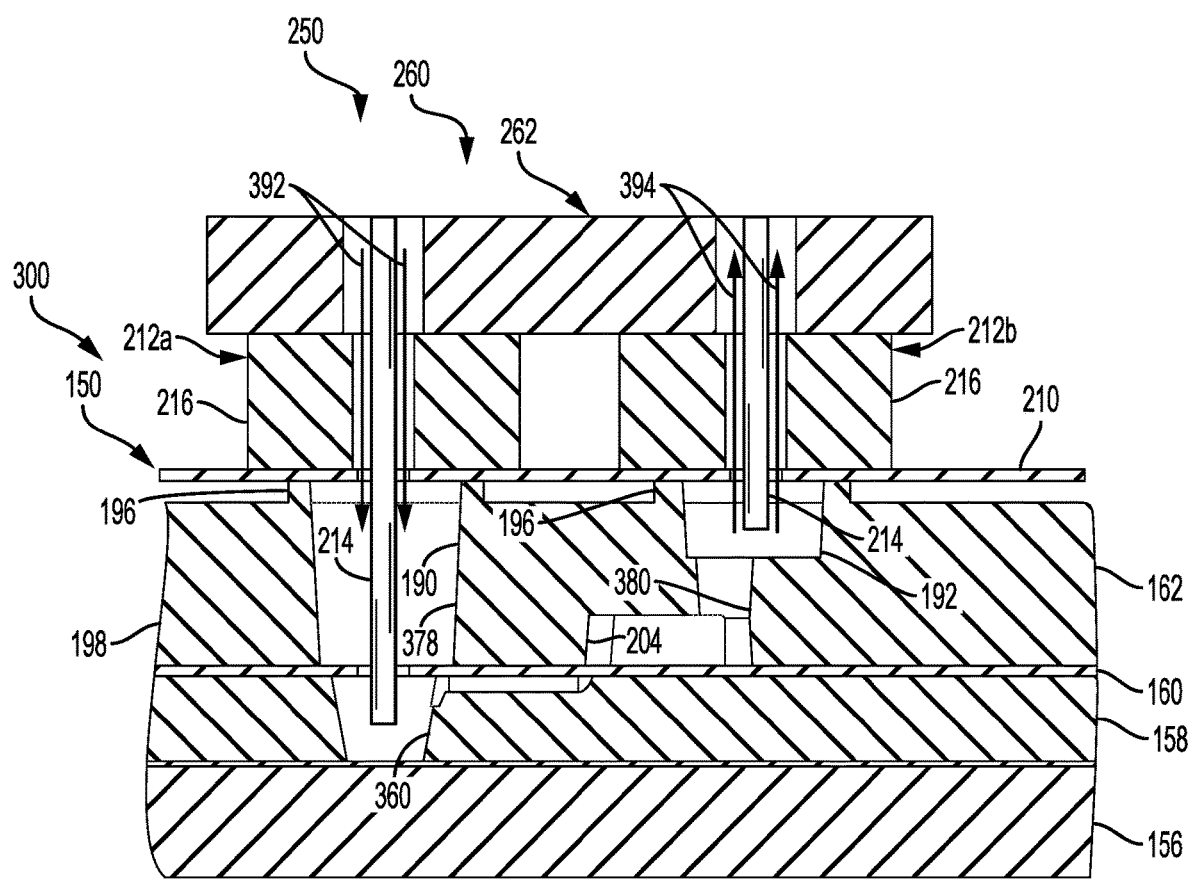
FIG. 32 is a sectional view of the microfluidic module of FIG. 15, taken generally along line 32-32 of FIG. 15 after attachment of a sealing member and operative association with an instrument fluidics head that has pierced and engaged the sealing member at the carrier inlet port and the vacuum port of the module.
Figure 33:
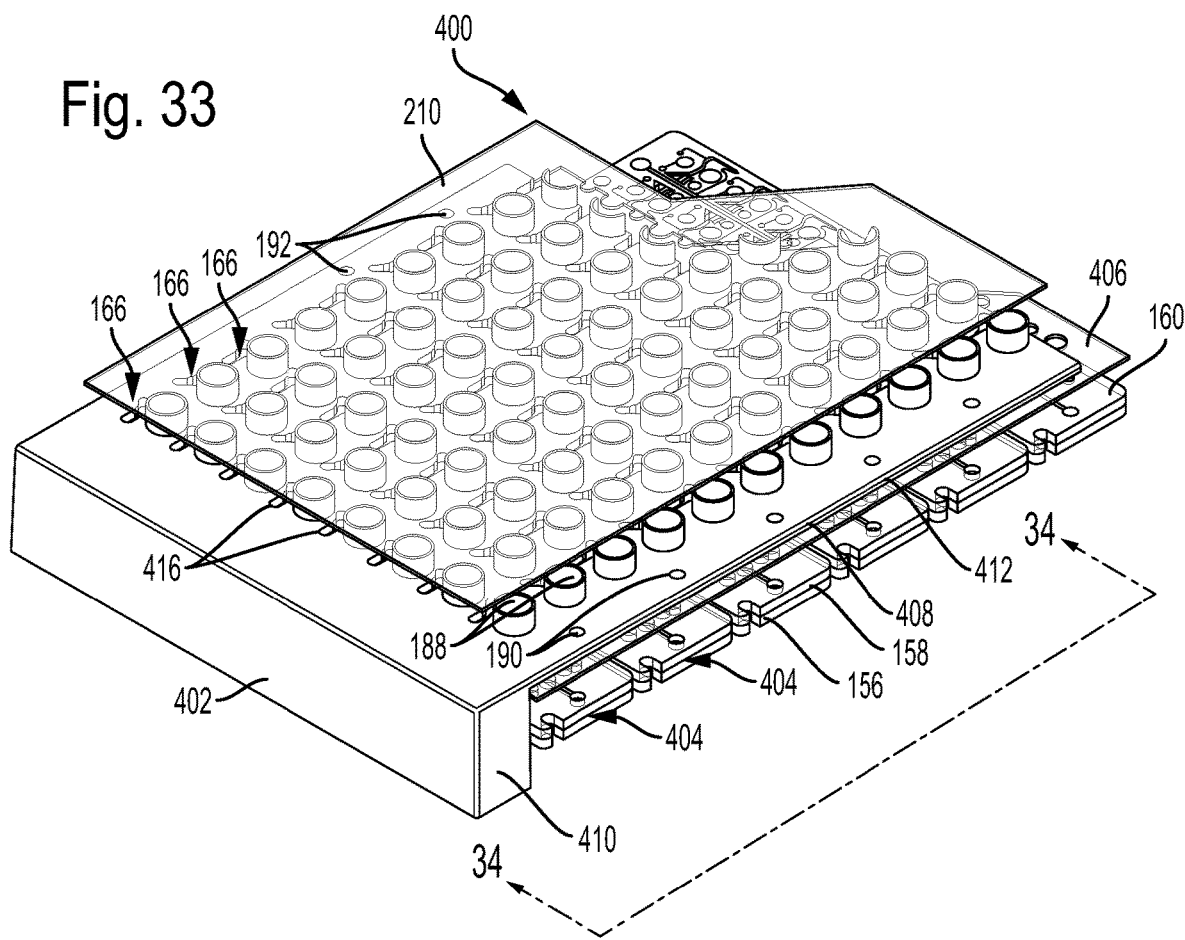
FIG. 33 is a partially exploded, fragmentary, isometric view of another exemplary microfluidic cartridge for forming an array of emulsions, with the cartridge including a frame attached to and supporting a plurality of microfluidic modules, with the frame forming sample loading ports, carrier inlet ports, and vacuum ports, and with layers of the cartridge differentially fragmented, in accordance with aspects of the present disclosure.
Figure 34:
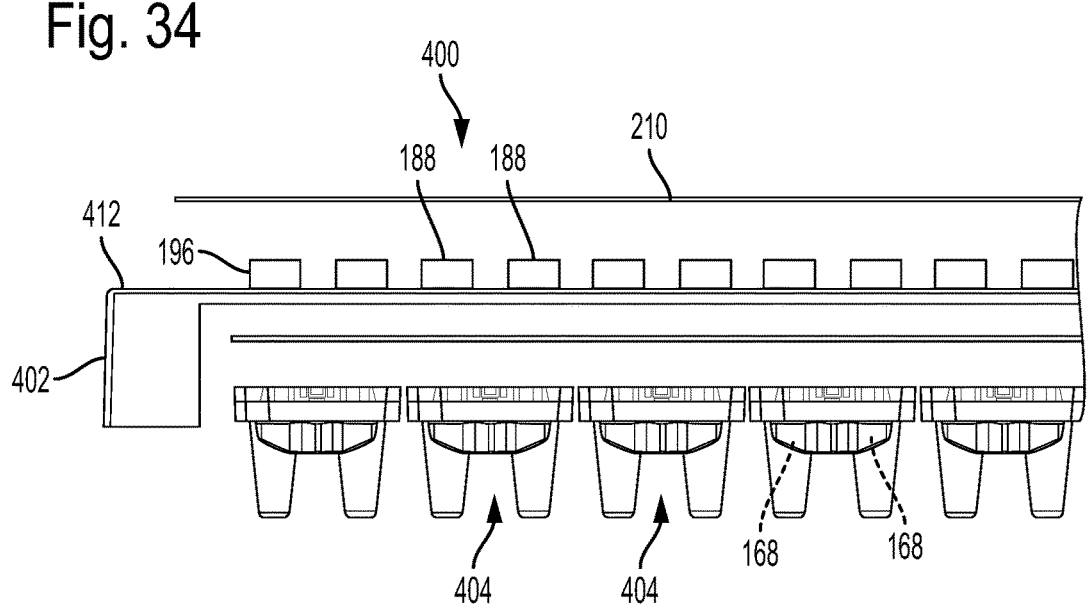
FIG. 34 is a partially exploded, fragmentary, elevation view of the device of FIG. 33, taken generally along line 34-34 of FIG. 33.
Figure 35:
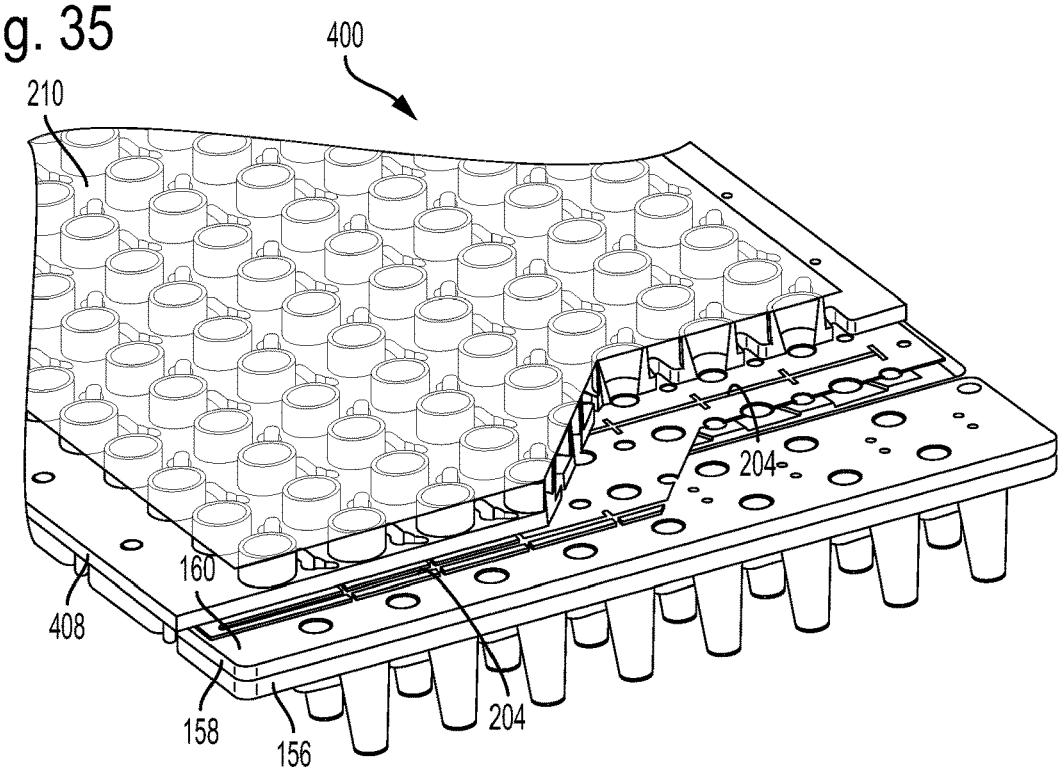
FIG. 35 is a fragmentary, assembled view of the device of FIG. 33 with the layers differentially fragmented as in FIG. 33.

FIG. 32 shows a fluidics head 262 of instrument 260 operatively engaged with sealing member 210 of module 150, after the sealing member has been bonded to guide/port layer 162. Carrier coupling member 212a has a gasket 216 that seals the coupling member to carrier inlet port 190, and vacuum coupling member 212b has a gasket 216 that seals the coupling member to vacuum port 192. A piercing member 214 of coupling member 212a has pierced both sealing member 210 and capping layer 160. Carrier fluid flows through gasket 216 around piercing member 214 and into carrier aperture 360 of channel layer 158, as indicated by arrows at 392. Similarly, a (shorter) piercing member 214 of coupling member 212b has pierced only sealing member 210. Vacuum drives travel of air out of vacuum manifold 204, as indicated by arrows at 394.

Example 2

Cartridge with Fluidic Frame

This section describes an exemplary microfluidic cartridge 400 (interchangeably called a microfluidic device) having a frame 402 providing fluidic features for emulsion formation; see FIGS. 33-39. Structures and features of cartridge 400 that correspond to those described above for microfluidic device 140 of Section I and/or cartridge 300 of Example 1 have been assigned the same reference numbers as in device 140 or cartridge 300.

Cartridge 400 has a plurality of microfluidic modules 404 bonded to frame 402 in a fluid-tight seal. Modules 404 are constructed generally as described above for modules 150 in Example 1, except that guide/port layer 162 of each module is omitted. The guide/port layer is replaced by a vacuum manifold layer 406 and a guide/port layer 408 that are shared among modules 404. Vacuum manifold layer 406 is bonded to a top side of capping layer 160 of each module 404, and guide/port layer 408 is bonded to a top side of manifold layer 406.

Frame 402 has a pair of legs 410 (only one is visible here) and a platform 412 supported by the legs, optionally formed integrally with the legs. Platform 412 provides guide/port layer 408 of the cartridge and defines various ports over each module 404, namely, an array of sample loading ports 188, a dedicated carrier inlet port 190, and a dedicated vacuum port 192. The platform also may define a dedicated carrier vent port for each module 404.

Sample loading ports 188 for the entire cartridge may be sealed with a sealing member 210, such as a bondable foil, after sample fluid is loaded into sample reservoirs 168 of modules 404, as described above. However, the sealing member may not overlap and/or seal carrier inlet ports 190 and vacuum ports 192, which may be located at a lower elevation than the top of the sample loading ports (see FIG. 33).

Figure 38:
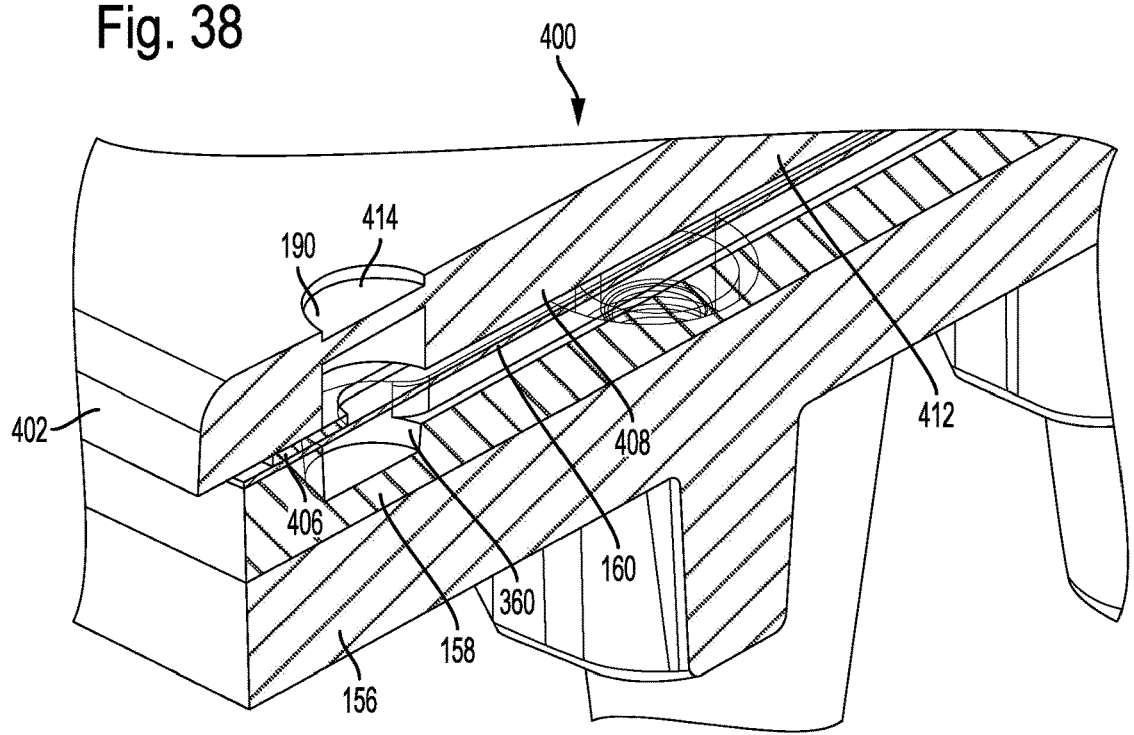
FIG. 38 is a fragmentary, isometric, sectional view of the device of FIG. 36, taken generally along line 38-38 of FIG. 36.

Each carrier inlet port 190 may have a membrane 414 that seals the port, to reduce the chance of contamination (see FIG. 38). Membrane 414 may be formed integrally with platform 412 and may be pierced after the cartridge is loaded with sample fluid and when ready for emulsion formation.

Each vacuum port 192 is in fluid communication with a respective vacuum manifold 204 formed over each module. The vacuum manifold communicates with each emulsion formation unit 166 of the module and has the structure described above for cartridge 300, except that the lateral side walls and the ceiling of the vacuum manifold are not formed by the same layer. However, in other embodiments, guide/port layer 408 (platform 412) is monolithic and forms the lateral side walls and the ceiling of the vacuum manifold (e.g., see Example 3).

Figure 36:
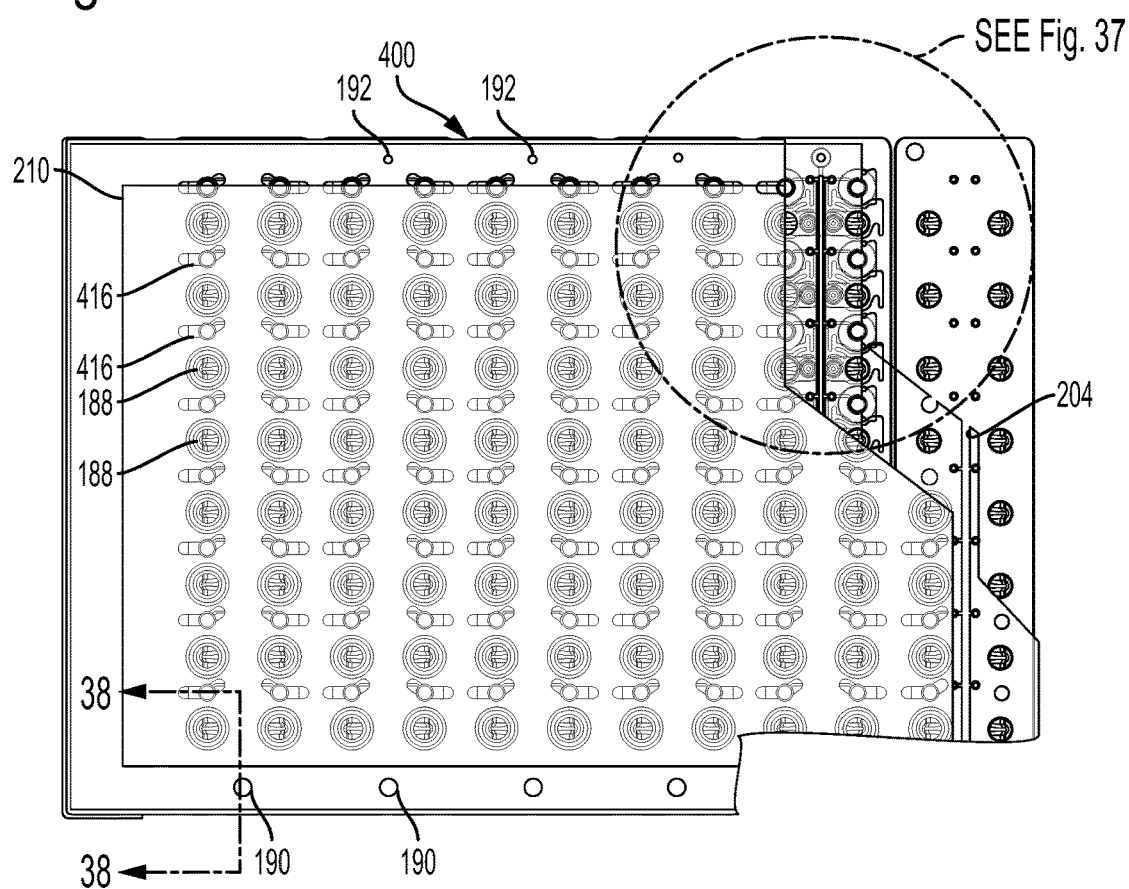
FIG. 36 is a fragmentary, assembled, plan view of the assembled device of FIG. 35, with the layers fragmented as in FIG. 35.
Figure 37:
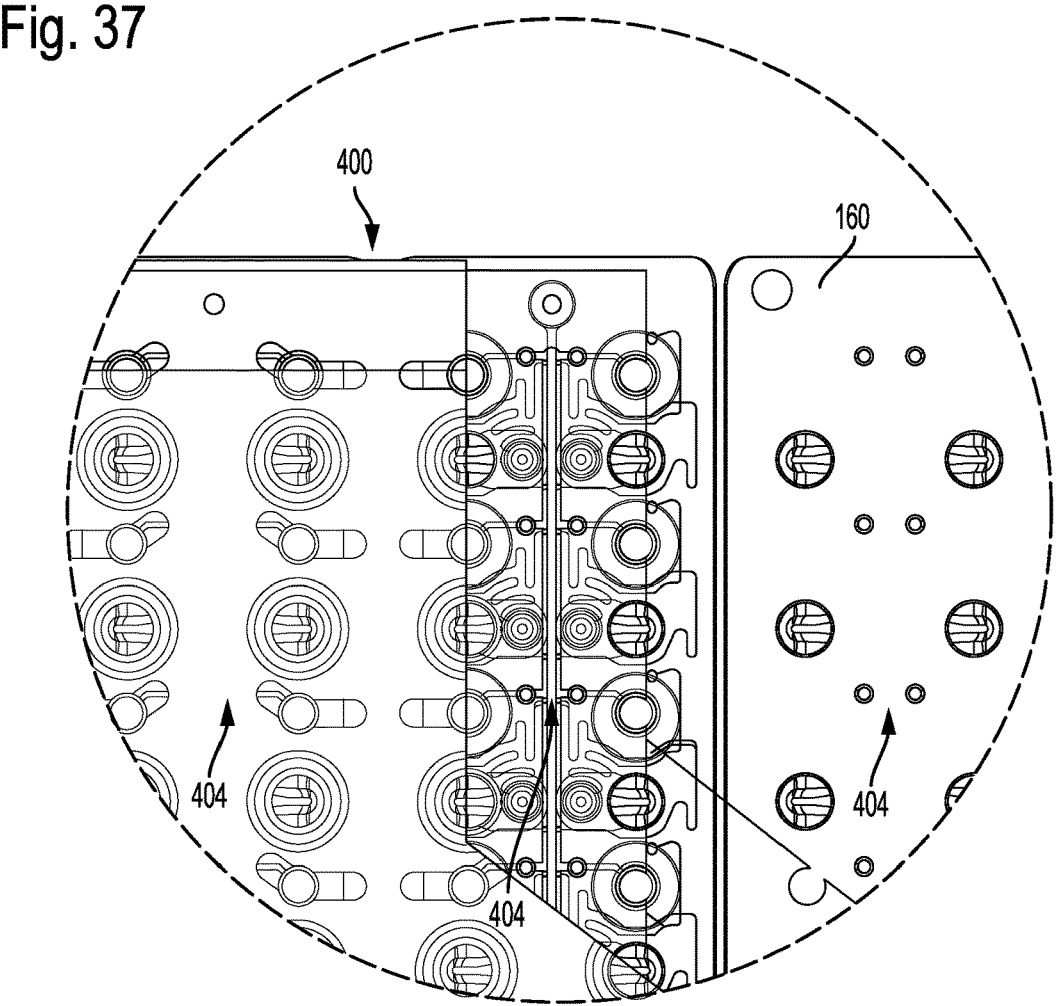
FIG. 37 is a fragmentary plan view of the device of FIG. 36, taken generally around the region indicated in FIG. 36 and illustrating aspects of a vacuum manifold of the device.
Figure 39:
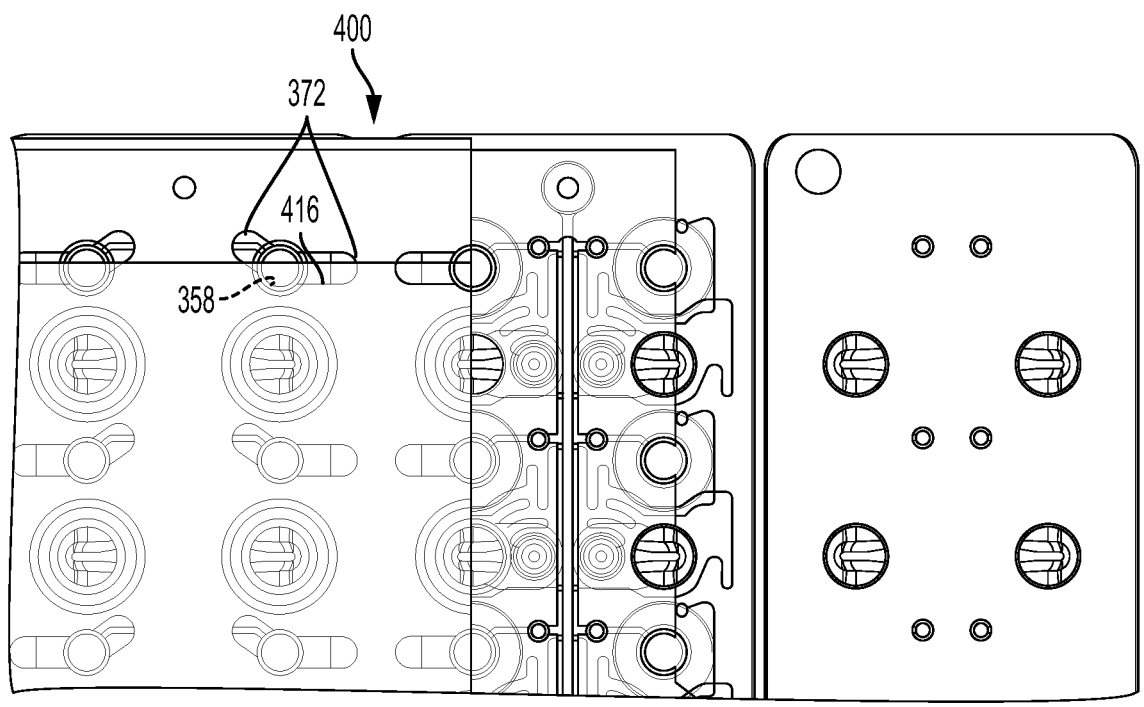
FIG. 39 is a fragmentary, plan view of the device of FIG. 34, taken generally as in FIG. 37 and illustrating access regions at which the device is locally deformed after emulsion formation to seal each emulsion reservoir before thermal cycling.

Guide/port layer 408 of the frame also defines an array of windows 416, namely, one for each emulsion formation unit 166 of the cartridge (see FIGS. 36, 37, and 39). Each window 416 is functionally similar to one of openings 208 described above, except circumferentially bounded, and provides an access region where the underlying module 404 is not covered by layers 406 and 408, thereby exposing capping layer 160 over emulsion outlet 358 and at deformation region 372 (see FIG. 39), as described above.

Example 3

Cartridge with Onboard Carrier Reservoir

Figure 40:
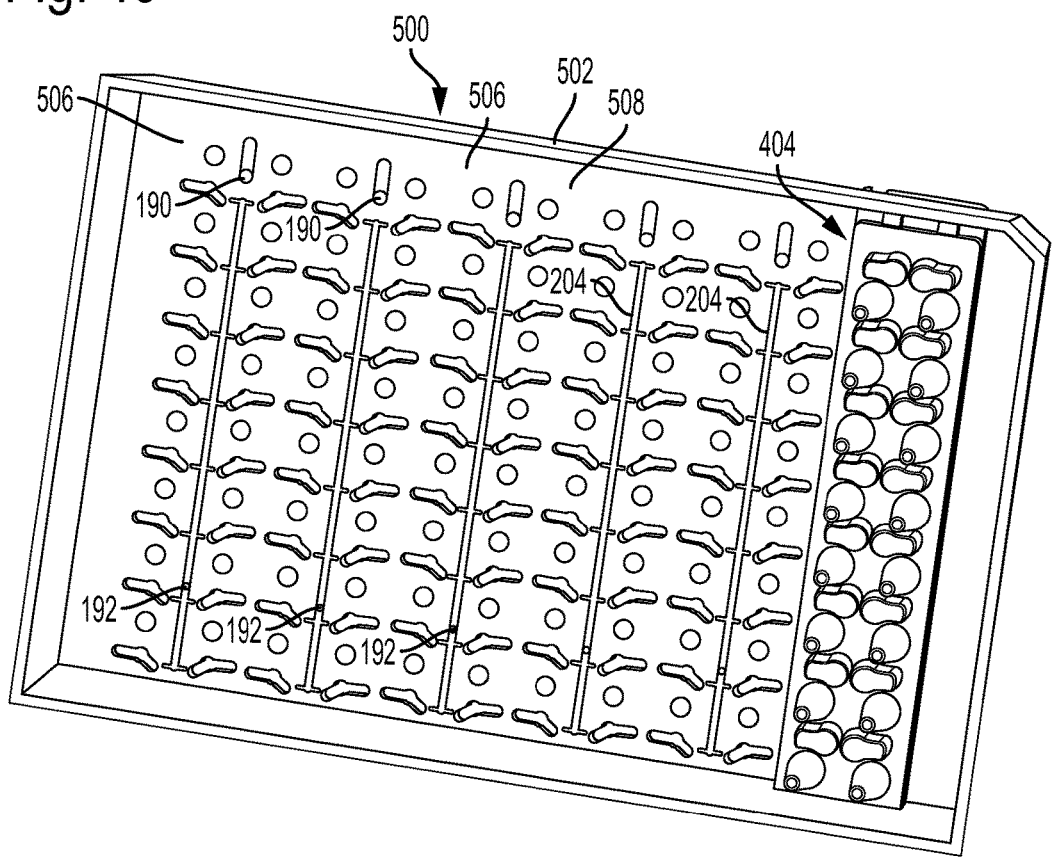
FIG. 40 is a bottom view of still another exemplary microfluidic device for forming an array of emulsions, with the device including a frame attached to and supporting a single microfluidic module, and with the frame forming sample ports and vacuum ports and also forming an onboard carrier reservoir, in accordance with aspects of the present disclosure.
Figure 41:
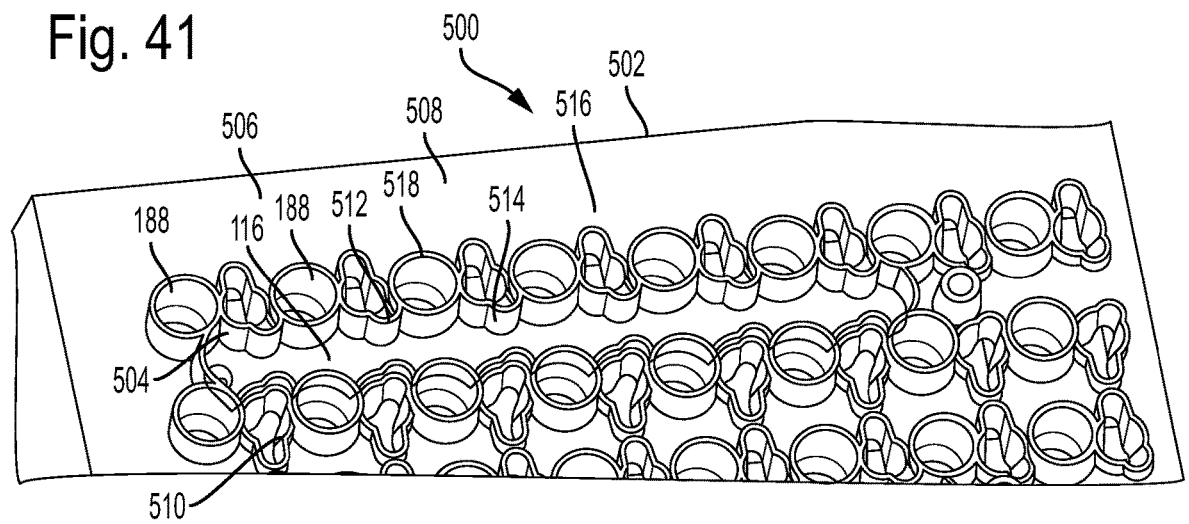
FIG. 41 is a fragmentary top view of the device of FIG. 40 with one of the onboard carrier reservoirs partially loaded with carrier fluid.

This section describes an exemplary microfluidic cartridge 500 (interchangeably called a microfluidic device) having a frame 502 providing fluidic features for emulsion formation, including an onboard reservoir 504 for carrier fluid 116; see FIGS. 40-42. Structures and features of cartridge 500 that correspond to those described above for microfluidic device 140, cartridge 300, and/or cartridge 400 have been assigned the same references numbers as in those devices.

Cartridge 500 has a structure shared generally with cartridge 400, including modules 404 bonded in a fluid-tight seal to an underside of a platform 506 of frame 502. (Only one module 404 is shown in FIG. 40 to simplify the presentation.) Platform 506 forms a guide/port layer 508 of the cartridge, which has the vacuum manifold 204 of manifold layer 406 of cartridge 400 formed integrally by platform 506, rather than as a separate layer. Platform 506 defines, for each module 404, an array of sample ports 188 (see FIGS. 41 and 42) and a corresponding array of windows 510 (similar to windows 416 of cartridge 400), a carrier inlet port 190, and a vacuum port 192 that communicates with a vacuum manifold 204. However, rather than receiving carrier fluid from an off-cartridge source, carrier inlet port 190 of each module receives carrier fluid 116 from a carrier reservoir 504 provided by the cartridge over the module. Carrier reservoir 504 has a floor and lateral side walls formed by frame 502, and may be covered with a sealing member bonded to a rim 512 (see FIG. 41). The lateral side wall and rim of the reservoir may be provided by a protrusion 514 that projects upward from a body 516 of platform 506. Portions of reservoir rim 512 may be shared with rims 518 of adjacent sample loading ports 188.

Example 4

Selected Embodiments I

This example describes selected embodiments of the present disclosure presented as a series of indexed paragraphs.

1. A device to form an array of emulsions, comprising: (A) a frame; and (B) a plurality of separate microfluidic modules mounted to the frame, each module including an array of emulsion formation units in fluid communication with one another and configured to form an array of emulsions, each unit including a sample reservoir to receive sample fluid, an emulsion reservoir to collect an emulsion including droplets of the sample fluid surrounded by carrier fluid, and a channel junction at which a sample channel, at least one carrier channel, and a droplet channel meet one another.

2. The device of paragraph 1, wherein the channel junction is configured to receive the sample fluid from the sample reservoir via the sample channel, and carrier fluid from a carrier port via the at least one carrier channel, and to direct the droplets to the emulsion reservoir via the droplet channel.

3. The device of paragraph 1 or paragraph 2, wherein each module includes at least one carrier port and at least one vacuum/pressure port, and wherein the emulsion formation units of the module are configured to form and collect the array of emulsions when carrier fluid is supplied, and optionally driven under pressure, to the at least one carrier port and vacuum or positive pneumatic pressure is applied to the at least one vacuum/pressure port.

4. The device of paragraph 3, wherein the at least one carrier port is a single carrier port, wherein the sample, carrier, and droplet channels of each emulsion formation unit of the module belong to the same channel network, and wherein the channel network includes a carrier manifold that directs carrier fluid from the single carrier port to the channel junction of each emulsion formation unit of the module.

5. The device of paragraph 3 or paragraph 4, wherein the at least one vacuum/pressure port is a single vacuum/pressure port, and wherein the module includes a vacuum/pressure manifold configured to communicate vacuum or positive pneumatic pressure applied at the vacuum/pressure port to each sample reservoir or each emulsion reservoir of the module.

6. The device of any of paragraphs 3 to 5, wherein the vacuum/pressure port is a vacuum port.

7. The device of any of paragraphs 1 to 6, wherein each module includes an assembly of layers bonded together, and wherein the assembly creates each emulsion formation unit of the module.

8. The device of paragraph 7, wherein the assembly includes an external carrier port and an external vacuum/pressure port.

9. The device of paragraph 7 or paragraph 8, wherein the assembly includes an array of sample ports arranged in vertical alignment with an array of sample reservoirs.

10. The device of any of paragraphs 1 to 9, wherein each module includes a body, one or more protrusions projecting from the body, and a plurality of ports, and wherein the one or more protrusions form a top rim of each port of the plurality of ports.

11. The device of paragraph 10, wherein the one or more protrusions form a top rim of each sample loading port of a plurality of sample loading ports, a top rim of each sample vent port of a plurality of sample vent ports, and/or a top rim of a carrier inlet port, and/or a top rim of a vacuum/pressure port.

12. The device of paragraph 10 or paragraph 11, wherein each protrusion of the one or more protrusions of each module has a top surface, and wherein the top surfaces of the modules are substantially coplanar with one another.

13. The device of any of paragraphs 1 to 12, further comprising a same layer bonded to each of the modules.

14. The device of paragraph 13, wherein the layer is a sealing layer that covers and seals a plurality of ports of each module.

15. The device of paragraph 14, wherein the sealing layer is a heat-sealable foil 16. The device of paragraph 14 or paragraph 15, wherein the sealing layer is bonded directly to one or more protrusions of each module.

17. The device of any of paragraphs 1 to 16, wherein a top portion of each module projects above a top of the frame.

18. The device of paragraphs 17, wherein the top portion includes a body of the module and one or more protrusions that project upward from the body.

19. The device of any of paragraphs 1 to 18, wherein a same sealing layer hermetically seals all of the modules, such that each of the emulsion formation units of each module is fluidically isolated from the ambient atmosphere outside the module.

20. The device of any of paragraphs 1 to 19, wherein the frame is configured to support and elevate each module.

21. The device of any of paragraphs 1 to 20, wherein each module is mounted to the frame at least in part by a snap-fit attachment.

22. The device of any of paragraphs 1 to 21, wherein each module includes a plurality of tabs received in corresponding apertures of the frame.

23. The device of paragraph 22, wherein each module is elongated between opposite ends thereof, and wherein each of the opposite ends includes at least one of the tabs.

24. The device of any of paragraphs 1 to 23, wherein the device includes 96 sample reservoirs and 96 emulsion reservoirs each arranged in an 8-by-12 array.

25. The device of any of paragraphs 1 to 24, wherein a spacing of sample reservoirs and/or emulsion reservoirs within each module is about the same as a spacing of sample reservoirs and/or emulsion reservoirs between adjacent modules.

26. The device of paragraph 25, wherein the spacing is within 10% of 9 mm.

27. The device of paragraph 1, wherein the frame forms a top rim of a plurality of ports of each module.

28. The device of paragraph 27, wherein the frame forms a pierceable membrane sealing one or more ports of each module.

29. The device of any of paragraphs 1 to 28, wherein each sample reservoir is vertically aligned with a sample port, and wherein the sample port includes a tapered region configured to guide an inlet/outlet end of a pipette into the sample reservoir.

30. The device of any of paragraphs 1 to 29, wherein the modules are substantially identical to one another.

31. The device of any of paragraphs 1 to 30, wherein the frame is configured to receive at least three of the modules, and, optionally, only six of the modules.

32. The device of any of paragraphs 1 to 31, wherein each module has a two-dimensional array of emulsion formation units.

33. The device of any of paragraphs 1 to 32, wherein the device includes a vacuum port and vacuum manifold for each module, and wherein the vacuum port is in fluid communication with each emulsion reservoir of the module via the vacuum manifold.

34. The device of paragraph 33, wherein the channels of each module lie in a first plane, and wherein the vacuum manifold lies in a second plane that is parallel to and spaced from the first plane.

35. The device of any of paragraphs 1 to 34, wherein the device has a row of carrier inlet ports and a row of vacuum/pressure ports, and wherein the rows are parallel to one another.

36. The device of paragraphs 35, wherein each module includes a different one of the carrier inlet ports and a different one of the vacuum/pressure ports.

37. A device to form an array of emulsions, comprising: an assembly of a plurality of layers bonded together, the assembly creating an array of emulsion formation units in fluid communication with one another and configured to form an array of emulsions, each unit including a sample reservoir to receive sample fluid, an emulsion reservoir to collect an emulsion including droplets of the sample fluid surrounded by carrier fluid, and a channel junction at which a sample channel, at least one carrier channel, and a droplet channel meet one another.

38. The device of paragraph 37, wherein the channel junction is configured to receive sample fluid from the sample reservoir via the sample channel, and carrier fluid from a carrier port via the at least one carrier channel, and to direct droplets to the emulsion reservoir via the droplet channel.

39. The device of paragraph 37, wherein the assembly includes a vacuum/pressure port and a vacuum/pressure manifold.

40. The device of paragraph 39, wherein the assembly includes a carrier manifold lying in a different plane than the vacuum/pressure manifold.

41. The device of any of paragraphs 37 to 40, wherein the assembly includes a respective sample loading port located over each sample reservoir, and wherein the sample loading port includes a tapered region configured to guide an inlet/outlet end of a pipette into the sample reservoir.

42. The device of paragraph 41, wherein the sample loading port includes a neck region located under the tapered region, and wherein the neck region is located between the tapered region and the sample reservoir.

43. The device of paragraph 41 or paragraph 42, wherein the sample loading port tapers such that a maximum cross-sectional area of the sample loading port is at least 2, 3, 4, or 5 times a minimum cross-sectional area of the sample loading port.

44. The device of any of paragraphs 41 to 43, wherein the sample loading port has a maximum diameter that is at least 2 or 3 times a minimum diameter of the sample loading port.

45. The device of any of paragraphs 41 to 44, wherein a cross-sectional shape of the sample loading port changes between a top and a bottom of the tapered region.

46. The device of any of paragraphs 41 to 45, wherein one of the layers of the assembly defines a plane, and wherein at least a portion of the tapered region forms an angle of less than 70, 60, or 50 degrees with the plane.

47. The device of any of paragraphs 41 to 46, wherein each sample loading port has a top rim formed by a protrusion.

48. The device of any of paragraphs 37 to 47, wherein each emulsion reservoir includes a pair of downwardly-extending baffles.

49. The device of paragraph 48, wherein a chute is formed between the baffles.

50. The device of paragraph 48 or 49, wherein emulsion fluid enters the emulsion reservoir via an inlet that is vertically aligned with the chute.

51. The device of any of paragraphs 48 to 50, wherein each baffle has a pair of walls that meet one another at an edge, and wherein the pair of walls form an angle of less than 90, 80, 70, 60, or 50 degrees.

52. The device of any of paragraphs 48 to 51, wherein each baffle extends from a top region to a bottom region of the emulsion reservoir.

53. The device of any of paragraphs 48 to 52, wherein the baffles are spaced from one another near a top of the emulsion reservoir by less than one-third the inside circumference of the emulsion reservoir.

54. The device of any of paragraphs 37 to 53, wherein the assembly includes a body, one or more protrusions projecting from the body, and a plurality of ports, and wherein the one or more protrusions form a top rim of each port of the plurality of ports.

55. The device of paragraph 54, wherein the one or more protrusions form a top rim of each sample loading port of a plurality of sample loading ports, and/or a top rim of a carrier inlet port, and/or a top rim of a vacuum/pressure port, and/or a top rim of each sample vent port of a plurality of sample vent ports.

56. The device of paragraph 54 or paragraph 55, wherein the one or more protrusions are a plurality of protrusions each having a top surface, and wherein the top surfaces are coplanar with one another.

57. The device of any of paragraphs 54 to 56, wherein each protrusion forms part of a port and encircles a central axis of the port.

58. The device of any of paragraphs 57, where the port includes an opening that extends into the assembly from a periphery thereof, and wherein the protrusion bounds a top portion of the opening.

59. The device of any of paragraphs 54 to 58, wherein the one or more protrusions include a plurality of protrusions, wherein the assembly includes a respective sample loading port for each sample reservoir, and wherein a different protrusion of the plurality of protrusions forms a rim of each respective sample loading port.

60. The device of any of paragraphs 54 to 59, further comprising a sealing layer bonded directly to the one or more protrusions.

61. The device of paragraph 60, wherein the sealing layer covers and seals a plurality of ports of the assembly.

62. The device of paragraph 61, wherein the sealing layer is a film that includes foil.

63. A device to form an array of emulsions, comprising: (A) an array of sample reservoirs; (B) an array of sample ports overlying and aligned with the array of sample reservoirs; (C) an array of emulsion reservoirs corresponding to the array of sample reservoirs; (D) a carrier port; (E) a vacuum/pressure port; (F) a vacuum/pressure manifold in fluid communication with each emulsion reservoir; and (G) a channel network in fluid communication with each of the sample and emulsion reservoirs and with the carrier port and configured to form droplets of sample fluid received from each sample reservoir and direct the droplets to a corresponding emulsion reservoir when carrier fluid is supplied to the carrier port and vacuum or positive pneumatic pressure is applied to the vacuum/pressure port; wherein the device includes a plurality of layers bonded together and forming the sample reservoirs, the sample ports, the emulsion reservoirs, the carrier port, the vacuum port, the vacuum manifold, and the channel network.

64. The device of paragraph 63, wherein the channel network lies in a first plane, and wherein the vacuum manifold includes a channel structure lying in a second plane that is vertically offset from the first plane.

65. The device of paragraph 64, wherein the sample ports have inlets located on a top side of the plurality of layers bonded together, and wherein the channel structure is closer to the inlets than the channel network is to the inlets.

66. The device of paragraph 65, wherein a top layer of the plurality of layers forms the inlets of the sample ports and a ceiling of the channel structure.

67. The device of paragraph 66, wherein the top layer is a monolithic layer including a bottom surface having a recess formed therein, and wherein the recess forms side walls of the channel structure.

68. The device of paragraph 66 or paragraph 67, wherein the top layer forms a rim of the vacuum port.

69. The device of paragraph 68, wherein the top layer includes a body, and wherein the rim is formed by a ridge that protrudes from the body.

70. The device of paragraph 69, wherein the body has a substantially planar surface, and wherein the ridge protrudes from the planar surface.

71. The device of any of paragraphs 66 to 70, wherein the top layer defines a tapered portion of each sample port, and wherein the tapered portion tapers toward an underlying sample reservoir.

72. The device of any of paragraphs 66 to 71, wherein the top layer is a monolithic layer that forms a rim of the carrier port, a rim of each sample port, and a rim of the vacuum port.

73. The device of paragraph 72, wherein the top layer forms a rim of each vent portion of a plurality of vent ports, and wherein each vent port communicates with one of the sample reservoirs via a corresponding sample port.

74. The device of paragraph 73, wherein the rims of the sample ports, carrier port, and vacuum port are coplanar with one another.

75. The device of paragraph 74, wherein the rims of a plurality of vent ports are coplanar with the rims of the sample ports, carrier port, and vacuum port.

76. The device of any of paragraphs 66 to 75, wherein the plurality of layers includes a capping layer that forms a ceiling of the channel network, and wherein the top layer does not cover a portion of the capping layer over each emulsion reservoir.

77. The device of paragraph 76, wherein the capping layer defines a plurality of notches or through-holes, and wherein each notch or through-hole is aligned with the portion of the capping layer over one of the emulsion reservoirs.

78. A device to form an array of emulsions, comprising: (A) an array of sample reservoirs; (B) an array of sample ports overlying and aligned with the array of sample reservoirs; (C) an array of emulsion reservoirs corresponding to the array of sample reservoirs; (D) a carrier port; (E) a vacuum port; and (F) a channel network in fluid communication with each of the sample and emulsion reservoirs and with the carrier port and configured to form droplets of sample fluid received from each sample reservoir and direct the droplets to a corresponding emulsion reservoir when carrier fluid is supplied to the carrier port and vacuum is applied to the vacuum port; wherein the device includes a plurality of layers bonded together and forming the sample reservoirs, the sample ports, the emulsion reservoirs, the carrier port, the vacuum port, and the channel network; and wherein each sample port tapers toward a corresponding sample reservoir.

79. The device of paragraph 78, wherein the sample port includes a tapered region and a neck region, and wherein the neck region is located between the tapered region and the sample reservoir.

80. The device of paragraph 78 or paragraph 79, wherein the sample port tapers such that a maximum cross-sectional area of the sample port is at least 2, 3, 4, or 5 times a minimum cross-sectional area of the sample port.

81. The device of any of paragraphs 78 to 80, wherein the sample port tapers such that a maximum diameter of the sample port is at least 2 or 3 times a minimum diameter of the sample port.

82. The device of any of paragraphs 78 to 81, wherein a cross-sectional shape of the sample port changes between a top and a bottom of a tapered region of the sample port.

83. The device of any of paragraphs 78 to 82, wherein one of the layers defines a plane, and wherein a wall region of the sample port forms an angle of less than 70, 60, or 50 degrees with the plane.

84. The device of any of paragraphs 78 to 83, wherein each sample port includes an opening encircled at a top region thereof by a respective continuous ridge.

85. The device of any of paragraphs 78 to 84, wherein a tapered region of the sample port is formed by a different layer or layers than the channel network.

86. The device of any of paragraphs 78 to 85, wherein a top, monolithic layer of the layers forms a rim and a tapered portion of each sample port, a rim of the carrier port, and a rim of the vacuum port, and wherein, optionally, the layer is injection molded.

87. The device of paragraph 86, wherein the layer forms a rim of a respective vent port for each sample reservoir.

88. A device to form an array of emulsions, comprising: (A) an array of sample reservoirs; (B) an array of sample ports overlying and aligned with the array of sample reservoirs; (C) an array of emulsion reservoirs corresponding to the array of sample reservoirs; (D) a carrier port; (E) a vacuum port; and (F) a channel network in fluid communication with each of the sample and emulsion reservoirs and with the carrier port and configured to form droplets of sample fluid from each sample reservoir and direct the droplets to a corresponding emulsion reservoir when carrier fluid is supplied to the carrier port and vacuum is applied to the vacuum port; wherein the device includes a plurality of layers bonded together and forming the sample reservoirs, the sample ports, the emulsion reservoirs, the carrier port, the vacuum port, and the channel network, and wherein each of the sample, carrier, and vacuum ports includes a top rim formed by a protrusion.

89. The device of paragraph 88, wherein the device includes one or more protrusions that collectively encircles a central axis of each port.

90. The device of paragraph 88 or paragraph 89, wherein all of the rims are coplanar with one another.

91. The device of any of paragraphs 88 to 90, further comprising a respective vent port for each sample reservoir, the vent port communicating with the sample reservoir via the corresponding sample port and including a rim that is coplanar with some or all of the other rims.

92. The device of any of paragraphs 88 to 91, wherein the plurality of layers includes a layer having a body, and wherein each rim is formed by a protrusion that protrudes from the body.

93. The device of paragraph 92, wherein the body has a substantially planar surface and wherein each protrusion protrudes from the planar surface.

94. The device of any of paragraphs 88 to 93, further comprising a sealing layer configured to be bonded to each rim, such that the sealing layer prevents any fluid communication between the ambient atmosphere outside the device and each sample reservoir, each emulsion reservoir, and the channel network.

95. A device to form an array of emulsions, comprising: (A) an array of sample reservoirs; (B) an array of sample ports overlying and aligned with the array of sample reservoirs; (C) an array of emulsion reservoirs corresponding to the array of sample reservoirs; (D) a carrier port; (E) a vacuum port; (F) an array of vent ports, each vent port being in fluid communication with one of the sample reservoirs via a corresponding sample port; and (G) a channel network in fluid communication with each of the sample and emulsion reservoirs and with the carrier port and configured to form droplets of sample fluid from each sample reservoir and direct the droplets to a corresponding emulsion reservoir when carrier fluid is supplied to the carrier port and vacuum is applied to the vacuum port; wherein the device includes a plurality of layers bonded together and forming the sample reservoirs, the sample ports, the emulsion reservoirs, the carrier port, the vacuum port, the vent ports, and the channel network.

96. The device of paragraph 95, wherein one of the layers is a molded layer defining a plurality of through-holes, and wherein the through-holes form at least a portion of each sample port and at least a portion of each vent port.

97. A method of forming an array of emulsions, the method comprising: (A) selecting a microfluidic device composed of a plurality of layers bonded together, the layers forming a plurality of sample reservoirs, a corresponding plurality of emulsion reservoirs, and a channel network providing fluid communication between the sample reservoirs and the emulsion reservoirs; (B) dispensing sample fluid into each sample reservoir; (C) bonding a sealing layer to a plurality of coplanar protrusions located on a top side of the device, wherein the step of bonding fluidically isolates each sample reservoir from the ambient atmosphere outside the device; (D) forming one or more openings through the sealing layer; (E) supplying carrier fluid to the channel network; and (F) applying vacuum or positive pneumatic pressure at each of the one or more openings to drive sample fluid from each sample reservoir to a channel intersection of the channel network, at which droplets of the sample fluid enclosed by carrier fluid are formed, and from which the droplets are directed to a corresponding emulsion reservoir.

Example 5

Selected Embodiments II

This example describes further selected embodiments of the present disclosure presented as a series of indexed paragraphs.

Paragraph A1 A device for forming emulsions, comprising: (i) a frame; and (ii) a plurality of separate microfluidic modules mounted to the frame, each module including an array of emulsion formation units, each emulsion formation unit including a sample reservoir configured to be loaded with sample-containing fluid, and a droplet generation site configured to receive sample-containing fluid from the sample reservoir and to generate droplets of sample-containing fluid encapsulated by carrier fluid; and (iii) a same sealing member configured to be bonded to a top side of each module of the plurality of modules, such that the sealing member covers and seals a plurality of ports of each module, each port being in fluid communication with the emulsion formation units of the module.

Paragraph A2. The device of paragraph A1, wherein the plurality of ports of each module is defined by a port layer including a body and at least one protrusion projecting from a top surface of the body, wherein the body defines a lower section of each port of the plurality of ports, wherein the at least one protrusion forms a top rim of each port of the plurality of ports, and wherein the sealing member is bonded directly to the top rim of each port.

Paragraph A3. The device of paragraph A2, wherein the top rim of each port is elevated with respect to a top of the frame. Paragraph A4. The device of any one of paragraphs A1 to A3, wherein each module is attached to the frame via complementary mating features of the module and the frame.

Paragraph A5. The device of paragraph A4, wherein each module is mounted to the frame via snap-fit attachment. Paragraph A6. The device of any one of paragraphs A1 to A5, wherein the sealing member is configured to hermetically seal each module, such that each of the emulsion formation units of the module is isolated from the ambient atmosphere outside the module.

Paragraph A7. The device of any one of paragraphs A1 to A6, wherein each sample reservoir is located under a respective sample-loading port, and wherein the sample-loading port includes a tapered region that tapers toward the sample reservoir.

Paragraph A8. The device of paragraph A7, wherein a neck region of the sample-loading port is located between the tapered region and the sample reservoir.

Paragraph A9. The device of any one of paragraphs A1 to A8, wherein each module includes a vacuum port and a vacuum manifold, and wherein the vacuum port is in fluid communication with an emulsion reservoir of each emulsion formation unit of the module via the vacuum manifold.

Paragraph A10. The device of any one of paragraphs A1 to A9, wherein the array of each module is a smaller array, and wherein the plurality of modules forms a larger, rectangular array of emulsion formation units that includes the smaller array of each module.

Paragraph A11. The device of paragraph A10, wherein each sample reservoir is configured to be loaded with sample-containing fluid via a respective sample-loading port that defines a loading axis, and wherein the rectangular array has the loading axes of the sample-loading ports arranged in uniformly-spaced rows and uniformly-spaced columns.

Paragraph A12. The device of paragraph A11, wherein the rows and the columns have the same spacing as one another.

Paragraph A13. The device of any one of paragraphs A10 to A12, wherein the rectangular array is an 8-by-12 array.

Paragraph A14. The device of any one of paragraphs A1 to A13, wherein each module includes at least one carrier fluid port and at least one vacuum/pressure port, and wherein the emulsion formation units of the module are configured to form and collect an array of emulsions when carrier fluid is supplied to the at least one carrier fluid port and vacuum or pressure is applied to each port of the at least one vacuum/pressure port.

Paragraph A15. The device of paragraph A14, wherein the at least one vacuum/pressure port is a single vacuum port, and wherein the module includes a vacuum manifold configured to communicate vacuum applied at the vacuum port to each emulsion formation unit of the module.

Paragraph A16. The device of paragraph A15, wherein the at least one carrier fluid port is a single carrier fluid port, and wherein the module includes a carrier fluid manifold that directs carrier fluid from the single carrier fluid port to the droplet-generation site of each emulsion formation unit of the module.

Paragraph A17. The device of any one of paragraphs A1 to A16, wherein each emulsion formation unit of the plurality of modules includes an emulsion reservoir to collect an emulsion including droplets of sample-containing fluid encapsulated by carrier fluid, and wherein the droplet generation site of the emulsion formation unit includes a channel junction at which a sample channel, at least one carrier fluid channel, and a droplet channel meet one another and at which droplets are generated.

Paragraph A18. The device of any one of paragraphs A1 to A17, wherein the sealing member includes a heat-sealable foil.

Paragraph A19. The device of any one of paragraphs A1 to A18, wherein the plurality of ports includes a plurality of sample-loading ports, at least one carrier fluid port, and at least one vacuum/pressure port.

Paragraph A20. The device of paragraph A19, wherein the plurality of ports also includes a respective vent port for each emulsion formation unit.

Paragraph A21. The device of any one of paragraphs A1 to A20, wherein each module defines a carrier fluid port that is in fluid communication with the droplet generation site of each emulsion formation unit of the module, and wherein the carrier fluid ports of the plurality of modules are arranged along a straight line.

Paragraph A22. The device of any one of paragraphs A1 to A21, wherein each module includes an assembly of layers bonded together, and wherein the assembly creates each emulsion formation unit of the module.

Paragraph A23. A system for forming emulsions, comprising: (i) the device of any one of paragraphs A1 to A22; and (ii) at least one source of vacuum/pressure configured to be operatively coupled to the device, to drive droplet generation at each droplet generation site of each module.

Paragraph A24. The system of paragraph A23, wherein the at least one source of vacuum/pressure is a vacuum source configured to be operatively coupled to each module.

Paragraph A25. The system of paragraph A23 or paragraph 24, further comprising at least one source of carrier fluid configured to be operatively coupled to the device to supply carrier fluid to each module.

Paragraph A26. The system of paragraph A25, wherein the at least one source of vacuum/pressure and the at least source of carrier fluid are provided by the same instrument.

Paragraph A27. A method of forming emulsions, the method comprising: (i) selecting a device including a frame and a plurality of separate microfluidic modules mounted to the frame, each module including an array of emulsion formation units; (ii) loading emulsion formation units of each array with sample-containing fluid; (iii) bonding a same sealing member to each module of the plurality of modules; and (iv) applying vacuum and/or pressure through the sealing member to the array of each module, to generate droplets of sample-containing fluid encapsulated by carrier fluid, using emulsion formation units of the module.

Paragraph A28. The method of paragraph A27, wherein the step of applying vacuum and/or pressure includes a step of applying vacuum to a single line of vacuum ports defined collectively by the plurality of modules.

Paragraph A29. The method of paragraph A27 or paragraph A28, wherein the step of applying vacuum and/or pressure is performed through openings defined by the sealing member, and wherein the openings are created after the step of bonding.

Paragraph A30. The method of any one of paragraphs A27 to A29, further comprising a step of supplying carrier fluid through the sealing member to the array of each module.

Paragraph A31. The method of paragraph A30, wherein the step of supplying carrier fluid includes a step of supplying carrier fluid to a single line of carrier fluid ports defined collectively by the plurality of modules.

Paragraph A32. The method of any one of paragraphs A27 to A31, wherein the step of bonding includes a step of bonding the sealing member directly to one or more protrusions formed on a top side of each module, and wherein the one or more protrusions form a top rim of a plurality of ports of the module.

Paragraph A33. The method of any one of paragraph A27 to A32, further comprising any limitation or combination of limitations of paragraphs A1 to A26.

Paragraph A34. A method of forming an array of emulsions, the method comprising: (i) selecting the device or system of any one of paragraphs A1 to A26; (ii) loading sample-containing fluid into sample reservoirs of each module, optionally via corresponding, overlying sample-loading ports, and optionally using a respective pipette tip placed into each sample reservoir via a corresponding sample-loading port; (iii) optionally, sealing ports on a top side of each module, optionally with the same sealing member, and, optionally with the sealing member bonded directly to a projecting top rim of each port; (iv) optionally, forming openings in the sealing member, optionally by piercing, to access, through the sealing member, at least one carrier fluid port of each module, at least one vacuum/pressure port of each module, a respective vent port for each emulsion formation unit, or any combination thereof; (v) supplying carrier fluid to droplet generation sites of each module, optionally via the at least one carrier fluid port of the module, optionally from at least one external (or internal) carrier fluid source, optionally to all of the modules in parallel, and optionally to only a single line of carrier fluid ports of the modules; (vi) applying vacuum or pressure to each vacuum/pressure port of each module, optionally to all of the modules in parallel, and optionally to only a single line of vacuum/pressure ports of the modules; (vii) generating sample-containing droplets encapsulated with carrier fluid at a droplet generation site of each module; and (viii) optionally, collecting an emulsion including sample-containing droplets in an emulsion reservoir of each emulsion formation unit.

Paragraph A35. The device, system, or method of any one of paragraphs A1 to A34, further comprising any limitation or combination of limitations of Example 4.

Paragraph B1. A device to form an array of emulsions, comprising: an assembly of bonded layers creating an array of emulsion formation units, each emulsion formation unit including a sample reservoir configured to be loaded with sample-containing fluid, and a droplet generation site configured to receive sample-containing fluid from the sample reservoir and to generate droplets of sample-containing fluid encapsulated by carrier fluid, the layers including a port layer forming a plurality of ports arranged in fluid communication with the array, wherein the port layer includes a body and at least one protrusion projecting upwardly from the body, and wherein the at least one protrusion forms an encircling rim of each port.

Paragraph B2. The device of paragraph B1, wherein the body defines a lower section of each port.

Paragraph B3. The device of paragraph B1 or paragraph B2, wherein each emulsion formation unit includes an emulsion reservoir to collect an emulsion including droplets of sample-containing fluid encapsulated by carrier fluid, and wherein the droplet generation site includes a channel junction at which a sample channel, at least one carrier fluid channel, and a droplet channel meet one another and at which droplets are generated.

Paragraph B4. The device of any one of paragraphs B1 to B3, wherein the at least one protrusion projects from a top surface of the body.

Paragraph B5. The device of paragraph B4, wherein the top surface lies in a plane.

Paragraph B6. The device of any one of paragraphs B1 to B5, wherein the assembly defines a plane, wherein the body and the at least one protrusion each have a thickness measured orthogonal to the plane, and wherein the thickness of the body is greater than the thickness of the at least one protrusion.

Paragraph B7. The device of any one of paragraphs B1 to B6, wherein the encircling rims of the plurality of ports are coplanar with one another on top.

Paragraph B8. The device of any one of paragraphs B1 to B7, further comprising a sealing member configured to be bonded directly to each encircling rim such that each port of the plurality of ports is covered and sealed.

Paragraph B9. The device of any one of paragraphs B1 to B8, wherein the plurality of ports includes a respective sample-loading port overlying each sample reservoir, and wherein the sample-loading port includes a tapered region that tapers toward the sample reservoir.

Paragraph B10. The device of paragraph B9, wherein a neck region of the sample-loading port is located between the tapered region and the sample reservoir.

Paragraph B11. The device of any one of paragraphs B1 to B10, wherein the port layer is a molded layer defining a plurality of through-holes, and wherein one of the through-holes forms at least part of each port.

Paragraph B12. The device of any one of paragraphs B1 to B11, further comprising any limitation or combination of limitations of paragraphs A1 to A34 and Example 4.

Paragraph C1. A device to form an array of emulsions, comprising: an assembly of bonded layers creating an array of emulsion formation units, each emulsion formation unit including a sample reservoir configured to be loaded with sample-containing fluid, and a droplet generation site configured to receive sample-containing fluid from the sample reservoir and to generate droplets of sample-containing fluid encapsulated by carrier fluid; wherein the assembly includes a vacuum port and a vacuum manifold, and wherein the vacuum port is in fluid communication with the droplet generation site of each emulsion formation unit via the vacuum manifold.

Paragraph C2. The device of paragraph C1, wherein each emulsion formation unit includes an emulsion reservoir to collect an emulsion including droplets of sample-containing fluid encapsulated by carrier fluid, and wherein the vacuum port is in fluid communication with the emulsion reservoir via the vacuum manifold.

Paragraph C3. The device of paragraph C1 or C2, wherein the droplet generation site includes a channel junction at which a sample channel, at least one carrier fluid channel, and a droplet channel meet one another and at which droplets are generated, Paragraph C4. The device of any one of paragraphs C1 to C3, wherein the assembly includes a carrier fluid port and a carrier manifold, and wherein the carrier fluid port is in fluid communication with each droplet generation site via the carrier manifold.

Paragraph C5. A device for forming emulsions, comprising: (i) an array of sample reservoirs; (ii) an array of sample-loading ports overlying and aligned with the array of sample reservoirs; (iii) an array of emulsion reservoirs corresponding to the array of sample reservoirs; (iv) a carrier fluid port; (v) at least one vacuum/pressure port; (vi) a vacuum/pressure manifold in fluid communication with each emulsion reservoir; and (vii) a channel network in fluid communication with each of the sample and emulsion reservoirs and with the carrier port and configured to form droplets of sample-containing fluid received from each sample reservoir and to direct the droplets to a corresponding emulsion reservoir when carrier fluid is supplied to the carrier fluid port and vacuum or positive pneumatic pressure is applied to each port of the at least one vacuum/pressure port; wherein the device includes a plurality of layers bonded together and forming the sample reservoirs, the sample ports, the emulsion reservoirs, the carrier fluid port, the vacuum/pressure port, the vacuum/pressure manifold, and the channel network.

Paragraph C6. The device of any one of paragraphs C1 to C5, further comprising any limitation or combination of limitations of paragraphs A1 to A34, B1 to B11, and Example 4.

Paragraph D1. A device for forming emulsions, comprising: an assembly of bonded layers creating an array of emulsion formation units, each emulsion formation unit including a sample reservoir configured to be loaded with sample-containing fluid, and a droplet generation site configured to receive sample-containing fluid from the sample reservoir and to generate droplets of sample-containing fluid encapsulated by carrier fluid; wherein a lower portion of the assembly forms the sample reservoir and the droplet generation site of each emulsion formation unit, wherein an upper portion of the assembly defines a respective sample-loading port overlying each sample reservoir, and wherein each sample-loading port includes a tapered region that tapers toward the sample reservoir.

Paragraph D2. The device of paragraph D1, wherein the sample-loading port forms a neck region under the tapered region, and wherein the neck region has a smaller average diameter than the tapered region or the sample reservoir.

Paragraph D3. The device of paragraph D1 or paragraph D2, wherein the upper portion of the assembly includes a port layer having a body and at least one protrusion, wherein the at least one protrusion projects upwardly from the body and forms a respective encircling rim of each sample-loading port.

Paragraph D4. The device of any one of paragraphs D1 to D3, wherein the assembly defines a plane, and wherein the sample-loading port tapers such that a maximum cross-sectional area of the sample loading port taken parallel to the plane is at least three times a minimum cross-sectional area of the sample-loading port taken parallel to the plane.

Paragraph D5. The device of any one of paragraphs D1 to D4, wherein the sample-loading port has a maximum diameter and a minimum diameter, and wherein the maximum diameter is at least about twice the minimum diameter.

Paragraph D6. The device of any one of paragraphs D1 to D5, wherein the assembly defines a plane, and wherein a cross-sectional shape of the sample-loading port parallel to the plane changes between the top and the bottom of the tapered region.

Paragraph D7. The device of any one of paragraphs D1 to D6, wherein the assembly defines a plane, and wherein at least a portion of the tapered region forms an angle of less than about 60 degrees with the plane.

Paragraph D8. The device of any one of paragraphs D1 to D7, further comprising any limitation or combination of limitations of paragraphs A1 to A34, B1 to B11, C1 to C5, and Example 4.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

We claim:

1. A device to form an array of emulsions, comprising:
an assembly of bonded layers creating an array of emulsion formation units, each emulsion formation unit including a sample reservoir configured to be loaded with sample-containing fluid, and a droplet generation site configured to receive sample-containing fluid from the sample reservoir and to generate droplets of sample-containing fluid encapsulated by carrier fluid, the layers including a well layer forming a lower portion of each sample reservoir, a channel layer located over the well layer and forming the droplet generation site of each emulsion formation unit, and a port layer located over the channel layer and forming a plurality of ports arranged in fluid communication with the array of emulsion formation units;
wherein the port layer defines a respective sample-loading port over the sample reservoir of each emulsion formation unit, a vent port for the sample reservoir, and a channel that connects the vent port to the sample-loading port, wherein the port layer includes a body having a top surface and also includes at least one protrusion projecting upwardly from the top surface and formed integrally with the body, and wherein the at least one protrusion forms an encircling rim of each sample-loading port and each vent port.

2. The device of claim 1, further comprising:
a frame;
a plurality of discrete microfluidic modules mounted or configured to be mounted to the frame, each module including an array of emulsion formation units, each emulsion formation unit including a sample reservoir configured to be loaded with sample-containing fluid, and a droplet generation site configured to receive sample-containing fluid from the sample reservoir and to generate droplets of sample-containing fluid encapsulated by carrier fluid, wherein each module has a plurality of ports in fluid communication with the emulsion formation units of the module; and a sealing member configured to be bonded to a top side of each module of the plurality of modules, such that the sealing member completely covers and hermetically seals the plurality of ports of each module of the plurality of modules.

3. A device to form an array of emulsions, comprising:
an assembly of layers bonded to one another, the assembly creating an array of emulsion formation units, a vacuum port, and a vacuum manifold, each emulsion formation unit including a sample reservoir configured to be loaded with sample-containing fluid and a droplet generation site configured to receive sample-containing fluid from the sample reservoir and to generate droplets of sample-containing fluid encapsulated by carrier fluid;
wherein the vacuum port is in fluid communication with an emulsion reservoir of each emulsion formation unit of the module via the vacuum manifold.

4. The device of claim 3, wherein the assembly of layers includes a well layer forming a lower portion of each sample reservoir and a lower portion of each emulsion reservoir of the array of emulsion formation units, and wherein the assembly of layers also includes a channel layer located between the well layer and the vacuum manifold and forming the droplet generation site of each emulsion formation unit.

5. The device of claim 2, wherein each port of the plurality of ports has a top rim formed by a ridge, wherein the port layer has a body and at least one protrusion projecting from a top surface of the body, and wherein the at least one protrusion provides the ridge for each port of the plurality of ports.

6. The device of claim 2, wherein the frame is a rectangular frame having a pair of lateral walls facing one another, and wherein each module is attached to the frame via complementary mating features of the module and the frame.

7. The device of claim 6, wherein each module is mounted to the frame via snap-fit attachment.

8. The device of claim 2, wherein each sample reservoir is located under a respective sample-loading port, and wherein the sample-loading port includes a tapered region that tapers toward the sample reservoir.

9. The device of claim 8, wherein a neck region of the sample-loading port is located between the tapered region and the sample reservoir.

10. The device of claim 2, wherein the array of each module is a smaller array, and wherein the plurality of modules forms a larger, rectangular array of emulsion formation units that includes the smaller array of each module.

11. The device of claim 10, wherein each sample reservoir is configured to be loaded with sample-containing fluid via a respective sample-loading port that defines a loading axis, wherein the rectangular array has the loading axes of the sample-loading ports arranged in uniformly-spaced rows and uniformly-spaced columns, and wherein the rows and the columns have the same spacing as one another.

12. The device of claim 11, wherein the rectangular array is an 8-by-12 array.

13. The device of claim 2, wherein each emulsion formation unit of the plurality of modules includes an emulsion reservoir to collect an emulsion including droplets of sample-containing fluid encapsulated by carrier fluid, and wherein the droplet generation site of the emulsion formation unit includes a channel junction at which a sample channel, at least one carrier fluid channel, and a droplet channel meet one another and at which droplets are generated.

14. The device of claim 2, wherein the plurality of ports includes a plurality of sample-loading ports, at least one carrier fluid port, and at least one vacuum/pressure port.

15. The device of claim 14, wherein the plurality of ports also includes a respective vent port for each emulsion formation unit.

16. The device of claim 2, wherein each module includes an assembly of layers bonded together, and wherein the assembly creates each emulsion formation unit of the module.

17. A system for forming emulsions, comprising:
the device of claim 2; and
at least one source of vacuum/pressure configured to be operatively coupled to the device, to drive droplet generation at each droplet generation site of each module.

* * * * *